Aug. 3, 1937.  F. TSCHUDY  2,088,624

PROCESS OF AND APPARATUS FOR TREATING MATERIALS

Filed July 18, 1930  14 Sheets-Sheet 1

Inventor,

FREDERICK TSCHUDY.

By Ivan P. Tashof,

Attorney

Aug. 3, 1937.  F. TSCHUDY  2,088,624
PROCESS OF AND APPARATUS FOR TREATING MATERIALS
Filed July 18, 1930  14 Sheets-Sheet 2

Inventor,
FREDERICK TSCHUDY.
By Ivan P. Tashof,
Attorney

Aug. 3, 1937.  F. TSCHUDY  2,088,624
PROCESS OF AND APPARATUS FOR TREATING MATERIALS
Filed July 18, 1930 14 Sheets—Sheet 3

Inventor,
FREDERICK TSCHUDY.
By Ivan P. Tashof,
Attorney.

Aug. 3, 1937.   F. TSCHUDY   2,088,624
PROCESS OF AND APPARATUS FOR TREATING MATERIALS
Filed July 18, 1930   14 Sheets-Sheet 4
Fig. 6.
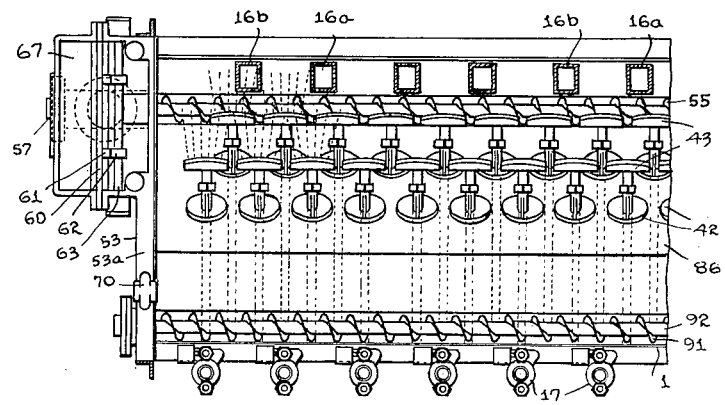
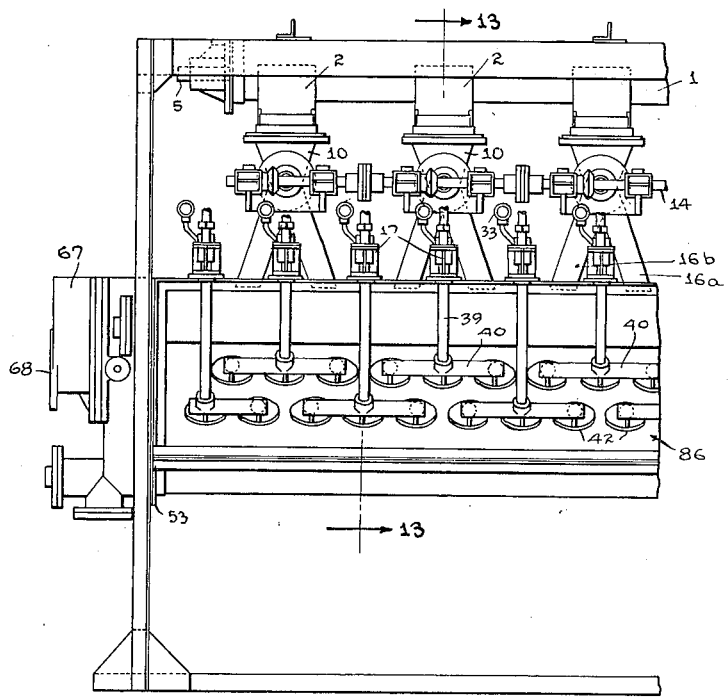
Fig. 5.
Inventor
FREDERICK TSCHUDY.
By Ivan P. Tashof,
Attorney.

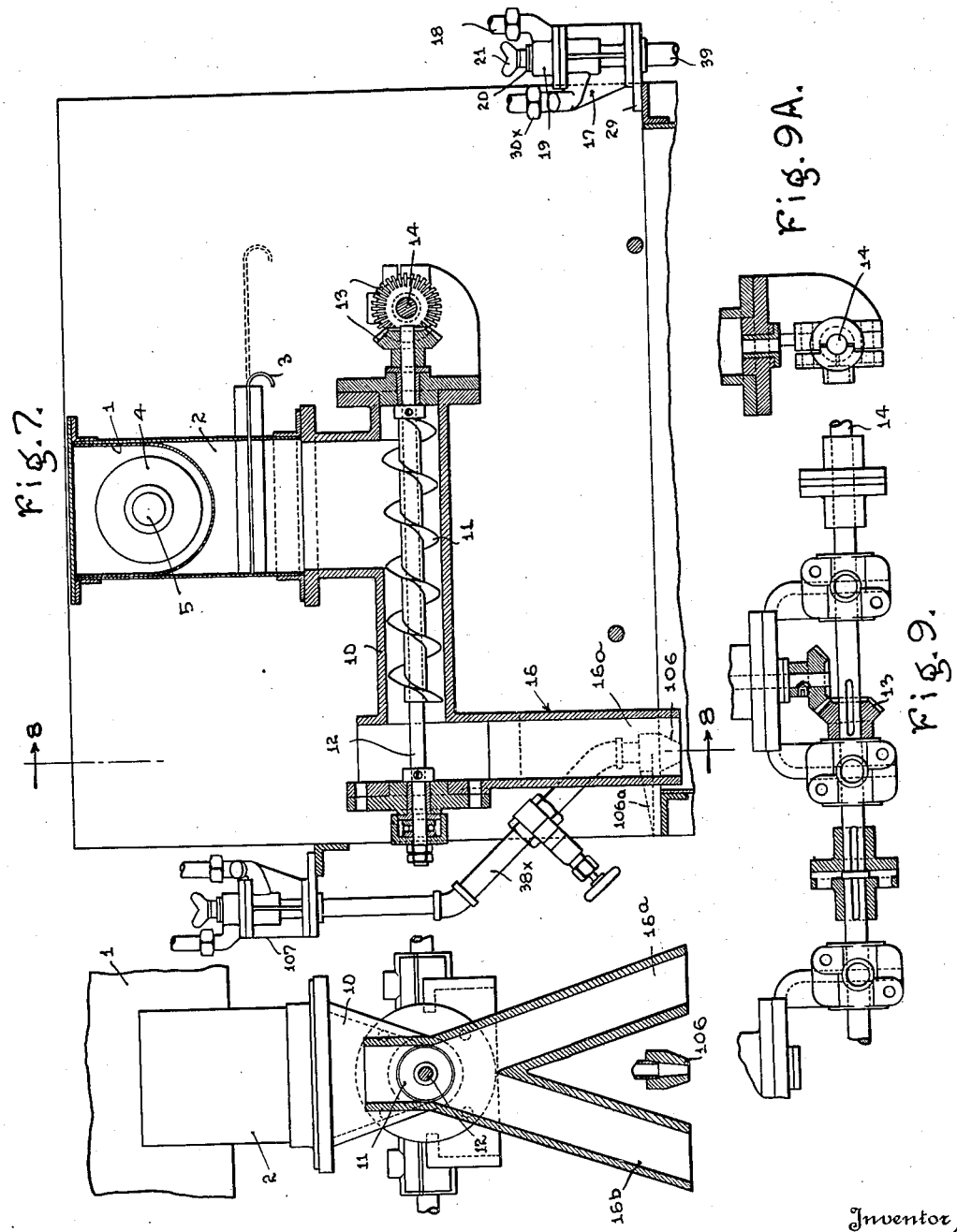

Aug. 3, 1937.  F. TSCHUDY  2,088,624
PROCESS OF AND APPARATUS FOR TREATING MATERIALS
Filed July 18, 1930  14 Sheets-Sheet 6
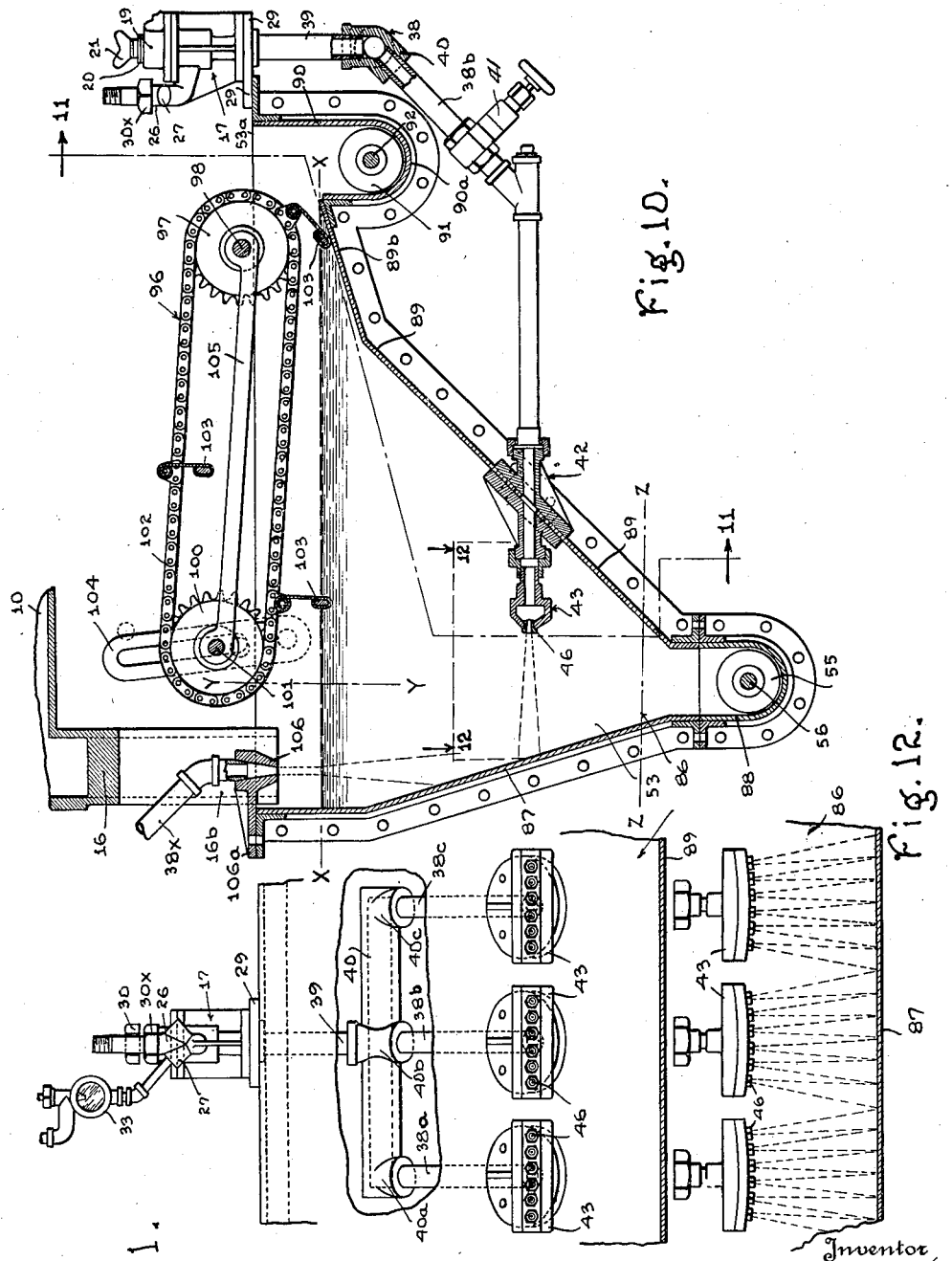
Inventor
FREDERICK TSCHUDY.
By Ivan P. Tashof.
Attorney

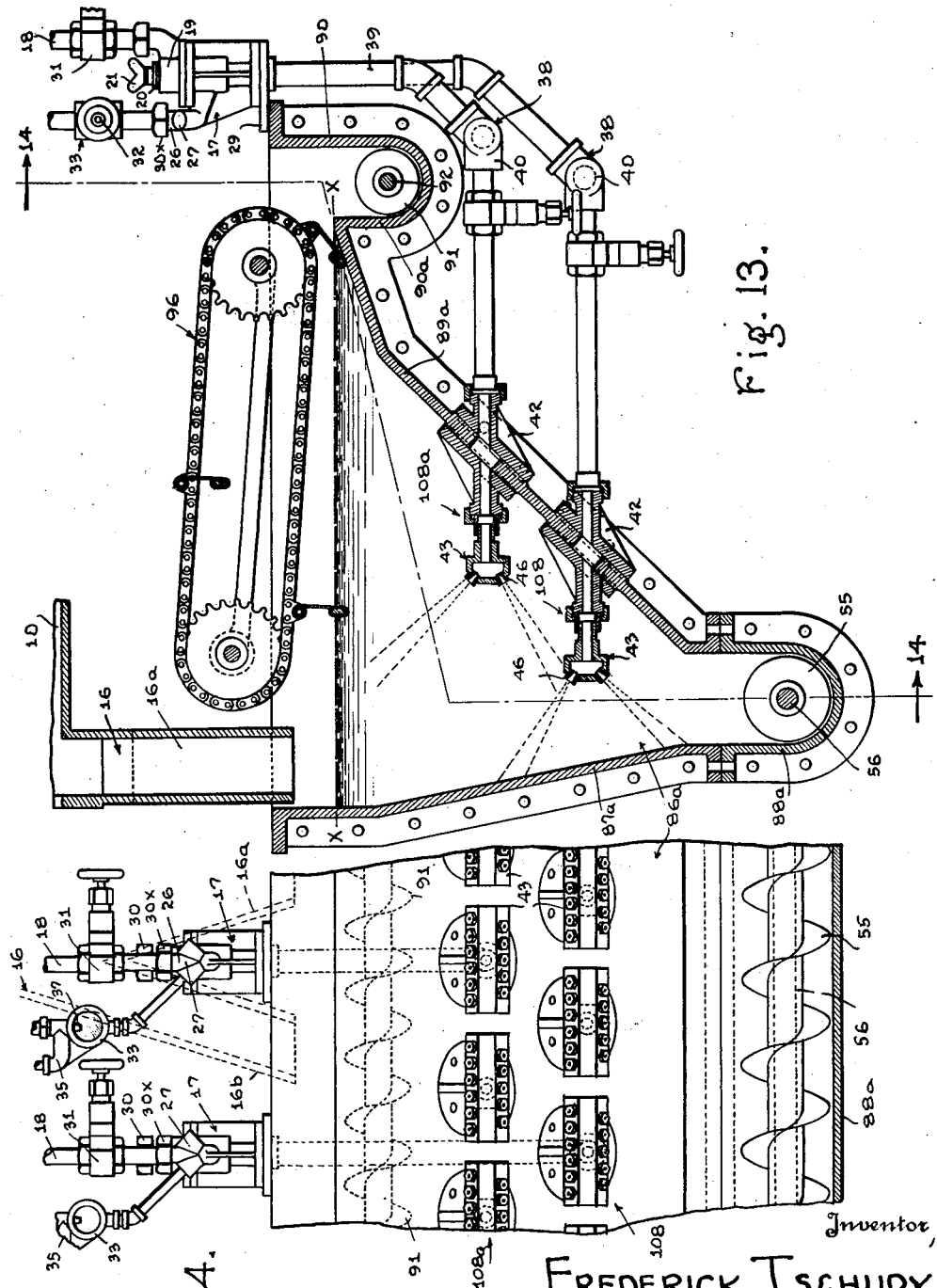

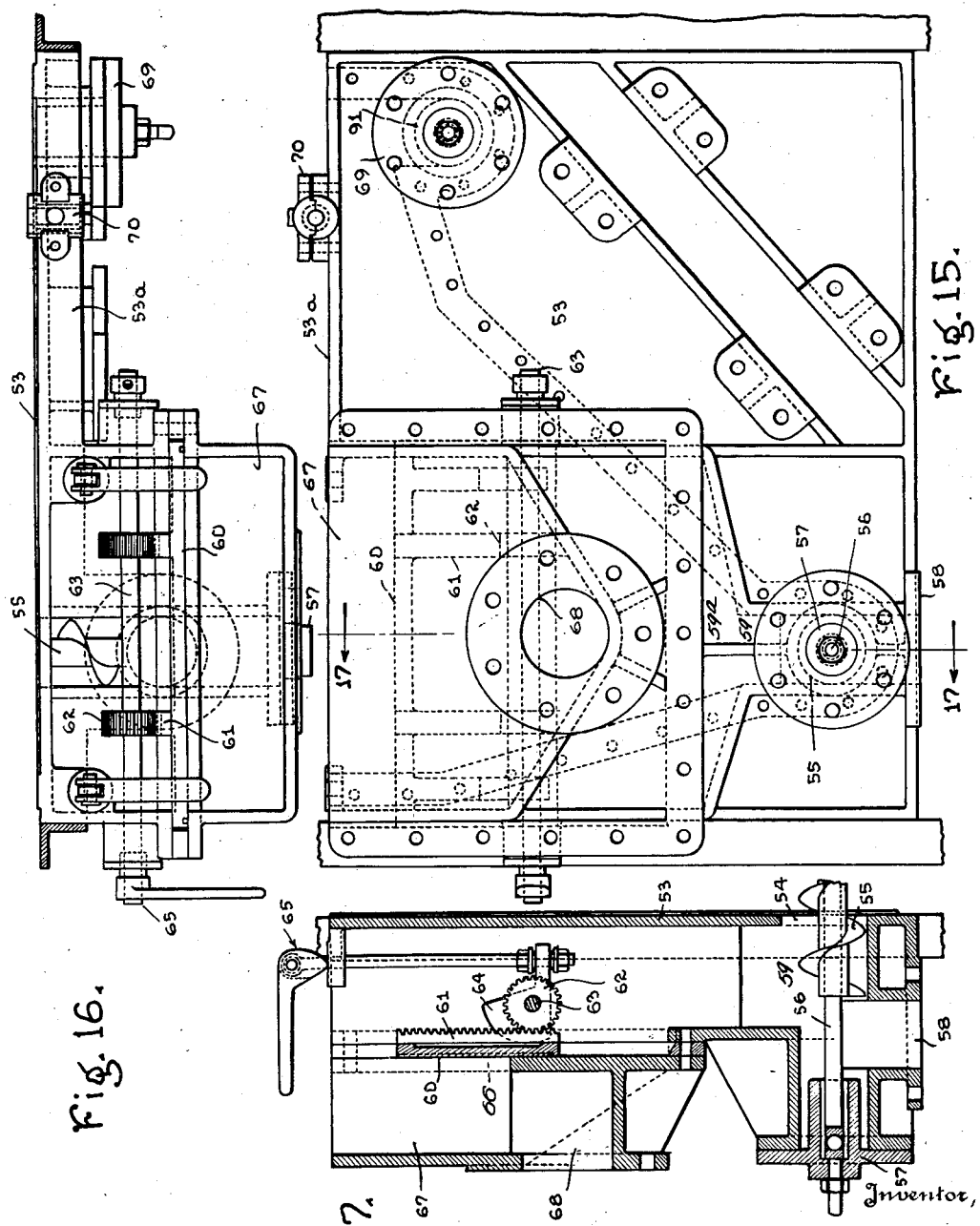

Aug. 3, 1937.   F. TSCHUDY   2,088,624
PROCESS OF AND APPARATUS FOR TREATING MATERIALS
Filed July 18, 1930   14 Sheets-Sheet 9
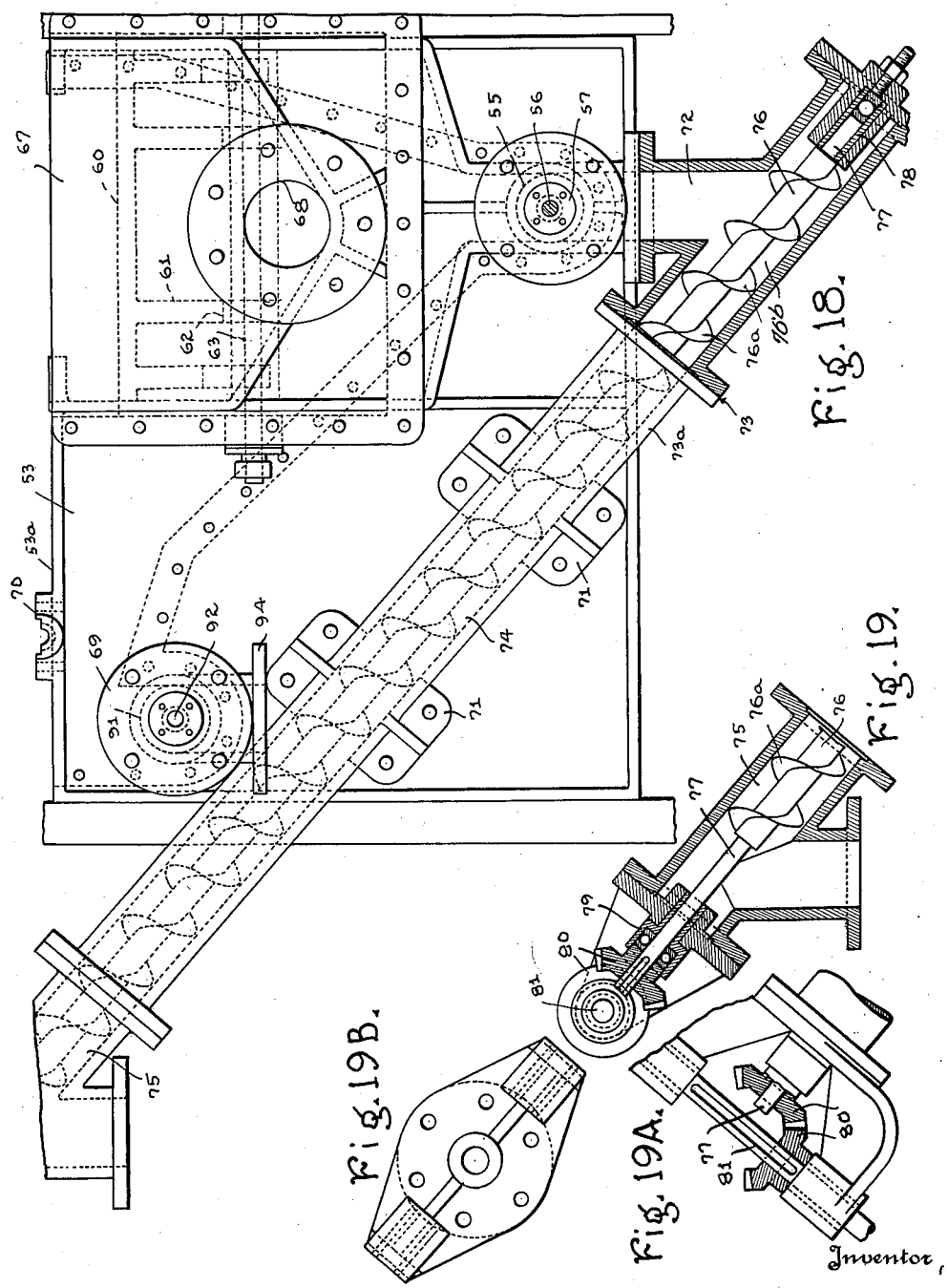
Inventor,
FREDERICK TSCHUDY.
By
Attorney

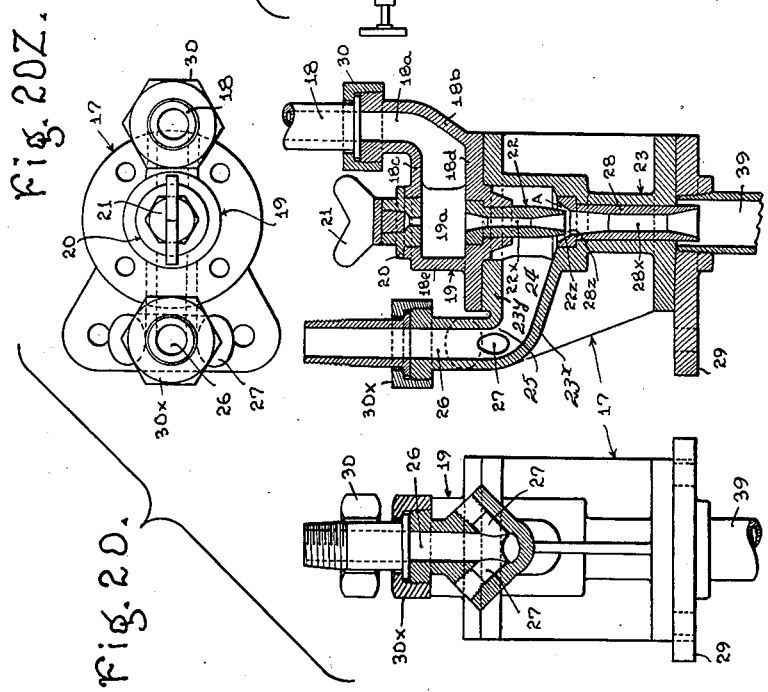

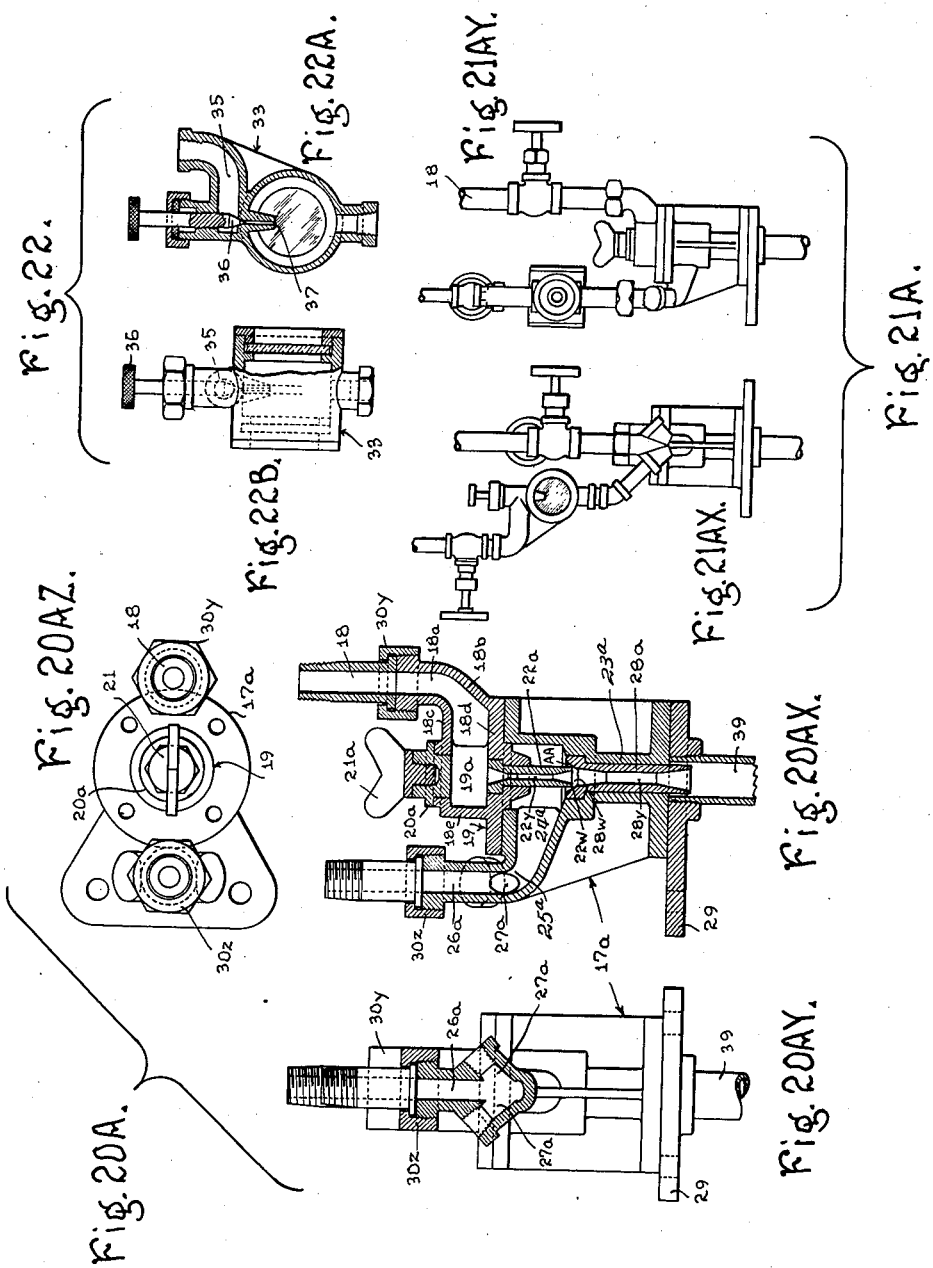

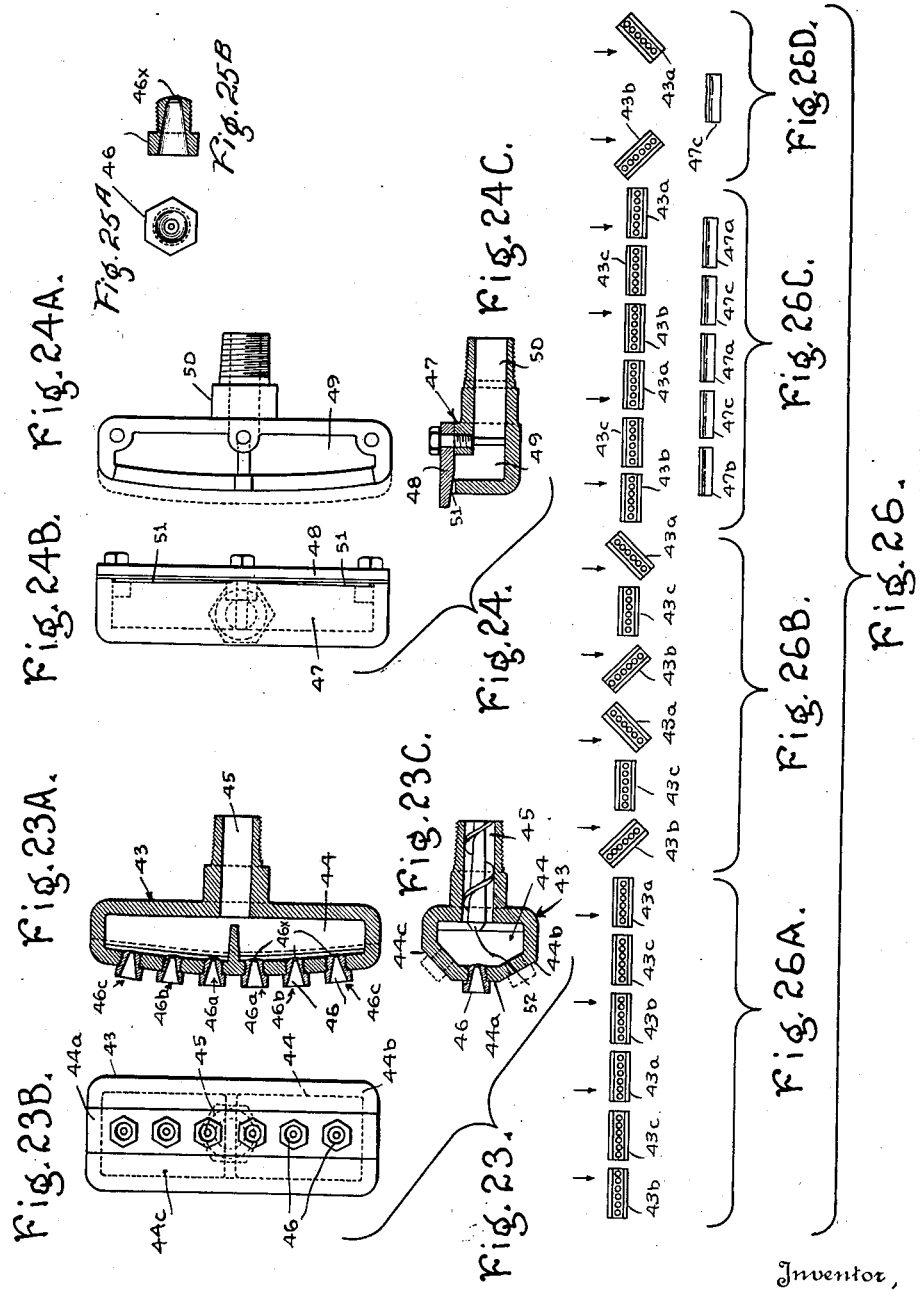

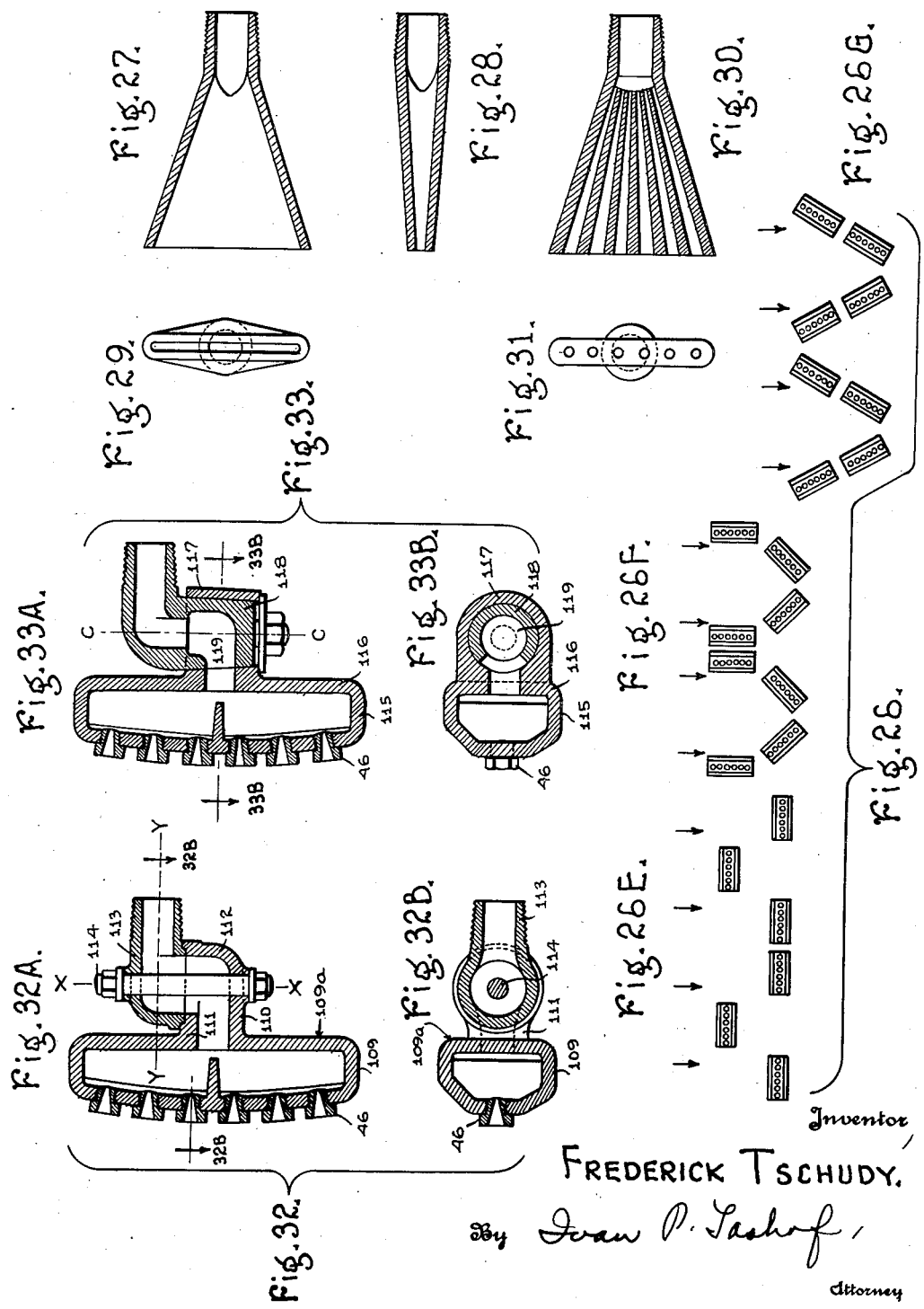

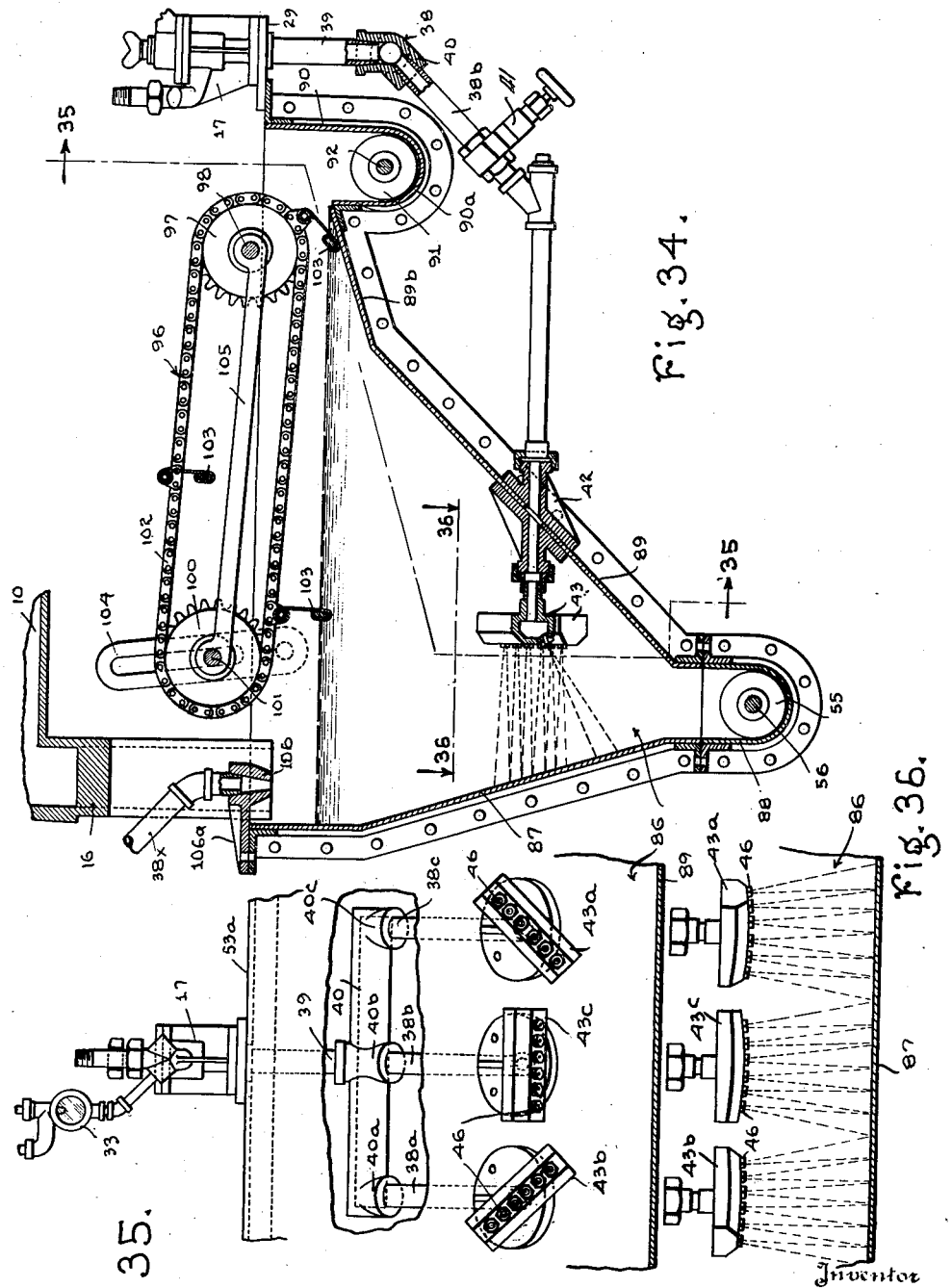

Patented Aug. 3, 1937

2,088,624

UNITED STATES PATENT OFFICE 2,088,624

PROCESS OF AND APPARATUS FOR TREATING MATERIALS

Frederick Tschudy, Ensley, Ala.

Application July 18, 1930, Serial No. 468,969

50 Claims. (Cl. 209—164)

The present invention relates broadly to the treatment of materials necessitating the employment of a circulating medium carrying a gaseous constituent in the form of bubbles. It is in general applicable to any process necessitating the control of bubble size and the quantity of bubbles used to produce efficient results. For example in the ferric sulphate-sulphuric acid process where solutions of ferric sulphate or sulphuric acid are prepared by passing a mixture of air and sulphur dioxide through solutions containing varying amounts of iron sulphate, the present invention may be utilized. It is also applicable in general to the aeration of solutions and may be used in the treatment of sewage to effect a purification thereof. It is not necessary to specifically enumerate the various arts in which the various modifications of the present invention may be utilized, as after the disclosure is once given its application to the various arts will be obvious.

The broad underlying principles of the present invention are particularly applicable to any material amenable to flotation, including naturally occurring and artifically produced products. For this reason the invention will be illustrated by its application to the flotation art. As examples of natural occurring materials, reference is made to minerals, coals, shales, graphite, phosphate rock, bauxite and sands. Relative to artificially produced material, flue dust, particularly blast furnace dust resulting from the smelting of iron ore, and dusts generally produced in smelting operations, including zinc and copper smelt dust may be treated in accordance with the present invention. The invention may also be utilized to treat manufacturer's ashes, city ash dumps, waste from coal mine culm piles, coal, bug dust, and in general to recover the values from many products which today are primarily waste products from which the values cannot be recovered at a profit by any known process.

The present invention is directed to the following novel features:

The creation of an aerated emulsion outside of the flotation bath, the emulsion being produced by a process in which the various components thereof, consisting of water or circulating emulsion emulsifying agent, and air are controlled quantitatively and qualitatively and independently of each other. The character of the emulsion produced depends on the amount of emulsion constituents used and the pressure to which they are originally subjected, and variations thereof, controllable at will, as will be hereafter more specifically pointed out. In other words, the quantity of the reacting constituents and the partial pressure of each constituent, and the total pressure under which the final emulsion is produced are variable factors, completely under independent control to produce an aerated emulsion containing bubbles fully controlled as to quantity and size, and this prior to the introduction of the emulsion into the bath. The preferred mode of creating the aerated emulsion is to pass water or circulating emulsion somewhat weak in emulsifying agent under suitable pressure into one leg of an aspirator, allowing the water to pass through the aspirator nozzle, which preferably, although not necessarily, has a Venturi effect, creating a suction effect by impact on the secondary aspirator Venturi tube whereby air and oil are sucked in through a separate aspirator leg and into a specially formed chamber, and passing the aerated mixture through the secondary aspirator Venturi tube and into an expansion chamber. The aspirator tube through which the water or circulating weak emulsion passes under controllable pressure may vary in size both as to length and variable inside diameter, the variation of length of the aspirator tube permitting a control over the amount of air and emulsifying agent introduced into the water or weak circulating emulsion. The secondary aspirator Venturi tube is also controllable as to size so as to vary the velocity of the aerated emulsion at will under any desired pressure. The aspirator nozzle and the secondary Venturi nozzle in cooperative relationship furnish means for controlling the amount of water, air and emulsifying agent, mixed to produce the aerated emulsion, and for varying the quantity of emulsion passing therethrough per minute which, taken together with the pressure control, control the size and quantity of the bubbles present in the aerated emulsion, it being pointed out that both tubes are removable and replaceable without interfering with the normal operation of the process. Further, a secondary control of the final size and number of bubbles in the aerated mixture is provided by passing the aerated emulsion into an expansion chamber, turbulator and an emulsion distributor, as will be more fully pointed out hereinafter.

It is desired to state while the primary control is preferably used in cooperation with the secondary control, the former may in some cases be utilized by itself in the absence of the latter, although the results are not as satisfactory.

One of the features of the invention is the provision of an expansion chamber communicating preferably directly with the secondary aspirator Venturi tube, the expansion chamber functioning primarily to arrest the velocity of the aerated mixture issuing from the secondary aspirator Venturi tube, and thereby reducing the pressure to which the mixture is subjected. The aerated mixture already may have had its pressure reduced when passing through the aspirator nozzle. When the aerated mixture under reduced pressure passes into the expansion chamber, there is a further reduction in pressure due to the volumetric variation to which the aerated mixture is subjected. There is thereby provided an incremental reduction in pressure and velocity, allowing the creation of bubbles in the aerated mixture of any desired size and quantity corresponding to character of the material being treated, this being brought about by the flexible control set forth. The basic idea of flexible control is not limited to incremental reduction of pressure, as of course, under some circumstances, an incremental increase in pressure, up to the original hydraulic pressure at the aspirator entrance may be desired, and this may be obtained by correlating the size of the various parts, in accordance with the established principles relating to the flow of liquids, it being borne in mind that it is eminently desirable to completely control the character of the aerated mixture entering the flotation bath to produce bubbles of any desired size and volume, and further to control the turbulence characteristics of the bath.

The secondary and final control of the size of the bubbles present in the aerated mixture and the quantity of emulsion introduced into the bath comprises a distributor having multiple distributing elements such as nozzles or slots, said distributor distributing the aerated mixture in the bath in uniform concise streams at predetermined zones, or zones preferably corresponding to the material feeding zone where the flotation reaction is most effective. The distributors are under control as to the direction of the issuing stream of aerated emulsion, so as to provide for a minimum turbulence when this is desirable, and in this connection, in some cases, the distributing element may have a variable cross-sectional area sending forth a stream of variable cross-section.

It follows from the above that one of the features of the present invention is the reduction of the turbulence in the bath to a minimum, this being of particular value in the treatment of composite granular materials having a substantial proportion of finely divided material present, a specific example thereof being flue dust from iron blast furnace operations.

Another feature of the present invention is the production of a flotation medium having the following characteristics: It is a cream simulating the beaten white of eggs or a barber's lather, having present bubbles of infinitesimal and substantially uniform size. The cream further is so constituted that it is substantially immediately transformed into de-aerated emulsion as soon as it leaves the zone of bubbling effect below it, and passes from the upper surface of the flotation bath. The usual flotation-froth does not answer to these characteristics, as it must be broken down to de-aerate.

Another feature of the invention is the charging of the material to be floated in precisely regulated quantities, and at specifically allocated points above the level of the bath in cooperative relationship to a rising column of bubbles, counter-currently rising from allocated points in the bath, the points of original discharge into the bath of the flotation medium being coordinated with the material charging points so that the bubbles rise substantially vertically to meet the material charged, and in this manner promote the effective contact of the particles being treated with the rising air bubbles and produce a thorough and efficient separation with a minimum turbulence, all of which is highly important in the separation of materials in general, but of particular importance when treating composite granular materials containing admixed therewith a substantial proportion of fine material, as exemplified by blast furnace dust, and especially that from iron blast furnaces.

In accordance with the present invention, there is maintained a balanced bath level, a special overflow outside of the bath or cell proper being utilized to accomplish the same and thereby avoid any syphon action or eddy currents inside of the bath.

Another feature of the invention is the removal and partial dehydration of the sink, the quantity of such removal being synchronized with the quantity of material charged in order to prevent an undue accumulation of sink in the bottom of the cell and the creation of turbulences. Further, in this manner, there is created below the distributors a substantially quiet zone so as not to interfere with the predetermined zoning of the aerated flotation emulsion issuing from the distributors.

Another feature of the present invention is the provision of a novel apparatus, as hereinafter disclosed, whereby the process may be efficiently carried out.

More specifically, according to the present process, materials may be separated by flotation by controlling at will the size and amount of gaseous bubbles present in the flotation bath, and in connection therewith, in the preferred form of the invention, the introduction of the so produced flotation medium into the flotation bath is regulated to control the turbulences produced thereby. A circulating medium under pressure is created. The velocity and pressure of the circulating medium is modified to entrain therein by suction effect the gaseous agent, and the size of the gaseous bubbles and the amount thereof introduced into the circulating medium is controllable at will. The so controlled circulating medium or emulsion containing bubbles controlled as to size and amount is introduced into the flotation bath and allowed to act on the material undergoing treatment, and there are separately recovered float and sink products. The introduction of the flotation medium into the bath is regulated so as to control the turbulence induced thereby, said regulation permitting a variation in the induced turbulence from substantially zero to any desired maximum.

There are primary and secondary controls of the size of the bubbles and amount of gaseous agent present in the flotation medium.

There is provided at the top of the flotation bath a flotation cream having bubbles of substantially uniform size and substantially uniformly distributed therein, and contiguous and adjacent thereto a fog or miniature rain. A composite material is fed through the fog and on to the cream, thereby allowing a surface separation of the feed constituents, a portion thereof remaining on and adjacent to the surface of the cream and adapted to be removed. This removal is accomplished quickly, prior to the time the separated material becomes sufficiently wet to sink through the cream and into the bath. The fog or rain contiguous with and adjacent the surface of the cream is formed under a differential head just slightly greater than the hydraulic head of the bath. In other words, the bubbles on reaching the surface of the cream being endowed with a minimum of energy burst substantially immediately, producing over the flotation cream a fog or miniature rain. This allows a differential wetting of the feed constituents in accordance with their absorption and adsorption properties, and produces a preliminary separation of the feed constituents.

An aspirator is used to produce the circulating medium and the aspirator is equipped with primary and secondary Venturi nozzles having a port of entry therebetween, the size of said port being regulated by the distance between the nozzles. A circulating medium passes through the primary nozzle and entrains by suction as it issues therefrom a gaseous agent, and in most cases a flotation agent, and the amount of these ingredients and the size of the entrained resultant bubbles are quantitatively proportioned primarily by the pressure at the primary nozzle exit and the size of the port between the latter and the secondary Venturi nozzle. The flotation medium carrying bubbles of any predetermined size and any predetermined volume passing into a secondary Venturi nozzle where the velocity of the flotation medium is further modified, and the so-modified flotation medium may be directly introduced into the bath or allowed to pass through an expansion chamber, a turbulator, and finally pass through a distributor or series of distributors capable of flexible control as to their position in the bath and the position of the streams of flotation medium issuing therefrom.

The turbulation in the bath is controlled by (1) regulating the pressure under which the flotation medium is introduced into the bath and the size and amount of bubbles contained therein; (2) the zones of distribution of the flotation medium as it passes into the bath; (3) maintaining a balanced bath level regulated by an overflow outside of the bath proper; and (4) by synchronizing the quantity of sink removed with the quantity of material charged, thereby preventing an accumulation of sink in the bottom of the cell tending to upset equilibrium conditions.

In connection with the control of the size and amount of bubbles present in the flotation medium, the character of the emulsifying agent is regulated, and preferably so that it is one of low viscosity, although obviously the present invention in its broadest aspect is not limited to the use of a low viscosity flotation agent.

When treating flue dust from iron blast furnaces, the flue dust being a composite material containing metal and carbonaceous constituents including iron oxide, iron and coke in a granular and fine state, these constituents having different specific gravities and different wetting and absorption and adsorption properties, there is provided a flotation bath carrying at the top surface thereof a flotation cream simulating the beaten white of eggs or barber's lather, this cream containing bubbles of substantially uniform size predetermined at will and uniformly distributed therein. Through the fog previously mentioned there is fed the composite flue dust, a separation of the iron and coke constituents occurring at and adjacent the flotation cream; a substantial portion of the coke wetting more slowly than the iron constituents and remaining longer on the flotation cream of the character set forth, this being, as far as the inventor is aware, novel in the flotation art. The coke separating on and adjacent to the cream surface is removed prior to it becoming sufficiently wet to sink through the cream and into the bath. A small proportion of the heavier coke sinking through the bath at the charging zone meets a column of rising bubbles from the distributor zone, and is carried upwardly into the take-off zone. Preferably, the composite flue dust is fed in precisely regulated quantities adjacent the front wall of the flotation cell and at specifically allocated points above the level of the bath, the material being fed in a substantially dry state. The gaseous emulsion containing bubbles of predetermined size, controllable at will, is introduced into the flotation bath at a pressure just sufficient to produce a slight impingement on the front wall of the flotation cell, overcome the hydraulic head of the bath, and rise substantially perpendicularly in the charging zone. It assists in the formation of the flotation cream previously mentioned and a fog thereover. The fog wets the fine coke particles and induces a preliminary separation of the fine coke from the remainder of the feed, and this on and adjacent the flotation cream. The fine coke is quickly removed. There is provided a flotation apparatus comprising in combination a flotation cell containing a flotation bath, means for feeding material thereto, means for feeding an emulsion containing bubbles of predetermined size and quantity controllable at will, and adapted to react on the material to be treated to effect a separation into float and sink products. Separate means are provided for removing the float and sink. The means for feeding the flotation medium, having the characteristics set forth, comprises an aspirator having primary and secondary Venturi nozzles, a port therebetween regulatable as to size; an expansion chamber in operative connection with the aspirator, a turbulator leading from the expansion chamber and in operative connection with the distributor having distributing means for the emulsion passing therethrough, the distributor being adapted to be placed in any desired position and feed the emulsion or flotation medium passing therethrough to the flotation bath at predetermined zones.

A skimmer adjacent the flotation cream is provided and carries wiping means adjustable as to the depth to which they dip into the flotation cream and thereby function to divide the flotation cream into a charging zone and a take-off zone which may be varied as hereinafter pointed out. Means are provided for removing the sink, including a helical pump adapted to allow the sink as it passes upwardly therethrough to be partially dehydrated by the action of centrifugal force and deliver a fine sink product capable of direct briquetting.

Further features of the invention will appear from the following detailed description.

In order that the present invention may be fully described, it will be described in connection with the accompanying drawings, in which:

Figure 5 is a partial side elevation of a cell unit, showing a multiple number of aspirators and distributors arranged in different horizontal planes, the dead end of the cell, which is common to all cells of the present invention, being shown;

Figure 6 is a partial plan view of the cell shown in Fig. 5;

Figure 7 is a vertical section taken along the line 7—7 of Fig. 2, showing the raw material supply-conveyor and the mechanical feeder;

Figure 8 is a vertical section taken on line 8—8 of Fig. 7;

Figure 9 is a plan view partially in section of the drive shaft and gearing for an individual feeder;

Figure 9A is an end elevation of the mechanism shown in Fig. 9;

Figure 10 is a cross sectional view through a cell unit taken on line 10—10 of Fig. 2;

Figure 11 is a section taken on line 11—11 of Figure 10.

Figure 12 is a detailed plan view taken on the line 12—12 of Fig. 10;

Figure 13 is a cross sectional view through the cell unit taken on line 13—13 of Figure 5;

Figure 14 is a longitudinal section taken on line 14—14 of Figure 13; the section being a fragmentary one;

Figure 15 is an elevation of the end wall of a cell unit;

Figure 16 is a plan view thereof;

Figure 17 is a vertical cross section showing the overflow discharge taken on line 17—17 of Figure 15;

Figure 18 is an end elevation of the end wall of the cell unit showing the sink discharge and the pump for lifting and dehydrating the sink;

Figure 19 is a vertical sectional view of the discharge end of the pump in combination with the drive;

Figure 19A is a side elevation and partial section of the drive in combination with the thrust end of the pump;

Figure 19B is a plan view of the thrust end of the pump;

Figure 1:
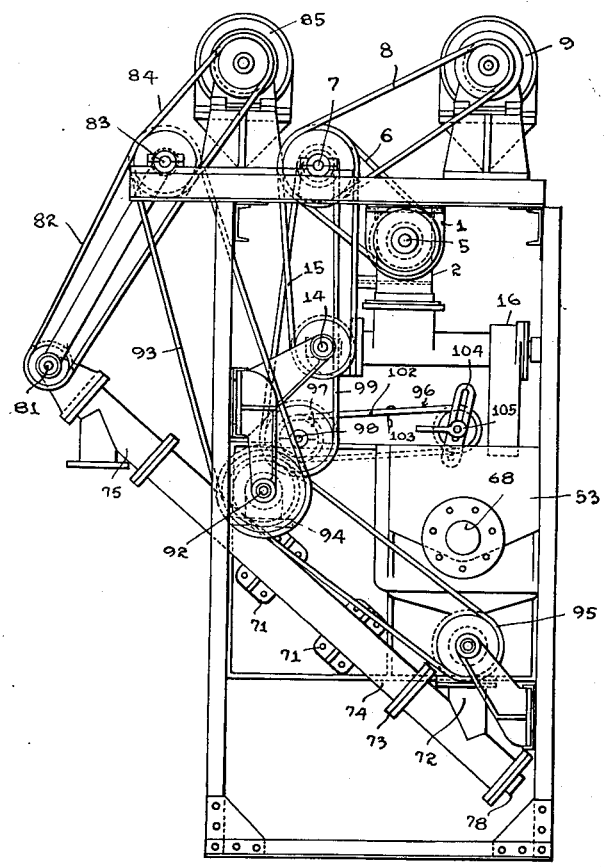
Figure 1 is an end elevation of the driving end of a complete cell unit.

Figure 20 is a group assemblage showing the details of the aspirator. This group comprises Fig. 20X, a vertical longitudinal section of the aspirator; Fig. 20Y, a vertical longitudinal section through the air conduit of the aspirator; and Fig. 20Z, a plan view of the aspirator;

Figure 20A is a group assemblage showing details of a smaller type of aspirator, this group comprising Figs. 20AX, 20AY, and 20AZ, the description of the views being identical with the corresponding figures constituting the group assemblage of Figure 20;

Figure 21 is a group assemblage showing the aspirator set forth in Figure 20, and shows the valve control and the oil feed, Figure 21X being an end elevation and Figure 21Y a side elevation;

Fig. 21A is a group assemblage showing a slightly modified aspirator arrangement, and showing the valve control and the oil feed; Fig. 21AX being an end elevation and Fig. 21AY being a side elevation;

Figure 22 is a group assemblage showing details of the oil feeder; Figure 22A being a longitudinal cross section, and Fig. 22B an elevation partly in section;

Figure 23 is a group assemblage showing details of the distributor; Figure 23A being a horizontal cross section of the distributor head; Figure 23B a front elevation thereof; and Figure 23C a vertical cross sectional view;

Figure 24 is a group assemblage showing the details of a modified distributor; Figure 24A is a plan view of the body of the distributor with the cap removed; Figure 24B is a side elevation thereof showing the cap in place; and Figure 24C is a vertical cross section through the distributor;

Fig. 25A is a front view of the distributor nozzle, as shown in Fig. 23A;

Fig. 25B is a longitudinal view of the distributor nozzle.

Figure 26 shows diagrammatically several of the possible distributor settings in the cell unit;

Figure 26A shows a multiple number of distributors horizontally alined and parallel to the surface of the flotation bath;

Figure 26B shows a combination setting of the distributors in which some of them are positioned at an angle to the horizontal and to the flotation surface of the bath and others are parallel to the surface of the bath, the settings shown in Figs. 26A and 26B being primarily adapted for use in the cell shown in Fig. 10;

Figure 26C shows a multiple number of distributors arranged in differential zones, the axis of each setting being parallel to the line of the bath;

Figure 26D shows one of the many different settings possible when using two series of distributors located in differential zones;

Figures 26E, 26F and 26G illustrate further possible variant settings of the distributors;

Figures 27, 28 and 29 are detailed views of a modified type of distributor;

Figures 30 and 31 are detailed views of a still further modified type of distributor;

Figure 32 is a group assemblage illustrating a further modified type of adjustable distributor and comprises Fig. 32A being a longitudinal sectional view therethrough; and Fig. 32B taken on the line 32B—32B of Fig. 32A;

Figure 33 is a group assemblage of a still further modified type of adjustable distributor and comprises Fig. 33A which is a longitudinal sectional view therethrough, and Fig. 33B taken on the line 33B—33B of Fig. 33A;

Figure 34 is a cross sectional view through a cell unit illustrating a distributor setting in accordance with a specific experiment set forth in detail in the specification;

Figure 35 is a detailed sectional view taken on the line 35—35 of Fig. 34; and

Figure 36 is a detailed horizontal sectional view taken on the line 36—36 of Fig. 34.

Figure 2:
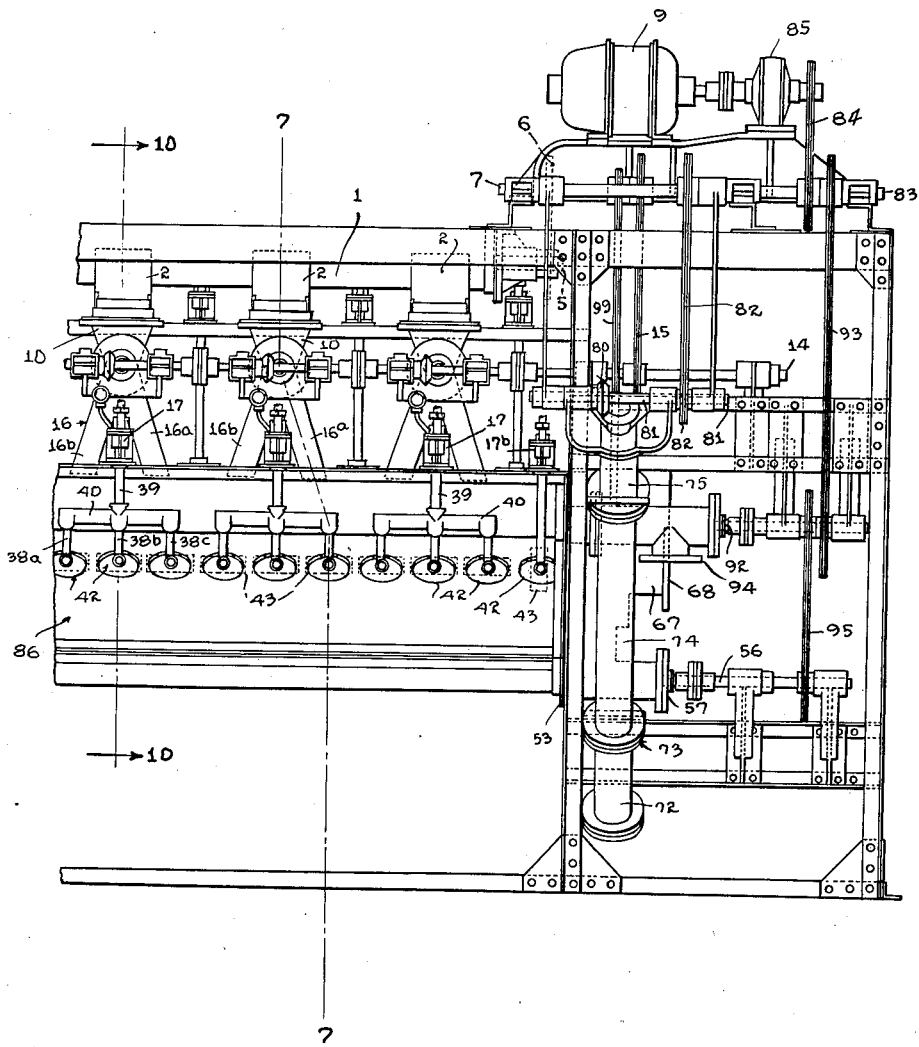
Figure 2 is a fragmentary side elevation of the driving end of a complete cell unit.
Figure 3:
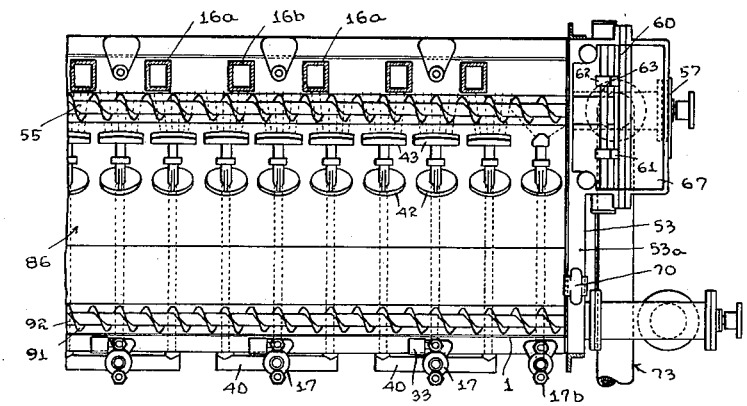
Figure 3 is a partial plan view of a cell unit with the driving mechanism removed.
Figure 4:
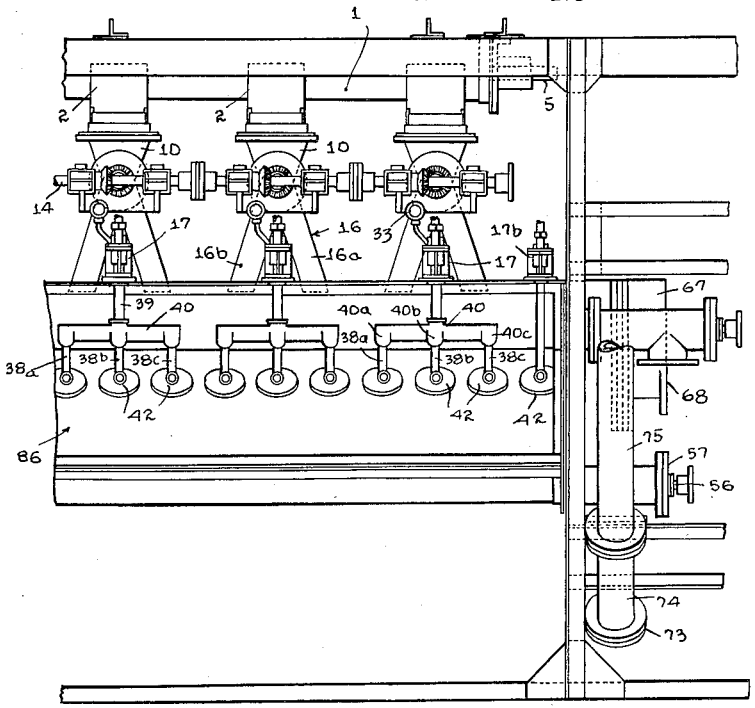
Figure 4 is a partial side elevation of a modified cell unit.

Referring to the drawings, and particularly to Figs. 1 to 5 inclusive, the material which is to be subjected to a flotation treatment is introduced into a conveyor 1 running longitudinally over the cell unit proper, the conveyor being preferably of a helical or screw type, as set forth in Figure 7. The material passing from the conveyor is subdivided into a series of streams dropping through a series of feed conduits or feed spouts 2 provided with slide valves 3 for auxiliary regulation, as best shown in Figure 7. The feed spouts 2 are positioned longitudinally of the bath at spaced distances correlated with the position of the distributors, as best shown in Figures 1, 4 and 5. The flights 4 of the screw conveyor are mounted on a shaft 5 rotated by a sprocket and chain arrangement conventionally shown at 6 from jack shaft 7, which in turn is driven preferably by a sprocket and chain arrangement conventionally indicated at 8, the driving medium being a motor and speed reducer identified by the numeral 9. These features are best shown in Fig. 1 of the drawings.

A feed casing 10 which may be integral or made of several parts is provided, as shown in detail in Figures 7 and 8. The feed passing through the casing 10 is fed in precisely regulated quantities by the helical conveyor 11, mounted on the shaft 12, and driven by a set of bevel gears 13, rotated by a shaft 14, taking its power from jack shaft 7 by means of a sprocket and chain arrangement conventionally indicated at 15, as shown in Figures 1 and 2 respectively. The feed material passes from the end of the conveyor 11 into a distributing conduit or spout indicated as an entity by the numeral 16. The distributing conduit or spout preferably has two legs 16a and 16b, the feed being proportionately divided and fed over the bath level indicated by line $x$—$x$, as shown in Figs. 10 and 13. A series of these distributing conduits are positioned lengthwise of the bath, as shown in Figures 1, 4 and 5, so as to feed the material to be treated in a series of streams, the position of the streams being correlated with the position of the distributors. The cell is provided with a series of aspirators designated by the numeral 17 as an entity, as shown in Fig. 20, a different size aspirator being also shown in Fig. 20A, the aspirator there being designated as an entity by the numeral 17a.

The circulating medium which may be a freshly prepared emulsion if the cell is started out without previous operation, but which preferably is an emulsion which has been in circulation through the cell, is introduced under pressure through the pressure inlet 18. The pressure inlet conduit 18a has an extending wall 18b and is integral with a horizontally extending wall 18c, which together with the flange 18d and the wall 18e comprises a cap 19 provided with a chamber 19a, the function of this chamber being to reduce friction and prevent accumulation of dirt above the primary aspirator nozzle 22. The cap 19 carries a bushing 20 and a plug 21 which permit the removal of the nozzle 22 and the substitution therefor of a different size nozzle, the size and shape of the nozzle being adjusted in each case to meet the requirements of the flotation process, as will be hereinafter more specifically described. With the construction set forth, any aspirator of the series of aspirators may be cleaned without perceptibly interrupting the operation of the process. Primary aspirator nozzles 22 and 22a, and 28 and 28a, as shown in Figs. 20 and 20A, which are readily removable and exchangeable, are in effect Venturi tubes, and therefore the variable bore $22x$, as designated in Fig. 20, and $22y$, as designated in Fig. 20A, is dimensioned in relationship to its assigned function, as hereinafterwards described. The walls of the bores $22x$ and $22y$ of primary aspirator Venturi nozzles 22 and 22a are made of any material, although preferably of material which will resist abrasion produced by the constant friction thereon of a partly contaminated stream of emulsion. The cap 19 or 19a is mounted on aspirator shell 23, as shown in Fig. 20, or 23a as shown in Fig. 20A. The shell 23 or 23a has an air intake conduit 26 or 26a, provided with an air or gas inlet port 25 or 25a, entering a mixing chamber 24 or 24a, the chamber being partially formed by the wall $23x$ and $23y$. The conduit 26 or 26a is in effect a suction conduit, and is provided with oil ports 27 or 27a. Positioned in the lower portion of the aspirator shell 23 or 23a are secondary aspirator Venturi tubes 28 or 28a, having bores $28x$ and $28y$, as shown in Figs. 20 and 20A, respectively.

The sizes of the bores $22x$ and $28x$ of the primary aspirator nozzle 22, and the secondary aspirator nozzle 28, are correlated to meet the variable requirements of the process herein disclosed, and the varying factors therein involved, the latter including the pressure at which the water is initially introduced into the aspirator, the amount of water introduced per unit of time; the amount of air introduced; the amount of emulsifying agent; the suction produced; the character of the ore treated, including its granular condition; and the quantity of air, the size of bubbles produced in the emulsion, and the pressure under which the final emulsifying agent is delivered to and from the distributors. It may be pointed out that a port A or AA, as shown in Figs. 20 and 20A, is provided between the nozzles 22 and 28, or 22a and 28a. By regulating the distances between the end $22z$ of nozzle 22, or $22w$ of nozzle 22a, and the upper end $28z$ of the secondary aspirator tube 28 or $28w$ of the secondary tube 28a, a port A or AA of any desired size may be formed and so attain the regulation pointed out in the introduction and which will hereinafter be further pointed out in detail. The secondary Venturi tubes 28 and 28a may be easily removed without disturbing the operation of any of the other aspirators of the cell unit by removing cap 19 or 19a. The aspirator 17 is connected to a turbulator, indicated in its entirety by the numeral 38, the turbulator having branches 38a, 38b and 38c, hereinafter described.

Connections 30 and $30x$, Fig. 20, and $30y$ and $30z$, Fig. 20A, enable the ready removal of a cap 19 or 19a, or the entire aspirator. Valves 31 and 32, Fig. 21, provide for an auxiliary control of the water and air respectively.

The emulsifying agent used which may be oil, acid or the like, is introduced into the oil feeder 33. The oil enters under gravity, pressure, or suction, induced by the suction line into the regulating chamber 35, and the amount of oil removed therefrom under suction is controlled by the needle valve 36. The suction originating within the suction line 26 results in a pull on the needle point 37 and the oil is thereby withdrawn, dropping into the suction line 26 through the oil ports 27, and is thereafter mixed in the mixing chamber 24. The valve 34 serves the purpose of stopping the oil supplied to the oil feeder, but may be used as an auxiliary control. Each aspirator has an oil feeder connected thereto, although two or more oil feeders may be used for each aspirator. The aspirator 17 is preferably supported on a flange 29 and connected to the cell proper through a turbulating tube shown as an entity by the numeral 38, as best set forth in Figs. 10 and 13. The turbulating tube system comprises an expansion chamber 39, the upper portion thereof preferably surrounding the end of the secondary aspirator Venturi tube 28. The upper portion of the extension chamber 39 is preferably located above the bath level of the cell in order to prevent flooding. Extending from the expansion chamber 39 is a manifold 40 provided with outlets 40a, 40b and 40c, leading into turbulating tubes 38a, 38b and 38c, which in turn lead to the respective distributors 43 which are fastened to the cell by a flexible union or the like, indicated as an entity by the numeral 42. The specific construction and arrangement of the distributor is shown in Fig. 23. The distributor 43 is provided with a longitudinal chamber 44, having an inlet port 45. The distributor is preferably provided with a number of nozzles, indicated in general by the numeral 46, an enlarged detail of an individual nozzle being shown in Fig. 25.

One of the basic features in constructing the distributor is to provide for a uniform stream issuing from the distributor nozzles under a substantially uniform pressure and volume, and this is preferably accomplished by varying the size of the inlet orifices 46x of the individual nozzles 46c, 46b, and 46a. The aerated emulsion passing into chamber 44, as it spreads laterally, slightly changes its velocity and pressure characteristics, due to friction, and this is compensated for by having the inlet orifices 46x of varying diameter, the outer nozzles 46c having the largest orifices, and the nozzles 46a having the smallest diameter. The basic idea in so adjusting the size of the orifice inlets 46x is to allow the aerated emulsion to issue from the distributor under substantially uniform pressure and volume, and at the same time carry bubbles controlled as to size and number, this of course being determined by the character of the material being treated and by correlation therewith of the variable factors inherent in the process. It is to be noted that the entrance ends of the distributing nozzles are preferably curved but may be tapered, thus functioning to prevent any possible stoppage of the nozzle orifices. The distributor nozzles are easily removable and, where occasion demands, they can be removed and nozzles having different orifice inlets may be substituted therefor.

The nozzle face of the distributor chamber, as shown in Figs. 23A and 23C, is preferably fan shaped. However, it is to be understood that while this is the preferred shape, the latter may be varied, depending on the circumstances. The nozzle face is preferably shown in Fig. 23 as composed of three segments 44a, 44b and 44c. However, it is to be understood that while this arrangement is preferred in some instances, the contour of the face may be circular, elliptical, or any other desired shape. In Figs. 23A and 23C the nozzles are shown as projecting horizontally from the distributor face. However, the position of the nozzle may be considerably varied. For example, as shown in Fig. 13, the nozzles may be positioned at any desired angle so as to project the issuing aerated emulsion into a predetermined allocated zone of the bath. As shown in Fig. 13, the upper series of nozzles of the upper distributor are with their axes set at an angle of 45° to the horizontal while the lower nozzles in said distributor are set with their axes at an angle of 30° to the horizontal. The upper nozzles of the lower distributor are set with their axes at 30° to the horizontal, and the lower nozzles of the latter distributor are set with their axes at 45° to the horizontal. However, as stated, the invention is not limited to any specific setting, although the arrangement set forth has given particularly satisfactory results in treating graphite. From the above, it is clear that there is a flexible control as to the size of the distributor nozzles and their respective position, thereby permitting selection of that size and position of the nozzles giving the best results compatible with the character of the material being treated and the other variable factors involved in the process. In some cases, nozzles may be inserted in the rear wall of the distributor for the purpose of washing down such matter as may accumulate on the inclined wall 89 of the cell.

Figs. 24A, 24B and 24C show a slot type of distributor comprising a shell 47 having a top cover 48 forming a chamber 49 adapted to receive an aerated emulsion fed through conduit 50. The aerated emulsion passes out of distributor discharge port 51, this being a precisely machined tapering slot dimensioned in accordance with the law of flow through orifices to produce the result desired.

The distributor shown in Figs. 24A, 24B, and 24C differs from that shown in Figs. 23A, 23B and 23C, in that the former produces a fan shaped sheet of aerated emulsion and the latter produces a series of distinct streams.

Various other forms of distributors may be used, as shown in Figs. 27 to 33 inclusive. Figs. 27 to 29 inclusive show a distributor with a plain flat opening producing a flattened fan-shaped issuing stream of aerated emulsion. Figs. 30 and 31 inclusive show modified distributors having a series of tapered holes for the division of the aerated emulsion into streams.

Super-control of the direction of the issuing streams of aerated emulsion may be obtained by employing an arrangement such as shown in Figs. 32 and 33. Referring to Fig. 32, the distributor 109 is provided with a back wall 109a, preferably integral with a lower projecting wall 110 and an upper projecting circular wall 111, the lower projecting wall being curved to form a vertical wall 112. Seated on the upper circular wall 111 is a swivel 113 which forms a swivel joint, permitting the distributor 109 to be rotated around an axis X—X. The distributor 109 may obviously be rotated around the horizontal distributor axis Y—Y. It is, therefore, obvious by rotation around the axis X—X and the axis Y—Y, the distributor 109 may be located in any desired position. Bolt 114 serves to hold the swivel 113 in water-tight connection with the distributor proper. Referring to Fig. 33, the distributor 115 has a back wall 116, carrying a shell 117, adapted to receive a tapered plug 118. The port 119 in the plug 118 is formed so that it will permit a rotation of the distributor body around axis C—C to about 45° upwardly and downwardly from the horizontal, and the closing off of the aerated emulsion supply line when positioned up to about 90° upwardly or downwardly from the horizontal.

For the production of extremely fine bubbles in the aerated mixture, the port 45 of the distributor may be provided with a slicer or superturbulator 52, which is preferably in the form of a helix, as shown in Fig. 23C.

Figs. 26A to 26G inclusive show a number of variations of the possible setting of the distributors 43, previously referred to. Each aspirator, of which there is a series extending longitudinally in the flotation bath, feeds a number of distributors. In Figs. 26A, 26B and 26C, the aspirator 17 feeds a series of three distributors 43a, 43b and 43c. In Fig. 26A, the distributors are shown in horizontal alinement parallel to the surface of the bath. In Fig. 26B, the outside distributors 43b and 43a are set at an angle and, of course, considerably below the plane of the surface of the bath, the middle distributor 43c remaining horizontal. Obviously, as circumstances warrant, referring to the diagrammatic showing in Fig. 26B, the middle distributor 43c may be rendered inactive and, when so eliminated, the distributors 43b and 43a may be set horizontally or vertically to the plane of the bath. It is obvious from the diagrammatic showing that the distributors may be set horizontally or at any angle to the vertical or horizontal as may be dictated by the variable factors involved in the process, so as to produce added turbulence when needed, lessen the turbulence to a minimum, or substantially entirely eliminate the turbulence.

When using two or more sets of distributors located in different planes of the flotation bath, as shown in Fig. 13, the upper set of distributors may be of the type shown in Figs. 23A to 23C inclusive, and the lower set of distributors may be of the type shown in Figs. 24A, 24B and 24C inclusive, the setting being as diagrammatically illustrated. However, it is desired to point out that any of the various types of distributors capable of flexible movement hereinbefore referred to may be used in the setting shown diagrammatically in Fig. 26C, and further, this setting may be varied so as to have some of the distributors in each distributor plane at an angle and some horizontal, or some in each plane cut out as diagrammatically indicated in Figs. 26D, 26E, 26F and 26G. The vertical distance between the distributor planes may of course be varied and the distance to which the distributors project toward the cell wall 89A, as shown in Fig. 13, may be varied at will in accordance with the flotation bath used; the character of the material being treated, including whether it is in a granular or fine condition or is composite, carrying a mixture of fine and granular constituents; the amount of turbulence required or to produce a substantial absence of the same; the emulsion in circulation; the pressure under which the emulsion is introduced into the bath; and the size and number of the air bubbles contained in the aerated emulsion and the like.

The cell proper is provided with end walls 53 which are exactly alike, except that one is a left hand wall and the other is a right hand wall, thereby enabling a ready elongation of the cell proper by the insertion of an additional length of cell shell between the end walls. This construction further permits of the installation of overflow and gangue pumps at either end of the cell units without requiring reconstruction or even shutting down the operation of the cell. The end wall 53 therefore carries an integral part thereof, provisions for the overflow of the emulsion in circulation and outlets for the sink. Since both end walls 53 of the cell proper are alike in construction, the description of one will suffice. The end wall 53 is provided with a sink and overflow discharge port 54. Passing through this port is a conveyor 55, which is adapted to convey the sink from the bottom of the cell to the sink discharge port 58 as shown in Figs. 15 to 17 inclusive. The conveyor 55 is mounted on a shaft 56, supported by bearings 57. The partly depleted emulsion of the flotation bath passing through the port 54 rises upwardly through chamber 59 to the level of the overflow gate 60. The latter may be adjusted by means of a rack 61, actuated by a pinion 62 on shaft 63, and locked in any desired position by a cam 64 riding freely on shaft 63 as its fulcrum, and firmly held in place by a locking device of any suitable character, identified as an entity by the numeral 65. The overflow gate 60 moves in a guide frame 66, mounted between the overflow discharge basin 67 and overflow chamber 59. The upper end 53a of the end wall 53 serves as a mounting for the discharge and bearing ends of the float conveyor 91, the bearing end being indicated as an entity by the numeral 69. The bearings 70 upon which the skimmer or wiper 96 is mounted are located on the end wall 53 and may form an integral part thereof or be bolted thereto. The overflow discharge comprising the partly depleted emulsion passes through the overflow discharge basin 67 and the overflow discharge port 68, and is then returned to a decanting pit from which it is preferably introduced into the flotation bath either in its depleted condition or with the addition of a suitable emulsifying agent. The sink ejected through the sink port 58 passes into the receiving end 72 of a sink pump, identified as an entity by the numeral 73, as best shown in Figs. 18 and 19. The sink pump is fastened to support 71 on the end wall casing 53 by means of suitable bolts. The casing 73a of the pump 73 is bored as an assembly, including the receiving end 72, pump body 74, and discharge head 75 to permit the helical pump rotor 76 to rotate freely at high speed with the least possible clearance between the rotor 76 and the bore 76b of the pump casing 73a. The helical flights 76a of the rotor 76 are fastened to a pump shaft 77 in any suitable manner. The shaft rotates in bearings 78 and 79 at the receiving end and the discharge end respectively of the pump. The shaft 77 is actuated by a set of beveled gears 80, mounted on a shaft 81, and driven by means of a sprocket and gear arrangement conventionally indicated as an entity by the numeral 82, the sprocket and chain arrangement taking its power from the jack shaft 83, which in turn is driven by means of a sprocket and chain arrangement indicated as an entity by the numeral 84, and taking its power for the combined motor and reducing set 85.

The cell 86 may be of any desirable shape, but is preferably rectangular in plan, as shown in Figs. 3 and 6. The operating capacity of the cell is, of course, determined by its width, length and depth. In the cell shown, it is preferred to increase the capacity as required by increasing the length of the cell, the width and depth remaining substantially constant. The cell has a front wall 87, Fig. 10, which is preferably inclined, merging into a trough 88, which contains the sink conveyor 55. The trough 88 is preferably made detachable for ready removal in case of wear, and for repair to the conveyor 55, and therefore may be bolted or otherwise suitably fastened to the body of the cell 86. Extending from the conveyor trough 88 at a rather sharp angle is a wall 89, the angle of which is preferably eased towards the surface line of the bath X—X at 89b. Depending from the wall 89b is a trough 90a, adapted to contain the float conveyor 91, the trough merging into the rear wall 90 of the cell 86. The wall 89 is preferably broken near the surface of the bath to provide a wall 89b in order to permit the float to partially drain from the emulsion before passing into the float conveyor 91.

The cell 86 is preferably constructed of steel plates. However, it is clear that any suitable material may be used, and when electrical reactions are utilized, as for instance the introduction of ionized air or gas into the bath, or the production of electrical energy therein by reacting chemical solutions, the cell may be constructed of semi or non-conducting materials such as porcelain lined materials, rubberized or rubber covered products, fiber impregnated with rubber or latex, or other synthetic materials such as bakelite. Suitable supports may be also provided for the mounting of switch boards, and when using an ionizing chamber the latter may be positioned to reduce the distance through which the ionized air must travel towards the aspirators.

When the electrical reactions produced in the cell are no greater than that produced by ions entrained with free air or by frictional electricity originating from the impacting streams or jets of water or, by the reaction of acids present in the treated material, the cell may be built of cast iron, wrought iron, steel, copper, zinc, lead, aluminum, wood, or any combination of these materials, as for instance, lead covered wood. In Fig. 13, there is shown a cell unit constructed of cast materials instead of structural plate units, and the corresponding parts of the cell in Fig. 13 are numbered similarly to that shown in Fig. 10, but additionally have the letter A added thereto to clearly identify the corresponding parts. The cell 86a, shown in Fig. 13, has given especially satisfactory results when operating on graphite ores taken from mines at Goodwater, Alabama. The cell 86 shown in Fig. 10 has given especially satisfactory results when operating on blast furnace flue dust and coal originating in the Birmingham, Alabama, district.

The arrangement set forth in Fig. 13, and the remarks made describing the same, show the possibilities of the ready application of differential procedures of the general process as well as its adaptability to differential requirements.

The cell 86, Fig. 10, shows the float and sink conveyors as of substantially equal capacity as required for the separation of blast furnace flue dust, while the cell 86A shows the sink conveyor of a considerably larger capacity than the float conveyor as is desirable when treating graphite ores.

The float conveyor 91 is fastened to the shaft 92, which is mounted on bearings 69 of the cell. The shaft 92 of the float conveyor 91 is rotated by means of a sprocket and chain arrangement identified as a unit by the numeral 93, as shown in Figs. 1 and 2, power being taken from the jack shaft 83 which derives its power from a motor 85. At one end of the cell the float conveyor 91 discharges the float through a discharge head 94 as shown in Figs. 1, 2 and 18, the discharge head being located outside of the cell proper. Shaft 92 is elongated or continued through the discharge head to accommodate its own drive 93, as well as the drive for the sink conveyor, consisting of a sprocket and chain arrangement identified as a unit by the numeral 95. Employing this arrangement, the removal of sink and float may be proportioned in accordance with the requirements of the respective materials treated.

The skimmer, identified as a unit by the numeral 96, as shown in Figs. 10 and 13, is provided with a set of tight sprockets 97, suitably mounted on a shaft 98, and rotated by a sprocket and chain arrangement identified as a unit by the numeral 99, power being taken from jack shaft 7, as clearly shown in Figs. 1 and 2. A set of sprockets 100 rotate freely around the shaft 101 driven by chain 102, having suspended therefrom a series of wipers 103. The sprockets with their chains are placed close to the end wall castings, and shaft 98 rests in bearings 70 on the end wall 53. The idler shaft 101 is supported at each end and from end wall 53 by an adjustable link identified as a unit by the numeral 104. It may be stated that the depth to which the wipers 103 dip into the bath permits a variation in the two zones of the bath which exist at or near the surface of the bath, one of these zones being the charging zone adjacent feed conduit or spout 16, and the other zone being adjacent to float conveyor 91. By varying the position of the idler shaft 101, take-off zone may be shortened. To prevent possible distortion of the idler shaft, a bearing bar 105 is inserted.

For the application of acids or other chemical solutions to the bath, or for the creation of an additional zone of turbulence when required, as is necessary in the recovery of carbonaceous values from manufacturer's ashes, dumps and the like, aspirators 107 are placed above the front wall 87 of the cell unit 86, the turbulator pipe 38x being supported by nozzle bracket 106a, carrying a nozzle 106. The nozzle 106 is located intermediate of the feed streams, as shown in Figs. 7, 8 and 10, it being noted that the aerated emulsion and the feed at this point are both fed in the same direction. When treating blast furnace flue dust, the use of this auxiliary aspirator is not desirable, as it is essential to reduce the turbulence in the bath to a minimum. However, when treating waste coal from mines and the like where turbulations are desirable, the auxiliary aspirator comes into play.

The operation of the apparatus herein described will be illustrated with the treatment of flue dust from iron blast furnaces. However, it is desired to state that the present invention is not limited to the treatment of this material, as other materials are amenable to separation by the present process.

Blast furnace flue dust is a waste product of blast furnace operations in which ores are converted into metal. The amount of flue dust produced during blast furnace operations is quantitatively large and ranges from 200 to 800 pounds per ton of metal produced. Usually, as the dust leaves the conversion zones of the furnace along with the gases, it is settled or separated therefrom by special provisions in the various gas lines such as catchers, bins and baffles, or by the Cotrell process of electrical precipitation in which the dust is exposed to an ionization treatment. In some cases, the gases may be passed through special washers to remove the dust.

As the smelting conditions vary not only in each individual furnace, but also in each run of the same furnace, the resulting flue dust represents to an extreme degree the variations in operation. Such variations are frequently due to positively uncontrollable operating conditions, and depend on all or some of the following factors: kind of ore treated and its relationship to the companion charges of coke and limestone, this including the individual divergencies of the composition as well as the weight relations; variations in temperatures in the furnace; the pressure and velocity of the blast applied; the density and velocity of the gases produced and the manner of collecting, that is, by natural settling or purification methods, as hereinbefore referred to. Particular reference may be made to the fact that slips often occur in blast furnaces producing sudden changes in the composition of the waste product, and that the granularity of the flue dust is changed out of all proportion to the usual run of the furnace.

Under regular operating conditions and with the charges, temperatures and blast substantially uniform, the degree to which the ore is crushed, that is, the amount of fines carried thereby, the cleanliness of the coke and its hardness are additional factors which exert their effect on the flue dust. It is, therefore, clear that the chemical composition of the flue dust varies widely, depending on the conditions under which it is produced.

Several analyses are here given of flue dust originating in blast furnace plants of the Birmingham district, and were taken from accumulations without any regard to operating conditions. Some of these have been taken from dust catchers or collectors in hot or cold condition; others from electrical precipitating operations; and still others from culm piles in order to establish, if possible, a true characteristic of the material.

In the tabulation below, iron, carbon and ash contents of the flue dust are set forth, and included in the carbon are other combustibles which appear in the material in infinitesimally small quantities, such as phosphorus and sulfur, ranging in quantity from traces to 0.22% and 0.16% respectively. The ash is substantially free from iron but includes some insolubles. The iron may be found in the flue dust in the form of partly converted ore or metallic iron particles. The following table is based on analysis made at Tuscaloosa, Alabama, by the United States Bureau of Mines and the inventor's laboratory.

The following analyses are representative of flue dust originating in the Birmingham district, Samples 8 to 10 inclusive having been subjected to the flotation process herein set forth:

| Sample | Iron % | Carbon % | Ash % | Apparent specific gravity |
|---|---|---|---|---|
| 1 | 21.6 | 31.0 | 47.4 | ⎫ |
| 2 | 22.1 | 26.9 | 51.0 | ⎪ |
| 3 | 24.3 | 30.5 | 45.2 | ⎬ Tuscaloosa Station, Bureau of Mines. |
| 4 | 29.6 | 11.9 | 58.5 | ⎪ |
| 5 | 30.0 | 18.5 | 61.5 | ⎪ |
| 6 | 36.8 | 15.7 | 48.5 | ⎪ |
| 7 | 45.8 | 11.1 | 43.5 | ⎭ |
| 8 | 14.8 | 48.8 | 36.4 | 1.050 ⎫ |
| 9 | 18.9 | 37.6 | 43.5 | 1.060 ⎬ Tschudy Laboratory. |
| 10 | 22.1 | 38.0 | 39.9 | 1.206 ⎭ |

One of the most difficult factors to be considered in the separation of flue dust is the granularity of the material. This is as irregular and as variable as the chemical composition of the material. The granularity varies all the way from 200 mesh to lumps which will not pass through a two inch sieve. The average granularity ranges from one-quarter inch to 200 mesh and the percentages of the various sized material again differs greatly. The United States Bureau of Mines has determined the granularity of the blast furnace flue dust represented by Samples 1 to 7, of which a chemical analysis has already been given. The following tabulation represents the result of the analyses as to granularity:

| Sample No. | 1 | 2 | 3 | 4 | 5 | 6 | 7 |
|---|---|---|---|---|---|---|---|
|  | Pct. | Pct. | Pct. | Pct. | Pct. | Pct. | Pct. |
| Plus 8 | 0.0 | 6.9 | 0.1 | 7.0 | 0.4 | 1.9 | 8.4 |
| −8+10 | 0.0 | 6.0 | 0.1 | 2.4 | 0.8 | 1.5 | 6.6 |
| −10+14 | 0.0 | 6.9 | 0.3 | 2.8 | 1.5 | 1.9 | 8.0 |
| −14+28 | 0.0 | 27.4 | 5.3 | 13.0 | 14.3 | 12.8 | 28.1 |
| −28+35 | 0.5 | 15.5 | 10.2 | 12.2 | 13.4 | 14.1 | 14.4 |
| −35+48 | 3.6 | 14.8 | 20.8 | 16.3 | 16.2 | 19.0 | 13.5 |
| −48+65 | 11.8 | 9.2 | 19.6 | 14.0 | 12.6 | 17.0 | 8.0 |
| −65+100 | 20.4 | 5.7 | 15.8 | 12.5 | 11.0 | 13.5 | 5.7 |
| −100 | 63.7 | 7.6 | 27.8 | 19.8 | 29.8 | 18.3 | 7.3 |

The analysis for granularity on Sample No. 10 which has been treated by the process herein disclosed, gives the following results, it being noted that the apparent specific gravity is indicated in this table and hereafter by the abbreviation Ap. S. G., this analysis being carried out in the Tschudy Laboratory in Ensley, Alabama, sieves having decimal divisions being used:

*Sample No. 10*

| | | | |
|---|---|---|---|
| Plus 10 | 0.28% | at ____ | Apparent specific gravity |
| −10+20 | 4.68% | at 0.538 | Apparent specific gravity |
| −20+50 | 49.74% | at 0.915 | Apparent specific gravity |
| −50+80 | 35.80% | at 1.200 | Apparent specific gravity |
| −80+100 | 8.83% | at 1.273 | Apparent specific gravity |
| −100 | 0.67% | at ____ | Apparent specific gravity |

The following table shows the iron, carbon and ash content of different sized portions of Bureau of Mines Samples 1 and 7.

| Sample No. | Iron % | | Carbon % | | Ash % | |
|---|---|---|---|---|---|---|
|  | No. 1 | No. 7 | No. 1 | No. 7 | No. 1 | No. 7 |
| Plus 8 | 0.0 | 24.6 | 0.0 | 37.35 | 0.0 | 38.05 |
| −8+10 | 0.0 | 40.3 | 0.0 | 19.53 | 0.0 | 40.17 |
| −10+14 | 0.0 | 45.7 | 0.0 | 13.51 | 0.0 | 41.68 |
| −28+35 | 1.5 | 49.3 | 83.24 | 6.36 | 15.23 | 44.34 |
| −35+48 | 1.6 | 48.4 | 83.83 | 5.44 | 14.57 | 46.16 |
| −48+65 | 5.4 | 47.0 | 69.04 | 7.01 | 25.56 | 45.99 |
| −65+100 | 13.6 | 46.4 | 43.34 | 8.03 | 43.06 | 45.99 |
| −100 | 28.8 | 45.9 | 16.22 | 7.05 | 54.98 | 47.05 |
| Composite | 21.6% | 45.8% | 31.0% | 11.1% | 47.4% | 43.1% |

The following table is an analysis made in the Tschudy Laboratory of the different sized portions of Sample No. 10.

| Sample | Iron % | Carbon % | Ash % | |
|---|---|---|---|---|
| Plus 10 | 8.82 | 67.90 | 23.28 | _____ |
| −10+20 | 3.11 | 72.30 | 24.59 | _____ |
| −20+50 | 15.50 | 50.50 | 34.59 | _____ |
| −50+80 | 23.26 | 18.60 | 58.14 | _____ |
| −80+100 | 29.43 | 24.10 | 46.47 | _____ |
| −100 | | | | 0.67% |

In view of the above, it is obvious that in general, blast furnace flue dust is to be considered as a material of which the only constant characteristics are that it contains iron, carbon and ash, but in ever-varying relationship as to the amounts of these constituents and their physical condition.

It has heretofore been proposed to separate the iron constituent of blast furnace flue dust, disregarding the recovery of the coke in any commercial form. Gravity separation such as shaking tables, centrifugal tables and wind chambers have been tried. In the methods of this class, the fine dust which carries a preponderant amount of iron, persistently remains with the coke and can not be separated by any known means. When treating flue dust by these methods of separation, the fine particles of the coke are held to the particles of iron not only by their respective electrical reactions but also by virtue of the well known law of adhesion of rough particles to other particles having similar rough surfaces. When using a process of magnetic separation, the fine coke also adheres to the fine iron and therefore the iron remains with the larger granular coke and the non-magnetic iron also remains with the coke. When using the wet magnetic cobber process, the fine ore dust also sticks to the coarse coke due to the adhesion of the dust to the coke by virtue of the moisture present. When using the magnetic log washer, it is necesssary to crush to below 100 mesh, and this produces difficulties. Ball mills, pulverizers, grinders, hammer mills, etc. have been used in an effort to reduce the material to a uniform mesh, but have been extremely unsuccessful.

In the previous methods employed for the treatment of flue dust, the object of the separation has been primarily to recover the iron and not to recover a carbonaceous material of relatively high purity adapted for use as a fuel. With the advent of pulverized fuel firing, the waste known under the commercial name of flue dust assumed great importance as it contains an iron constituent and a carbonaceous constituent which if properly separated will each yield a valuable product and each serve individually its industrial utility.

Experiments carried on and resulting in the present invention indicate clearly that the wetting of the flue dust aggregate greatly increased the difficulties attendant to the recovery of its valuable constituents, and particularly the fine coke, as previously described. The coke present in flue dust, and particularly the large granular coke, is very porous and absorbs almost immediately on contact oil as well as moisture, thereby becoming sticky. This results in the particles of the fine dust-like ore, the ash present in the mixture, and the fine coke, adhering to each other with the formation of balls or lumps. Early experiments clearly indicated that the charging of the flue dust in a wet or moist condition prevented a completely satisfactory recovery of relatively pure iron and carbonaceous values. Therefore, in the present process, the flue dust is preferably charged in the dry state over the surface of the bath to insure a maximum recovery, although the broad invention herein set forth is not limited to dry charging; this merely being, as indicated, a preferred mode of operation, especially applicable when treating flue dust or similar composite materials.

Some of the larger particles of the coke, and this is particularly true of that portion of it known under the trade name of "Sponge", have an apparent specific gravity considerably below that of water, and therefore, require a minimum of flotation-reaction but, on the other hand, it also absorbs more readily, due to its porosity, a liquid. Further, being lighter than water, this particular component of the charge floats very readily and in so doing acts as a vehicle for the fine coke, keeping it on the top of the flotation bath by virtue of the adhesion effect previously referred to, and prior to the time it would sink through the bath. Therefore, in accordance with the present process, a very large proportion of the coke is recovered at or near the surface of the bath, and prior to sinking into the bath, forming a partial surface separation. It may be mentioned at this point that graphite, waste coal, city dump ashes, and a number of other materials are found which may be reduced to a mixture of granular and fine material, and that they act, as far as the relationship between the granular and fine particles present therein, as herein disclosed.

Various flotation oils can be used in the present process, provided they possess the proper viscosity, so that they are not materially absorbed or adsorbed by the large porous granular particles and, in particular, the granular coke. When the present invention is applied to the treatment of blast furnace flue dust, the most satisfactory results are obtained when using a flotation agent containing as a constituent thereof the light distillates of mineral oils. Carbon bisulfide, benzol, xylol, and solvent naphtha and the like react fairly well in the bath, but in some cases produce a stratification or zoning effect which is not desirable. In other words, it is desirable to use a flotation agent which will assist the coke constituent of the flue dust mixture in raising the coke instead of sinking the same.

Of the various flotation agents which may be used, it is preferred to use a water soluble oil in order to prevent the formation of a brittle film on the surface of the bath. Using a water soluble oil, there is produced what might be termed a surface foam which occurs on the water surface of the bath in the form of a cream-like aerated emulsion. This cream-like aerated emulsion contains bubbles of comparatively infinitesimal size and uniformity and these, on breaking at the surface of the bath, do not create a violent explosion of the bubble as is characteristic of the ordinary flotation froth or film.

In connection with the present invention, it may be stated that the composite materials are preferably treated either in a full or semi-granular state. As an example of a composite full granular material, the size thereof may range from below 200 mesh to above 3/8 mesh, while semi-granular composite material may range from below 200 mesh to about 20 mesh. It is to be understood that these examples are illustrative and not by way of limitation, as the above set forth ranges may be varied considerably and still come within the spirit of the invention. Examples of full composite granular material are flue dust, manufacturer's ashes, ashes from city waste dumps, waste from coal mine culm piles, high sulfur and high ash coals; semi-granular composite materials, for example those permitting disintegration below 20 mesh, are graphite, pulverized coal, coal-bugdust, phosphates and the like. Here again, the materials set forth are illustrative and not by way of limitation. It is, of course, obvious that for each specific composite material there is a preferred size-condition best suited to produce most efficient results in carrying out the process, and this may require screening to a certain size and afterwards crushing, as for example in treating ashes from dump piles.

In treating blast furnace flue dust, the material in its granular condition is fed into conveyor 1, running lengthwise of the cell unit 86. For proper maintenance of the mixture, the conveyor which is preferably of the helical screw type, is rotated at a moderate speed, avoiding the formation of dust or separation of the granular material by action of centrifugal force. It is preferred that the capacity of the conveyor 1 should be such that at no time will the material build up at a greater depth than one inch from the bottom of the conveyor trough in order to avoid stratification of the dust towards the bottom thereof. The material passes from the conveyor by feed conduits 2 to the feed casing 10 and the screw conveyor 11. There are a series of feed conduits 2 and feed casings 10 and the feed conveyor 4 progressively fills all the feed casings 10. Screw conveyor 11 pushes the material from the receiving end towards the discharge end in due relation to the number of rotations of the drive shaft 12 into a series of feed discharge spouts 16 from where the material drops preferably in two separate streams through legs 16a and 16b downwardly over the regions of the bath level X—X. In order that the feeding of the material may be accomplished in the most accurate manner, the speed of the screw conveyor 11 is adjusted, so as to constantly feed a specific volume of material per revolution, so that the material dropping through feed discharge conduits 16 is minutely proportioned.

In one of the experiments, a two-inch conveyor, of the type described, fed the following amount of composite blast furnace flue dust per revolution:

| No. of revolutions | 1 | 2 | 3 | 4 | 5 |
|---|---|---|---|---|---|
| Delivery in grams | 62.5 | 119.6 | 185.1 | 245.7 | 301.0 |
| Delivery in c. c. | 50.0 | 100.0 | 150.0 | 204.0 | 250.0 |
| Delivery in cu. inches | 3.0 | 6.1 | 9.1 | 12.3 | 15.3 |

The above table emphasizes that there is no specific relationship between the volume and the weight of the flue dust, this of course being expected in view of the fact that a composite material composed of granular and fine particles is constantly being fed. The charging of the material is accomplished in the dry state, as this gives the most satisfactory results. However, when the material has been once partially separated or concentrated, it is not necessary to feed this material in a dry state, as the process is operative on the partially concentrated material fed in a partially wet state containing a substantial proportion of moisture or water which may approximate in some cases a semi-liquid condition. In other words, after the sink is obtained by the concentration of flue dust, it may be retreated or refined in fairly wet state, or in its discharge state, since the dangerous dust coke has been removed. Coal and graphite in all cases can be retreated in a wet state after removing the fine dust, and sometimes it is advisable to retreat the coal to remove the sulfur. Either sink or float can be retreated in this manner, depending of course on the character of the material. It may be pointed out that one of the features of the present invention is the production of commercial products by a single pass through a flotation cell. While this is the preferred mode of operation, under some conditions it is desirable to further concentrate the sink and float, and this is particularly true when treating coals. However, when treating blast furnace flue dust, separate iron and coke products are obtained which are of a remarkable degree of purity and capable of commercial utilization in that state, and this by one pass through the flotation cell.

In some cases, it is desirable to provide an auxiliary regulation of the feeding. Such auxiliary regulation is provided by the use of slide valves 3 positioned in the feed conduits 2. By this arrangement, the supply of the feed may be nearly stopped, or it may be regulated to flow into the feed chambers 10 in any desired quantity. In treating blast furnace flue dust, where the relationship between gravity and granularity of the material changes often and suddenly, the auxiliary regulation referred to is very desirable, so as to fully regulate the distribution of the feed over the level of the bath. A series of feed discharge spouts 16 are provided, so as to discharge the feed at precisely allocated points. Very satisfactory results have been obtained by spacing the feed spouts 2 eighteen inches apart, and the discharge spouts 16 nine inches apart, regularly over the entire length of the bath, as indicated clearly in Figs. 3 and 6. By this arrangement, a stream of material is dropped on to the surface of the bath every nine inches of the full length thereof and thereby proper distribution is obtained.

The above clearly brings out that in accordance with the present process the material treated is charged in a composite condition including a granular constituent, preferably in the driest state possible, and in strictly proportioned quantities mechanically controlled and maintained. Further, the feed is distributed over and above the surface of the bath level in precisely allocated points, and in a specific sphere of reaction.

In describing the passage of the circulating emulsion from its source to the bath, reference will be made to the use of a partially depleted emulsion from a prior operation of the cell, although it is obvious that in starting up the cell it will be necessary to produce an emulsion by the use of fresh water in conjunction with an emulsifying agent. The circulating emulsion, which may have a very small quantity of oil added thereto if necessary, is conveyed to the aspirators 17 and 17a, positioned at specified intervals along the length of the cell. The partly depleted circulating emulsion which may have oil added thereto if necessary, enters the aspirator under the desired pressure through the pressure inlet port 18, and then into chamber 19a, the function of this chamber being to reduce friction and prevent the accumulation of dirt above the primary aspirator nozzle 22. By virtue of the pressure in chamber 19a, the emulsion passes through the primary aspirator nozzle 22, accelerating its speed when passing through said nozzle in accordance with the relationship between the pressure prevailing in the supply chamber 19a, the diameter of the bore 22x, and the length of the nozzle 22, but also quantitatively conditioned by the same relations. The circulating liquid issuing from the discharge end of primary nozzle 22 is forced, by reaction of its own original pressure as well as velocity, into secondary Venturi tube 28 in which the entrance velocity of the original stream issuing from nozzle 22 is radically changed as to pressure and velocity. Obviously, the volume passing per unit of time is also changed. The discharge end of the nozzle 22, and the inlet opening of the tube 28, are precisely finished to form in their setting a port A, as clearly pointed out in describing the construction of the aspirator proper. The velocity impact created by nozzle injection produces a suction effect in chamber 24 in due relation to the velocity of the water emerging from nozzle 22, and the impact created thereby on tube 28, conditioned by the vertical distance between the two nozzles forming port A. This suction in its initial strength is exerted through port 25 and intake 26 either on free air or on the pipe system conveying treated gases attached to or connected to air inlets 26. Free air is taken in in due relation to the suction created in chamber 24. When using treated gases, and particularly ionized air, the latter is pulled by suction through the pipe system and inlet 26 into chamber 24. The same suction effect is exerted on oil ports 27 which are connected to the oil supply or feeding system by which the oil or any other emulsifying agent required for the emulsification of the circulating medium is brought into chamber 24 of the aspirator 17. In order to fully control the amount of oil to be withdrawn by the suction through port 27, special oil feeders 33 are provided. From the oil supply (not shown), the oil or the emulsifying agent flows by gravity into chamber 35, the supply line thereof being provided with an air vent, as is essential in the operation of vacuum systems. The flow of oil from the chamber 35 is regulated by a needle valve 36, and the oil sucked through port 37 into the sight feed drum from which it flows under the existing suction created through port 27 into chamber 24. It is to be noted that the emulsifying agent, preferably oil, and the gaseous agent, preferably air, are in contact for the distance between the port 27 and the chamber 24, and that these components are thoroughly mixed. The premixed air and emulsifying agent are quantitatively proportioned by the various regulating and control devices forming a secondary control, as will be later described, but primarily by the reactions produced by the pressure at nozzle 22 and the port opening A. The suction thereby created forces the mixed gas and emulsifying agent, preferably air and oil, through port A where the two are quasi-mixed with water. As air and water will not form a homogeneous mixture, the air by force of circumstances forms at the port entrance A bubbles, which are covered with an oil film before they issue from the secondary aspirator Venturi tube 28. The turbulence created by the suction in intake 26 and adjacent oil port 27 has an atomizing effect on the emulsification agent. However, at low suction, these turbulations may not be sufficient to produce atomization, and oil therefore may flow in a comparatively solid stream to chamber 24 and port A. This fact does not change the effect created by the conditions at port A previously described. Port A serves to create bubbles of a size limited by the distance between the end of the primary aspirator nozzle 22 and the upper end of the secondary aspirator Venturi tube 28, so that the bubbles primarily formed reach the lower end of the tube 28 in a certain predetermined size, and this in due relationship to the amount of water injected and the amount of air entrained through the specific port opening A. Aerated emulsion flows through the discharge end of secondary Venturi tube 28 under a greatly reduced pressure from that prevailing at the discharge end of primary aspirator nozzle 22. The aerated emulsion preferably passes from the secondary Venturi tube 28 into the expansion chamber 39 when the latter is used. The reduction of pressure at the end of Venturi tube 28 and the upper portion of the expansion chamber 39 is correlated to the amount of air entrained with the discharge from Venturi tube 22 which is dependent on the variable inside diameter of Venturi tube 22, as well as length of the Venturi tube and the initial pressure in chamber 19. The passage of the aerated mixture through the expansion chamber 39 is merely a preferred mode of operation. Under some circumstances, the aerated emulsion may be passed directly to the distributors, but the best results are obtained when employing an expansion chamber.

In order to indicate how the aspirator may be made to function under different conditions when treating flue dust, experiments were carried out to show the quantitative discharge of the aspirators under various pressures as well as the suctions produced, this including those created under low pressure, showing that such low pressures may be effectively used in flotation work.

The following table shows the effect of varying the pressure at water inlet 18a, keeping the inside diameter of the Venturi nozzle 22a constant and varying the diameter of Venturi nozzle 22a. The table also shows the number of gallons per minute issuing from Venturi nozzle 22a, when the pressure is kept constant and the bore 22y of the nozzle 22a is changed.

*Discharge capacities of aspirator 17A in gallons per minute*

|  | No. 1 | No. 2 | No. 3 | No. 4 |
|---|---|---|---|---|
| Nozzle bore 22y | 0.111″ | 0.101″ | 0.096″ | 0.068″ |
| Tube bore 28y | 0.135″ | 0.135″ | 0.135″ | 0.135″ |
| Port A | 0.06″ | 0.06″ | 0.06″ | 0.06″ |
| Pressure at inlet 18A: |  |  |  |  |
| 10 lbs. per sq. in | 1.396 | 1.111 | 0.791 |  |
| 15 lbs. per sq. in | 1.583 | 1.250 |  |  |
| 20 lbs. per sq. in | 1.916 | 1.396 | 1.041 | 0.750 |
| 25 lbs. per sq. in | 2.125 | 1.417 |  |  |
| 30 lbs. per sq. in | 2.271 | 1.500 | 1.250 | 0.833 |
| 35 lbs. per sq. in | 2.375 | 1.583 |  |  |
| 40 lbs. per sq. in | 2.500 | 1.666 | 1.417 | 0.945 |
| 45 lbs. per sq. in | 2.583 | 1.708 |  |  |
| 50 lbs. per sq. in | 2.750 | 1.791 | 1.500 | 1.000 |
| 55 lbs. per sq. in | 3.000 | 1.833 |  |  |
| 60 lbs. per sq. in |  | 1.896 | 1.625 | 1.082 |

The following table shows the suctions produced and maintained in the air suction pipe 26 when using aspirator 17 with a primary aspirator nozzle in which 22x equals 0.154 inch and the diameter 28x of the Venturi nozzle 28 equals 0.315, the vertical distance of port A being 0.1 inch.

| Pressures in pounds per sq. inch at inlet 18 | | | | | | | | |
|---|---|---|---|---|---|---|---|---|
| 5.0 | 7.5 | 10 | 15 | 20 | 25 | 30 | 35 | 40 |
| Vacuum in inches of mercury at inlet 26 | | | | | | | | |
| 15.0″ | 18.0″ | 20.5″ | 26.5″ | 27.7″ | 27.8″ | 27.8″ | 27.8″ | 28.0″ |

It is clear from the above that the aspirator functions first to maintain the required emulsion in circulation under an initial pressure which may vary greatly at the water inlet of the aspirator, and that the water under this pressure in passing through the primary Venturi nozzle 22 creates a suction and hence induces an air supply. An emulsifying agent which may consist of several oils when desirable, or an admixture thereof, is entrained with the air and passes through the port A to form bubbles in the circulating medium, the size and volume of which are under the fullest control. A control is also had of the volume of air or gas entrained, the amount of water injected, as well as the final pressure produced as the aerated mixture passes into the expansion chamber 39.

A review of the aspirator operation using either aspirator 17 or 17a shows that water or a weak circulating emulsion is introduced into the aspirator under a definite pressure which may be varied from as low as five pounds per square inch, or even lower depending on the hydraulic head to be overcome, to any economical operating pressure, varying upwards to eighty pounds per square inch and greater. Thereafter, the circulating emulsion passes through a primary aspirator nozzle, the size of which is under definite control including length and inside diameter, and therefore, the circulating emulsion can issue from the primary aspirator Venturi tube at any desired pressure or velocity and in any desired volume. Air may be passed into the intake 26 and oil taken in through the intake 27. The mixture after passing through port 25 into the mixing chamber 24 is allowed to meet the issuing circulating emulsion coming through the Venturi nozzle at any desired pressure or velocity, or in any desired volume. Therefore, there is a mixture of air conditioned as to its electrical characteristics if desired, with oil meeting a stream of circulating medium produced as described. The suction present in chamber 24 depends on the pressure and velocity of the stream of circulating emulsion issuing from the primary aspirator nozzle 22 and the impact produced by its passage through the upper portion of the secondary Venturi tube 28. There is, therefore, a control over the volume of air passing into the circulating emulsion by way of the port A and the size of the bubbles produced by this air when it is entrained into the circulating emulsion to produce the aerated emulsion. Given a constant pressure and a Venturi nozzle 22 of a certain diameter and a port A of a certain opening, a constant suction is produced which will regulate the size of the air bubbles and the amount of air taken in. If this setting remains constant and the pressure at which the circulating emulsion is introduced is varied, the size of the bubble and the volume thereof introduced to form the aerated mixture can be varied. If the tube 22 is changed and the other variables remain constant, the size of bubble and amount of air taken into the aerated mixture can be regulated.

The aerated emulsion produced as described passes from the end of the secondary aspirator Venturi tube 28 under a greatly reduced pressure, but with considerable velocity into an expansion chamber 39. The upper portion of the expansion chamber 39 is located preferably above the dead water level X—X, which also indicates approximately the top of the aerated emulsion layer X—X of the bath. The level X—X of the bath reflects inside of the expansion chamber 39 exactly to that extent as permitted by the aerated emulsion of the bath proper. The line X—X represents the actual water level of the bath when the process is initially started. As the apparatus functions and the water becomes aerated, an intense emulsification occurs, and therefore the actual water level shifts from the dead water line X—X to a point materially below the line X—X, and this new water level is reflected in the expansion chamber 39. Therefore, in actual operation, the dead water level becomes in effect substantially the lower surface of the emulsified cream. In the chamber 39, the bubbles formed under the original pressure created at the port A of the aspirator have an opportunity to expand due to the reduced pressure existing in the expansion chamber 39, the oil films on the bubbles expanding in like proportion, that is, the film thins out proportionately.

In the passage of the emulsifying medium through the aspirator 17 and the expansion chamber 39, there is of course produced, as is well known in the art, an electrical reaction which is uncontrollable. The natural electrification of the air bubble is negative and the natural electrification of the water solution is always positive. The electrical charging of the emulsion may be produced by the introduction of ionized air or gases into port 26, in which case the air bubbles may be charged either positively or negatively, hence the liquid in circulation may also be either positively or negatively charged. In other words, natural electrification, as stated, is uncontrollable, while ionization of the air artificially induced is controllable both as to polarity and/or potency. The ionized air may be produced by passage over a corona discharge, as set forth in my United States Patent No. 1,840,267, January 5, 1932. The aerated emulsion, after partial adjustment of the bubbles to the prevailing pressure inside of the expansion chamber 39, passes through the manifold 40 and into turbulating conduits 38a, 38b and 38c. In the passage through the turbulators, the bubbles are turned and whirled around along the periphery of the inside diameter of the turbulating elements through which the emulsion is passing, and in this manner there is actually formed an aerated electrified emulsion outside of the bath and prior to its introduction into the bath proper. The turbulator, in other words, is a refinement which prevents the formation of large bubbles in the passage of the aerated emulsion from the aspirator to the bath proper. It is, of course, obvious that the aerated emulsion may be taken from the aspirator 17 and passed directly to the bath. However, the use of an expansion chamber 39 and turbulator 38, and also a distributor 43, as has been hereinbefore described, functions to produce refinements in the character of the aerated emulsion and the bubbles therein, which place the process under substantially complete control. While the turbulator does not require any mechanical control, for practical reasons a valve 41 is inserted in each of the turbulator pipes 38a, 38b and 38c, and may be used as an auxiliary control.

The aerated emulsion after passing through the turbulators 38a, 38b and 38c is distributed at a predetermined level and zones in the bath by means of distributors 43, which may be of any of the types hereinbefore disclosed.

The emulsion after passing through the turbulators 38a, 38b and 38c enters the corresponding distributors. The action of the aerated emulsion will be described in connection with its passage through a single turbulator 38a, and its passage into a single distributor 43, it being obvious that the remainder of the turbulators and distributors act in the same manner and that the distributors are interchangeable. The aerated emulsion enters the distributor 43 through the inlet port 45, and passes into the distributor chamber 44. It is to be noted that the pressure of the emulsion entering the distributor chamber 44 is again reduced therein, due to the fact that the bubbles present in the aerated emulsion will show a tendency to expand, as long as the pressure to which they are subjected is greater than that pressure induced by the hydraulic head of the bath. It may be stated that, of course, the pressure due to the hydraulic head of the bath is greater in the zones immediately adjacent the distributor 43 than in the upper portion of the bath. Therefore, the pressure at the distributor nozzles must be maintained slightly higher than that hydraulic pressure induced by the depth of the bath.

The aerated emulsion passes from the distributor 43 through the nozzle orifices 46x, and then out of the nozzles 46a, 46b and 46c. These nozzles act as a proportioner for the size of the bubbles as well as for the volume of the bubbles present in the aerated mixture. As the emulsion in its aerated state consists not only of bubbles but of a proportionate volume of liquid, the orifices in nozzles 46a, 46b and 46c must be proportioned in due relation to the volume to be passed therethrough and the respective back pressure present in the turbulator so that the bubbles issuing from the distributor nozzle have sufficient pressure or velocity to overcome the pressure due to the hydraulic head of the flotation bath. Again, the inlet ports of the nozzles 46a, 46b and 46c must be proportioned between themselves in due relation to the pressure, so as to permit an equal stream to issue with equal force from each of the nozzles of the distributor. The variations in the orifice inlets 46x are indicated in tables hereinafter set forth. For example, the end nozzles 46c may each have an inlet orifice 46x of a diameter substantially the same as the diameter of the primary aspirator nozzle 22. Therefore, it is clear that the sum of the port area of the nozzles of the distributor 43 is by far larger than the area of the primary aspirator nozzle through which the original circulating emulsion is brought to the distributor and ejected therethrough under pressure through the nozzles.

The distributors shown in Figs. 23A, 23B and 23C are preferably used when treating flue dust in the manner shown in Fig. 10. However, when it is desired to treat a material such as refuse water from mine washing tables concentrating coal, such water carrying coal bugdust, it is desirable to use a distributor such as shown in Fig. 24. When mine water of the character described is used, the bugdust contained therein will form a stabilizing zone in the bath immediately over the region into which this mine water has been distributed, and the fine bugdust will act as riders or carriers for heavier coal material charged simultaneously through the feeder system 10 and distributing spouts 16 over the top of the bath.

The location of the distributors 46 inside of the bath naturally depends on the functions which they must fulfill and this in turn depends upon the character of the material treated, which again influences the desired zones of reaction. Fig. 10 shows the setting of a distributor 43, together with its nozzles 46 as applied to the separation of values from blast furnace flue dust. A series of said distributors are located longitudinally of and in the bath at predetermined allocated points. The discharge issuing from the distributors 43 is shown in dotted lines in Figs. 10 and 12. Although this is the preferred arrangement, it is obvious that when using different types of distributors, the impingement zones will be somewhat different. The impingement zones are defined by the dotted lines shown in Figs. 10 and 12, and show the aerated emulsion impinging on the front wall 87 of the cell unit 86. As shown in Fig. 12, there is provided a number of distributors 43 along the selected zone line of the bath, there being preferably three distributors 43 for each aspirator 17 serving a capacity length of eighteen inches. The distance between the center lines of the three distributors 43 is therefore six inches, so that an equal distribution of aerated emulsion is effected over the entire length of the cell 86 between the ends 53. The setting of the aspirator nozzles 46 in each of the distributors 43 depends on where it is desired to impact the ejected stream on the wall 87 of the cell 86. Therefore, the distance which the nozzle 46 is placed from the wall 87 of the cell 86 depends on the force of impact required for the distribution of the aerated emulsion and the bubbles contained therein over the operating zone in a positively uniform manner, and in the preferred form of the invention without the creation of a violent or even perceptible turbulence in the bath. When treating blast furnace flue dust, it is of paramount importance to avoid the creation of any turbulence whatsoever, and therefore, the actual force of the jets of aerated emulsion ejected from the nozzles 46 of the distributors 43 should be substantially spent by the impact of the streams on the wall 87 of the cell and the bubbles, therefore, permitted to rise, as stated later on. The distance between the aspirators and the distributors as given is merely illustrative of one possible setting. These distances, and therefore the zones which are created, may be varied to satisfy the circumstances of the case, and therefore, the present invention is not limited to the specific zoning set forth, although such zoning when used in the concentrator having a capacity of one ton for ten hours has given excellent results.

When passing the aerated emulsion into the bath, it is desirable when treating flue dust that the emulsion issue from the distributors 43 at a pressure just sufficient to give a slight impingement on the wall 87 of the cell, and then have sufficient energy remaining to carry the air bubbles substantially perpendicularly up through the bath just overcoming the hydraulic head of the bath. When this state of conditions is present there is produced a cream adjacent the surface of the bath having bubbles of substantially infinitesimal and uniform size and these bubbles, due to the energy contained of the character just referred to, break on the surface of the emulsion with very little excess pressure, yet sufficiently to form a fog over the surface of the bath. In accordance with the excess pressure at the distributor nozzles 46 over the head of the bath, the depth of this fog, noticeable at the surface of the bath and over the cream, may be regulated to any desired degree. By the regulation of this excess pressure, the total pressure to which the fine particles of the flue dust entering the bath are subjected can be precisely regulated. It is not desired to indulge in any theoretical statements as to what occurs, but it is a fact that when the composite flue dust containing granular particles and fine particles is fed on to the bath through a series of feed spouts 16, the creamy emulsion and the fog thereover function so as to catch a large proportion of the coke present in the mixture, and so in this manner effect what may be termed a surface separation. A minor portion of the coke present in the mixture of the flue dust fed sinks with the metallic portion of the feed through the flotation bath, but is caught in the bath at a point above the distributors and projected up into the cream emulsion and the latter is then removed by means of the skimmers 103, dipping into the cream at and near the surface of the bath. It is clear that operating as set forth, there is a separation which may be termed a surface separation of the coke from the metallic constituents of the feed. Further, the purity of the coke can be regulated by regulating the depth of immersion into the bath of wipers 103. If the wipers 103 are taken out of the bath entirely, a very pure granular coke with very little dust is obtained, the latter sinking through the bath and going with the sink. It is to be noted that the speed with which the wipers 103 pass over and through the bath surface and the layer adjacent thereto may be regulated from fast to slow by the change of gear ratio of drive 99, as shown in Fig. 2. In Fig. 3, three wipers 103 are provided, but it is obvious that the number thereof may be increased or decreased as circumstances warrant. The speed with which the wipers 103 pass through the bath depends on a number of factors, including the character of the flue dust being treated and the percentages of granular and fine constituents present in the composite feed, it being borne in mind the size of these ingredients varies between exceedingly wide limits. The depth to which the wipers 103 dip into the creamy layer may be varied by adjustment of the position of shaft 101 through link 104, thereby permitting the formation of two zones at or near the surface of the bath, one of which may be termed the charging zone located adjacent to feed conduits 16, the other zone being the take-off zone and extending from the point where the wipers 103 initially penetrate the fog zone over the bath and the creamy surface of the bath. In Fig. 10, the line Y—Y shows the zones for the particular setting shown. This line of demarcation between the respective zones can be changed at will by the regulation described, and therefore is a variable line of demarcation. The line Y—Y will vary according to the proportion of granular and fine constituents in the flue dust charged, it being borne in mind that this feed is composed substantially of metal constituents and carbonaceous materials, the metal constituents being mainly a mixture of iron oxide and iron.

The flue dust charged to the flotation bath is a composite material containing coke and metal constituents. The coke is a mixture of granular particles, which naturally vary in size and form; some thereof may even pass through a 200 mesh sieve. The metal constituents of the flue dust comprise iron oxide and metallic oxide and both of these constituents may vary from the granular condition to a dust condition, passing in some cases through a 200 mesh sieve. The apparent specific gravity of the raw feed is a variable and ranges from about 1.26 to 1.64, depending upon the amount of metal and carbonaceous constituents present. The specific gravity of the coke present in the raw feed obviously differs from the specific gravity of the metal constituents. Further, the wetting properties of the metal constituent and the coke differ. Therefore, there is presented the problem of successfully floating a material of a composite nature containing metal and carbonaceous constituents of different sizes, different specific gravities, and different wetting and absorption powers. The present invention is designed to successfully treat such a material.

The raw feed having the characteristics set forth is charged at predetermined allocated points in precisely uniform quantities on to a cream having bubbles of substantially uniform size and uniformly distributed therein. The bubbles in the cream have been formed under a differential pressure just slightly greater than the hydraulic head of the bath, and consequently as these bubbles reach the surface of the cream they burst with a minimum of energy and produce over the bath surface what may be termed a fog or a miniature rain. It has been observed that in some cases the fog extends to a distance of approximately seven inches over the surface of the bath. However, of course, the depth of the fog layer will depend in some measure on the difference of pressure between that produced by the hydraulic head of the bath and the pressure under which the bubbles are initially introduced into the bath.

The composite material is charged longitudinally of the bath at predetermined allocated points and forms what may be termed the discharging zone which has, as stated, adjacent thereto a take-off zone the width of which across the bath may be varied as desired. When the raw feed passes through the fog, there is a wetting of the constituents thereof and this is a differential wetting in accordance with the absorption and adsorption capacities of the constituents. Therefore, as soon as the raw feed passes onto the cream there is a preliminary separation. The majority of the coke present in the mixture wets more slowly than the metal constituents and remains longer on the creamy surface of the bath. The coke if left on or in the creamy agent would take up water and gradually sink through the bath, thereby contaminating the sink proper. However, if the coke is taken off quickly, it does not have an opportunity to sink, and so the coke entrained in the cream is quickly removed.

A small proportion of the coke, due primarily to its heavier apparent specific gravity sinks through the charging zone of the bath, is met by the rising bubbles from the distributor zone, and is carried upwardly to the region of the take-off zone. It has been observed that the heavier coke does not under the above conditions of operation have a chance to come to the surface of the cream, and therefore does have an opportunity to absorb water.

There is a natural flow of the bath across the width of the cell, and therefore, in due course some of the floated material would reach the take-off conduit, but likewise the period of time required to pass the float across the width of the bath would enhance the absorption and consequent sinking of the float. Therefore, though an accelerated take-off capable of variation as desired is provided, some metal particles which include the ore or iron oxide and metallic iron, of course find their way to the take-off zone. These metal particles, however, have a greater wetting capacity than the coke and they sink fairly rapidly and pass in the absence of any perceptible turbulence along the rear wall of the cell, which preferably is inclined to a degree which will permit the sticky slimy mass of pure ore dust to automatically pass along the inclined wall to the sink discharge. The large particles of ore, due to their great wetting ability, and in the absence of any perceptible turbulence, pass downwardly from the discharging zone along the front wall of the cell to the sink discharge.

It has been previously pointed out that the present invention employs a bubble control so as to produce bubbles of predetermined size. In general, it may be stated that the larger the bubble present in a flotation bath, the shorter is the contact time of the bubble in the bath. In other words, it rises more quickly and quick passage of the bubble through the bath creates more turbulence than if its contact time was shorter. A second disadvantage of a large bubble is that its chances of collision are increased with resulting dropping of its load. Further, a large bubble will require a greater space for rising with a reduced chance of carrying material. To illustrate, a cubic inch carries but sixty-four one-quarter inch bubbles, while a cubic inch will contain 1,000 bubbles of a diameter of one-tenth of an inch. The smaller bubbles will have more chances to come in contact with falling material than a large bubble. Therefore, with small bubbles in the bath when treating flue dust, the time of contact is longer, the danger of collision is reduced, and turbulence is minimized. Experiments have indicated that the small bubbles, uniform in size, function to create uniform conditions in the bath and do not upset the conditions of flotation necessary to recover a high grade float of coke and a high grade sink of ore. When the bubbles are not controlled, as set forth, the operating result is that relatively little coke is obtained as the float product, most of it appearing in the sink of ore. Therefore, the desirability of controlling the size of the bubbles is apparent. However, the control is a flexible one, and may be operated to carry some of the coke, when desired, into the sink to produce, not as heretofore described a commercially pure coke and ore, but to produce a mixture thereof adapted to be directly sintered.

It is desired to point out that in accordance with the present invention, there is produced a control over the size of bubbles present in the bath, a control over the amounts thereof present, a control of the speed of take-off of the float, a control as to the effective area of the feed discharge zone and take-off zone, and the creation of turbulence or absence thereof in the bath at any desired point. By varying these controls, not only is it possible by the present invention to concentrate flue dust, but various other materials such as graphite, manufacturer's ash dumps, phosphates, waste coal, and in particular refuse from culm-piles and mine waste-waters carrying bug-dust may be treated. In all cases the controls referred to are coordinated to produce the desired results.

When treating flue dust, a commercial separation into coke having a B. t. u. value of approximately 14,500 can be produced, and an ore within 3% of the original ore charged, all in one pass through one flotation cell.

In general, in practicing the present invention, effective results may be obtained by using any of the standard flotation agents or admixtures thereof. However, in the treatment of flue dust, it is of paramount importance to use an oil having the proper viscosity so as to form a bubble with a film of sufficient strength to retain its pressure and prevent undue expansion, and also to form a creamy film of sufficient strength and carrying capacity to prevent the coke charged on the surface thereof from sinking therethrough and into the bath, said strength being insufficient to prevent the iron ore from sinking through the bath and disrupting the creamy emulsion. Tar oils which are oils of great viscosity can only be used effectively when their viscosity is reduced. Vegetable oils also react sluggishly. Tar oils having a high viscosity stick to the coke, thereby enhancing the formation of balls or lumps containing ore. Vegetable oils are absorbed substantially entirely by the large granular coke and therefore leave no oil necessary for the formation of the cream, and further, rapidly deplete the consistency of the circulating emulsion. Mineral oils, and particularly derivatives of crude petroleum, and more especially the light distillates, appear to be best adapted for the treatment of flue dust, and also for the treatment of other materials such as graphite and coal. Light distillates of the tar oils or gas oils, such as carbon bisulfide, benzol, xylol, and solvent naphtha, react fairly well, but in some instances produce a stratification or zoning effect which is not desirable. Coal gas distillates, such as carbon bisulfide, produce excellent results when treating carbonaceous values high in ash. The best results are obtained by combining standard flotation agents to produce a mixture having the proper viscosity and film forming properties. When treating flue dust, the most satisfactory results have been obtained by using a light flotation agent comprising a mixture of an organic compound or a derivative thereof having a minimum viscosity, the hydrocarbons being preferred, together with an auxiliary agent of higher viscosity than the hydrocarbon or derivative, so as to produce a composite flotation agent which is of minimum viscosity and also functions to form a film of sufficient strength on the flotation bubbles, and further, produce a cream at the surface of the flotation bath of the proper consistency. Preferably, although not absolutely necessarily, the hydrocarbon or derivative of relatively low viscosity is soluble in the auxiliary agent of high viscosity. In general, it may be stated that the composite flotation agent and the proportions of the ingredients should fulfill the following requirements: the mixture should leave relatively little traces of oil on the water present in the settling and circulating tanks, and such waters when settled out and decanted should be clear. The composite flotation agent should be adapted to form an emulsion which when aerated will form an air bubble having an oil film of sufficient strength to prevent the destruction of the bubble when it comes in contact with other bubbles inside of the flotation bath. Further, the viscosity of the oil film, while being of such a character to protect each air bubble, should not permit adhesion of several bubbles carrying oil films. The flotation agent used should permit the formation of a heavy cream at or near the bath level, such cream being of a consistency to float the carbonaceous material charged thereon, as previously explained. After the bubbles present in the cream are dissipated, the emulsion should assume the appearance of contaminated or even clear water, depending on whether water or contaminated water or depleted emulsion is initially introduced into the bath.

As an agent of light viscosity various carbon compounds or derivatives thereof, including compounds of the aliphatic series, aromatic series, and heterocyclic series may be used, such as gasoline, benzene, benzol, xylol, toluol, carbon bisulfide, spirts of turpentine, and similar materials. When treating flue dust, the best results are obtained when the flotation agent of low viscosity is a mixture of gasoline and benzol. To this there is added a flotation agent of rather high viscosity which may be pine oil, or distillation products of pine oil, either a distillation product of medium viscosity or high viscosity, solvent naphtha, oil of turpentine, or similar materials. It is obvious that the present invention is not limited to the use of pine oil, distillation products of pine oil, and oil of turpentine, as the agent of heavy viscosity, although, as stated, when treating flue dust these give the most satisfactory results. It is preferred that the flotation agent of high viscosity be soluble in the flotation agent of low viscosity.

The following specific mixtures are illustrative of suitable mixtures to be used when treating flue dust from iron blast furnaces. However, in view of the above, it is to be understood that they are not set forth by way of limitation:

*No. 1*

| | Percent |
|---|---|
| Motor spirit (a mixture of 50% benzol and 50% gasoline) | 60 |
| Pine oil | 30 |
| Risol (a pine oil distillation product of medium viscosity) | 10 |

No. 2

| | Percent |
|---|---|
| Motor spirit, as previously set forth | 80 |
| Pine oil | 20 |

No. 3

| | Percent |
|---|---|
| Motor spirit as previously set forth | 50 |
| Pine oil | 25 |
| Risol (a pine oil distillation product of medium viscosity) | 25 |

When treating graphite, the flotation agent may comprise a mixture of motor spirit, as set forth, 75% and pine oil 25%.

Relative to the amount of oil that is added per ton of material treated, it may be stated that in general this is very much less than the amount of oil added in prior art flotation processes, and this for the reason that in accordance with the present invention the oil is charged not so much in quantitative relationship to the amount of material treated but to maintain by reconditioning the efficiency of the emulsion in circulation. While of course the amount of oil added to produce the emulsion will vary somewhat with the character of the material treated, it is desired to give the following explanation relative to the quantity of oil added. When concentrating flue dust by the present process, at the rate of one ton for ten hours, the process is started by adding to the circulating tank of the system, before starting up, 200 gallons of fresh clear water. To this is added about 20 c. c. of the flotation agent, and the circulation is started with all aspirators wide open. Inside of a few minutes, the emulsion is formed in the desired manner and the latter is kept in circulation for a few minutes until the entire capacity of the circulating tanks is in circulation through the system. The material is then charged and oil added in infinitesimally small quantities, and this not so much in relationship to the amount of material passed through the apparatus but in relationship to the carrying capacity of the creamy surface on top of the bath which must be maintained constantly at its maximum efficiency. The emulsion is kept at its maximum efficiency by the addition of a very small quantity, a few drops at a time, of oil, the object of the addition of the oil being to maintain the creamy emulsion at the surface of the flotation bath at its maximum operating efficiency, that is complying with the requirements hereinbefore set forth. The amount of oil added per ten hours may vary between two and three ounces per ton of material, this including the amount of oil originally in the system when starting. A great amount of this oil has not been used, as it remains in circulation. For example, a bath used for the treatment of a number of tons of material after having a complete rest of one month was reused for the concentration of a new quantity of material without the primary addition of any flotation agent, only a few drops of oil being added over a period of ten hours to concentrate one ton of material. This brings out the point that there is only a small quantity of oil present in the system, and this is much less than used in the prior art flotation processes, only a small portion thereof is used up in the process. Due to the low viscosity of the flotation agent used, there is substantially no adhesion of the flotation agent to the material treated, and therefore, there is relatively little opportunity for the oil to be lost. In ordinary flotation processes, the oil, in most cases, attaches itself to the particle of ore concentrated, rises with the same and leaves the bath with the oil film attached. In the present process this, of course, is substantially avoided.

While it is not desired to indulge in any theoretical considerations as to the reasons why such a small quantity of oil is required in the process, it is a fact that this is one of the features of the present invention. As far as the inventor is aware, much less oil is required when employing the present invention for the flotation of materials than in any other flotation process.

Due to the inherent characteristics of the material being treated, it is necessary that turbulences in the flotation bath be substantially eliminated or reduced to a minimum. Ordinarily, with the discharge of the sink, there will be a considerable suction and eddy effect and, therefore, in accordance with the preferred form of the present invention, when treating flue dust, this is reduced to a minimum or substantially eliminated. The overflow water, when the cell is operated for a sufficient length of time, comprising the circulating emulsion passes through the sink and overflow discharge port 54. The partly depleted emulsion of the flotation bath rises upwardly through the chamber 59 to the level of the overflow gate 60. It is noted that the chamber 59 suddenly widens out as at 59a, as shown in Fig. 15, in order to arrest the velocity of the flow of water upwardly, thus permitting any material which has a tendency to be carried upwardly in the circulating medium to gradually sink through the overflow water towards the sink discharge port 58 and also reducing the amount of finely suspended matter in the circulating medium.

In originally starting the operation of the cell, the top of the overflow gate 60 is set to correspond to the dead water line X—X as shown in Fig. 10. As soon as the air bubbles replace a certain amount of water in the flotation bath, the actual bath level drops below the line X—X, which then becomes the upper line of the creamy emulsion. When this occurs, it is necessary to lower the gate 60, so as to almost balance the hydraulic head in the chamber 59 against the hydraulic head in the cell 86. There is a slight differential pressure which, of course, produces a movement of the flotation bath towards the overflow level, but it is so slight as to produce a minimum of turbulence which is essentially desirable in the lower zone of the bath below the line Z—Z, as shown in Fig. 10. Of course, by controlling the level of the overflow gate 60, the differential head can be made any quantity desired, and so when desirable or necessary turbulences may in this manner be introduced into the flotation bath. While this is desirable for some materials, it is strictly undesirable when treating flue dust.

By adjustment of the overflow gate 60, the upper surface of the creamy emulsion of the bath 36 is always kept on the line X—X, so that the float which is wiped off at and adjacent the surface of the creamy emulsion and which is exceedingly rich in coke, carries with it a minimum amount of water as it is carried by wiper 103 into float conveyor 91. According to the present invention, the sink is removed through the sink discharge port 58 in a constant manner and without producing any currents in the flotation bath. In other words, the sink is removed in precisely proportioned quantities without the creation of any turbulences in the bath, and is finally delivered in a partially dehydrated state. In this partially dehydrated state, the sink, either iron ore or coal, if the latter is treated, may be directly briquetted for charging into furnaces. The sink, which when flue dust is treated, comprises iron mainly in the form of iron oxides, but containing some non-combustibles and a small proportion of coke, passes into the sink conveyor 55 and is pushed either to one or both ends as the case may be of the cell 86, that is, towards the cell walls 53, and thereafter through sink discharge port 58 into the receiving end 72 of helical pump 73. The helical pump rotor 76 of the pump 73, rotating at high speed with the least possible clearance between the rotor 76 and the bore 76b of the pump casing 73a, by virtue of the centrifugal force generated, picks up the sink and, due to the peripheral speed of the screw vanes or flights 76a, the heavy sink, or what may be termed the gangue, is forced towards the rotor casing 73a in which the pump rotor 76 turns. Simultaneously, the sink material accumulating on the inside walls of the casing 73, is pushed forwardly towards the discharge end 75 of the pump along the inside walls of the inclined pump 73 by the helical pump rotor 76. The discharge head or end 75 of the pump is placed considerably above the line X—X, as shown in Figs. 10 and 2, this line, of course, being considerably above the actual water line. The latter is reflected through its hydraulic head in the pump 73. As the liquid inside the pump 73 in certain regions thereof has had most of the bubbles removed, the actual water line inside of the pump 73 is considerably below the theoretical water level inside of the flotation bath proper, as a much lighter volume of the bath is counterbalanced by the liquid in the pump cylinder 73, the gravity of the latter being just slightly below the gravity of water or may approximate the gravity of water. This functions to provide a comparatively dry zone in the upper portion of the pump 73 along which the heavy or sink material is subjected to centrifugal action, this tending to eliminate the water present therein, and further dehydrate the material. The sink usually consisting of a rather compact and often very glue-like mass, is freed of a substantial proportion of liquid which it originally contained by dropping through the sink discharge port 58, whereby most of the water present therein is forced upwardly into chamber 59 towards the overflow 60. The sink therefore dropping into the receiving end 72 of the pump 73 is in a semi-liquid state, the emulsion present therein having been pushed upwardly while the heavy material of the sink has filled the receiving end 72 to some extent. The water expelled from the gangue, the latter traveling along the outer periphery of the helical rotor 76, gathers along the stem of the helix and, therefore, into the zone of least reaction.

The mode in which the pump 73 functions permits the sink to ride forwardly along the walls of the pump 73, and the water partially removed by the centrifugal force passes towards the bottom of the flights 76a where there is very little centrifugal and no forwarding force or action. The excess water of course passes downwardly along the pump rotor and up through the receiving conduit 72 of the pump due to the hydraulic relationship between the pump and the flotation bath.

In other words, broadly, the sink passes upwardly through the pump 73 and is partially dehydrated as it goes along and finally passes into a dry zone at the discharge end of the pump where it is further dehydrated by centrifugal action and the amount of dehydration will depend upon the length of the drying zone. In this manner the material can be dehydrated to a sufficient extent to briquet the same. The pump operates so as to effectively prevent any and all suction which is usually created through the lifting tendency of pumps of this type. The elimination of the suction is assisted by the column of pasty mass of sink resting in the receiving end 72 of the pump. It is obvious that the float also may be dehydrated by the application of a helical pump of the type described. The angle at which the pump 73 is pitched, the diameter of the helix 76a, the clearance between the outside periphery of the helix and the inside periphery of the pump casing; the number of revolutions of the helix, and the amount of material to be carried forward should be correlated to produce a minimum amount of suction on the bath.

During experiments with a two-inch helix and the pump set at 60° to the horizontal, a speed of over 400 revolutions per minute of the helix was used in order to forward the material. This produced a suction effect in the bottom of the receiving end of the pump which reflected in the lower parts of the bath near the end walls. When lowering the angle of the pump to below 45° to the horizontal, and reducing the speed from 400 to 260 revolutions per minute, most satisfactory results were attained, consisting in the forwarding of a fairly dry material and the elimination of suction in the lower part of the pump. The pump 73 is adapted to pass $\frac{1}{10}$ ton of sink therethrough in one hour.

The constituents of the flue dust which are caught at the surface of the flotation bath by the creamy emulsion, and which rise through the flotation bath, as hereinbefore described, are removed by the skimmer 96. The skimmer 96 can be regulated at any suitable speed and is adjustable so that it can be raised or lowered as described to lengthen or shorten the take-off zone at or near the surface of the bath. The float is removed with a minimum amount of water by the skimmer and passes into float conveyor 91. By making one end of the screw conveyor with right hand screws and the other end with left hand screws, the material may be removed at both ends of the cell or, if desired, one of these may be eliminated and the entire material removed at one end.

In accordance with the present invention, a constant circulation of the circulating emulsion is maintained after the initial starting up of the cell. The overflow passing through overflow gate 60, the float-overflow, and the sink-overflow are united in a decanting tank system in which the heavier matter, which of course appears in the circulating emulsion, as an absolutely clean separation is never possible, is settled out and a substantially clear circulating emulsion obtained, carrying a very small percentage of fine dust like particles. This circulating emulsion is fed to the aspirators as described, and when necessary an emulsifying agent is added thereto to rejuvenate and maintain the circulating emulsion in its best condition.

In operating the present process, a certain amount of the circulating emulsion, even after complete drainage, will adhere to the values abstracted and, as this is lost, the raw water originally making up the emulsion must be replaced.

This can be done in any suitable manner, but it is preferred to accomplish this purpose in the following manner: referring to Figs. 1, 3 and 4, a special aspirator 17b is located at the end directly adjacent to the end wall 53 of the cell 86. Preferably, the aspirator 17b does not have an oil feeder for the reason that water without oil or other emulsifying agent is injected at this point in the form of make-up water. Aspirator 17b is provided with a distributor 43 through operative connections, as described, for aspirators 17. Instead of the distributor of the aspirator 17b being parallel to the water level, it is vertical and parallel with the end wall 53, thereby producing a fan-shaped jet of aerated make-up water which forms a curtain against the end wall 53 of the cell in a line substantially vertical and parallel to the inside of the end wall. The fresh make-up water which is aerated functions to provide a quantity of small air bubbles rising substantially parallel with the end walls to the surface of the bath, and the purpose of this is to prevent an accumulation of raised or semi-floating material along the end wall and outside of the reach of the wipers 103 of the skimmer 96. Between the wipers 103 and the end walls 53 of the cell there is a slight clearance and consequently the wipers 103 do not reach the material at this point, and there is, therefore, a tendency for the material to accumulate and finally, upon accumulation, later sink through the bath unless provision is made for removing it with the remainder of the float. Aspirators 17b, when located at each end wall 53, function to remove this accumulation of float, and it passes under the wipers 103 and is recovered. It is to be noted that the wipers 103 when they dip into the bath push the material to the float discharge 91 and, coincident with this pushing effect, a slight suction effect is produced on the rear of the wiper 103. This slight suction effect serves to pull in the float which has been subjected to the new make up water coming from aspirator 17b. The aerated make-up water serves to slightly deplete the creamy emulsion in the clearance spaces above referred to at the ends of the cell, and this depleted cream moves more readily and so adapts itself to readily follow the suction effect referred to.

The following specific examples represent results obtained when treating flue dust from iron blast furnaces in accordance with the present invention in a cell having a capacity of one ton per ten hours. The final results hereinafter set forth in each case are obtained by one pass of the material through one single cell.

*Example No. 1—Results of Test 12A*

*Material treated.*—Blast furnace flue dust originating from the blast furnaces of the Tennessee Coal, Iron and Railroad Co., Birmingham, Alabama, and passing 14 mesh.

*Apparent specific gravity of the raw material—1.562.*—The raw material is a composite mixture of granular and fine particles of the character hereinbefore specified.

*Amount of material treated.*—The flue dust was passed through the operating cell at the rate of one ton in 10 hours, the present test being for a duration of one hour and treating 200 pounds of material.

*Circulating emulsion.*—200 gallons of circulating emulsion previously charged for bubbling tests with 20 c. c. of a mixture of 33% pine oil, 33% risol, and 34% of motor spirit, the latter being a mixture of 50% gasoline and 50% benzol. This emulsion had been in use two weeks for bubbling tests.

The operation of the process was carried out in the time stated without the addition of any emulsifying agent, the addition of further emulsifying agent being unnecessary, as very little oil, as previously pointed out, is lost in the process. It is of course obvious that when the test is prolonged for a sufficient period, a very small addition of oil may be necessary.

*Aspirators.*—Three aspirators 17a were used, one for each individual turbulator 38, each aspirator discharging through a separate distributor 43 below the level X—X, as shown in Fig. 10. One aspirator 107, as shown in Fig. 7, of a size identical with aspirator 17a, was used with the free nozzle 106, the aspirator discharging over and above the level of the bath, the material being fed through feed conduit 16, as shown in Fig. 7. The aspirator 107 was positioned so that its discharge was in the vertical plane of the middle distributor 43, the position of the aspirators 17a being similar to that shown in Fig. 3.

The orifices 22y of the nozzles 22a of the three distributors 17a on the discharge side of the cell unit were bored to a diameter of 0.101 inch; the orifices 28y of the secondary Venturi tube 28a were bored to a diameter of 0.135 inch. Port AA was set at a vertical distance of 0.06 inch. The primary nozzle of aspirator 107 on the charging side was bored to a diameter of 0.111 inch. The secondary Venturi nozzle of aspirator 107 was bored to a diameter of 0.135 inch, and the port of aspirator 107 was set at 0.6. The nozzle 106 has a diameter of ⅜ of an inch.

*Pressures employed.*—The three aspirators 17a on the discharge side of the cell had initially charged therein a circulating emulsion under a pressure of 35 pounds per inch, the three aspirators together passing 4.75 gallons per minute. The aspirator 107 on the charging side had initially introduced thereto the same emulsion under slightly higher pressure, namely 50 pounds per square inch, aspirator 107 being adapted to pass 2.7 gallons per minute at that pressure. The total circulation therefore per minute was 7.5 gallons of circulating emulsion.

*Distributor settings.*—Each of the distributors 43 on the discharge side of the bath was provided with six nozzles indicated as an entity by numeral 46. The inlet orifices 46x of the nozzles 46a had a diameter of 0.096 inch; nozzles 46b had an orifice inlet of 0.101 inch, and nozzles 46c had an orifice inlet of 0.11 inch. The distributors and the distributor nozzles were set on a horizontal plane, as indicated in Fig. 26A.

*Results.—*
Float _____ 15.996% at 0.87 apparent specific gravity
Overflow ____ 12.66% at 1.288 apparent specific gravity
Sink _____ 68.62% at 1.556 apparent specific gravity
Loss _____ 2.712

The results show the production of a coke of high purity, as indicated by its specific gravity, and a sink product of a medium quality, being a mixture of iron ore and coke. The loss through the overflow is very high. The results of the above tests indicate that under the specific conditions specified a separation of flue dust into coke and a low grade iron material can be accomplished, but the yields and the purity of the sink product or the iron product are not of the best. The results of this test suggested that improvements could be made in the basic process to obtain the better commercial results, although the process is operative in the form shown. It is to be noted that the overflow carried 12.66% of solid material of a specific gravity ranging between the two products produced, indicating that the overflow was a mixture of iron and coke. It is to be noted that a turbulence was created in the bath by the use of aspirator 107, and this turbulence resulted in the high percentage of overflow, the low yields, and the contamination of the finished sink product which was a mixture of iron ore with a relatively high percentage of coke, as indicated by its specific gravity. The cream layer at the surface of the bath caught a fair percentage of the fine coke, but the heavier coke, due to the turbulence present in the bath induced by the distributor 107, became unduly wetted and so sank through the bath and contaminated the sink. It should be remembered that the material treated carries coke in the form of sponge coke, medium hard coke, and hard coke, and of different sizes, and that the amount of turbulence in the bath greatly influences the recovery of these different kinds of coke which have different wetting or absorption powers. The float obtained in Example No. 1 was sized on 20 mesh, 50 mesh and 80 mesh screens, and the material remaining on 20 mesh was analyzed as to its combustibles, which of course mostly is coke, iron, ash and sulphur in the ash, and as to B. t. u. value. The following table shows the apparent specific gravity of the float material produced in Example 1 and remaining on 20 mesh:

*Sp. gr.=0.561=21.04% of float*

| | Per cent |
|---|---|
| Combustibles | 86.90 |
| Iron | 2.45 |
| Ash | 10.65 |
| Sulphur in ash | 1.24 |

B. t. u. value, 13,475 per pound

An analysis of the float remaining on 50 mesh is as follows:

*Sp. gr.=0.595=46.36% of float*

| | Per cent |
|---|---|
| Combustibles | 83.20 |
| Iron | 3.77 |
| Ash | 13.03 |
| Sulphur in ash | 1.37 |

B. t. u. value, 12,483 per pound

An analysis of the float remaining on 80 mesh is as follows:

*Sp. gr.=0.995=32.60% of float*

| | Per cent |
|---|---|
| Combustibles | 31.30 |
| Iron | 12.30 |
| Ash | 56.40 |
| Sulphur in ash | 0.53 |

B. t. u. value, 7,816 per pound

It is to be noted from a review of the above tabulations that the float remaining on 20 mesh and 50 mesh contained but little iron, but that the float remaining on 80 mesh, that is the relatively small sized float, was relatively higher in iron and low in combustibles, indicating that with a turbulence in the bath some of the iron went with the float and some of the combustible necessarily sank through the bath. That this is so is apparent from the following tables which show an analysis of the sink remaining on 20 mesh, 50 mesh and 80 mesh respectively.

An analysis of the sink remaining on 20 mesh is:

*Sp. gr.=0.600=3.03% of sink*

| | Per cent |
|---|---|
| Combustibles | 68.80 |
| Iron | 4.40 |
| Ash | 26.80 |

An analysis of the sink remaining on 50 mesh is:

*Sp. gr.=1.247=52.61% of sink*

| | Per cent |
|---|---|
| Combustibles | 18.20 |
| Iron | 23.30 |
| Ash | 58.50 |

An analysis of the sink remaining on 80 mesh is:

*Sp. gr.=1.513=44.36% of sink*

| | Per cent |
|---|---|
| Combustibles | 18.40 |
| Iron | 31.20 |
| Ash | 50.40 |

A review of the above tabulation, showing the analyses of sink of various sizes, indicates that the sink remaining on the 20 mesh had a relatively large percentage of combustible material, that is, coke present; while the sink remaining on 50 and 80 mesh had a lower content of combustible matter. While the combustible remaining on 20 mesh is relatively high in percentage of carbon, it is to be noted that it only comprises a little over 3% of the total sink while the sink remaining on 50 mesh and 80 mesh, while low in carbon or combustible matter, comprises a little over 50% of the iron ore.

A review of the chemical and size analyses of the sink shows that of the sink remaining on 50 and 80 mesh, a fairly large proportion thereof is coke of relatively fine size, this indicating that the turbulence in the bath exerts a reaction to send the fine coke present in the composite material into the sink.

The above tables very well illustrate the difficulties encountered and the variables present in treating blast furnace flue dust. The same difficulties pointed out are also encountered when floating other composite material such as coal from waste culm piles, graphite, manufacturer's ashes and similar materials.

From the above results, it is apparent what function turbulence in the bath plays, and the following examples will show how more satisfactory results can be obtained by eliminating the turbulence, it being of course clear that turbulence may be produced by incorrectly placing or proportioning the emulsion feed, the feed of material, the feed of water, or any of the other variables involved in the present process. In other words, an aspirator incorrectly placed or feeding too large a quantity of water or bubbles of incorrect size, considering the character of the material charged, will create a turbulence. A water pressure of incorrect force will also produce a turbulence any of the factors hereinbefore mentioned, which are variable and capable of regulation, influences the production of turbulence in the bath and therefore, it is the basic conception of the present invention to regulate the turbulence in the bath by regulating the various factors, bearing in mind the character of the material charged, this of course including the size of the material, the amount of granular matter and fine material present in the composite product being concentrated and its wetting or absorption properties. It is of course obvious that for some materials a slight or fairly active turbulence may be desired, but that this turbulence must be controlled by regulating the variables inherent in the process, and therefore, it is to be understood that while in the case of flue dust the turbulence is substantially eliminated, the present invention in its broadest aspect is not limited to the elimination of turbulence. It is only when treating blast furnace dust and similar materials that the turbulence is substantially eliminated. For example, in treating graphite, a slight turbulence is desirable in certain specific zones, as hereinafter pointed out.

*Example No. 2 (Test 12 E)*

In this example, one ton of material is passed through the cell in ten hours.

*Material treated.*—Blast furnace flue dust from the blast furnaces of the Tennessee Coal, Iron and Railroad Co. at Birmingham, Alabama, passing through 14 mesh.

*Apparent specific gravity.*—1,356.

*Circulating emulsion.*—200 gallons of fresh water was charged with an emulsifying agent comprising a mixture of 25 c. c. of a composite emulsion consisting of 25% pine oil, 25% medium viscosity distillation product of pine oil, and 50% motor spirit, the latter being a mixture of 50% gasoline and 50% benzol.

*Aspirators.*—Only aspirator 17 was used for the three turbulators 38a, 38b and 38c, and three distributors 43. The distributor used was constructed as shown in Fig. 20. The bore 22x of the primary nozzle 22 was 0.154 inch in diameter; the bore 28x of the secondary Venturi tube 28 was 0.3125 inch. The port A was set at a vertical distance of 0.10 inch.

*Initial pressure of circulating water.*—Water was introduced in the emulsion inlet conduit 18 under a pressure of 50 pounds per square inch, the aspirator being adapted to pass 3.3 gallons per minute.

*Distributors.*—Three distributors 43a, 48b, and 43c were used. The setting for the distributors is that shown in Figs. 34 to 36 inclusive. The middle distributor 43c is set horizontally, the nozzles thereof discharging downwardly at an angle of 45° C., as shown in Figs. 34 to 36. The outside distributors 43a and 43b are set at an angle to the horizontal, inclining towards the middle distributor 43c, as shown in Figs. 34 to 36. Each distributor was equipped with six nozzles each, in general identified by the numeral 46, and more specifically identified by the numerals 46a, 46b and 46c. The inlet orifice of the nozzles 46a was 0.096 inch in diameter; that of 46b 0.101 inch, and that of 46c 0.11 inch in diameter.

Results—
Float _____ 24.42% at 0.822 apparent specific gravity
Overflow____ 1.281% at 1.15 apparent specific gravity
Sink _____ 69.948% at 1.627 apparent specific gravity
Loss _____ 4.345%

From a review of Example 2, it is clear that in comparison with Example 1, the percentage of material floated, that is coke, has been greatly increased, and its apparent specific gravity somewhat reduced, indicating a purer product. The amount of sink recovered is just a little better than that shown in Example 1, but its specific gravity is much higher, showing a better recovery of iron. Moreover, the amount of material going over with the overflow is very greatly reduced, showing a reduction from 12.66% to 1.281%. It is further desired to point out that in Example 2, the specific gravity of the raw material, that is the flue dust, is 1.356 and in Example 1 is 1.562. In Example 2, the specific gravity of the sink is higher than in Example 1, and this notwithstanding that the specific gravity of the original raw material was less than that used in carrying out the test set forth in Example 1.

The improved results apparent from a review of Example 2 are due primarily to the reduction of the turbulence to a minimum in the charging zone of the bath, it being noted that in carrying out the test set forth in Example 2, the use of aspirator 107 was dispensed with.

The viscosity of the emulsifying agent used in Example 2 is lower than that used in Example 1, there being less pine oil and less risol, these ingredients having a higher viscosity than the motor spirit. This assists, as pointed out, in a better recovery of the coke.

*Example No. 3 (Test 12 F)*

*Amount of material treated.*—Same as set forth in Example 2, except the specific gravity thereof was 1,366, passing through 14 mesh.

*Circulating emulsion.*—The circulating emulsion used for Example 2 was used for this test without the addition of any further emulsifying agent.

*Aspirators.*—Same as used in Example 2.

*Pressure.*—35 lbs. per sq. in. at inlet 18 circulating 2.5 gallons per minute.

*Distributors.*—The same setting as set forth in Example 2, the middle distributor 43c being shut off.

Results—
Float _____ 28.757% at 0.894 apparent specific gravity
Overflow____ 0.546% at 1.096 apparent specific gravity
Sink _____ 68.136% at 1.614 apparent specific gravity
Loss _____ 2.562%

The conditions under which the test set forth in Example 3 were carried out were substantially similar to those under which the test set forth in Example 2 was carried out, other than the turbulence being further reduced by employing only two distributors and reducing the water pressure. Comparing results of the test set forth in Example 2 with the test set forth in Example 3, it is noted that in Example 3 a greater amount of float was recovered than in Example 2 and the float had a slightly higher apparent specific gravity, indicating a somewhat greater amount of hard coke being raised, and the overflow has been reduced to approximately ½%; and of a specific gravity which is indicative of little ore and little coke going over with the overflow, the solid components thereof being mainly composed of actual gangue.

By cutting down the water pressure, the force of the impingement on the wall 87 of the cell is considerably reduced, resulting in less turbulence in the bath proper immediately above and adjacent to the distributors, and immediately below and adjacent to the distributors and the sink discharge. The cutting down of the water pressure also functions to eliminate eddying in the bath, this all being reflected in the final results obtained.

*Example No. 4 (Test No. 13 R. F.)*

Amount of and character of material treated same as in Test No. 3, with the exception that the blast furnace dust had an apparent specific gravity of 1.604. This indicates a flue dust which is exceedingly high in iron content and very low in coke.

*Circulating emulsion.*—200 gallons of fresh water was mixed with 15 c. c. of a mixture of 15% pine oil, 15% medium viscosity distillation product of pine oil, and 70% motor spirit, this being a mixture of 50% gasoline and 50% benzol. This emulsion was used for two tests of a duration of one hour each and, thereafter, used in the present test, there being added at the beginning of the test 5 c. c. of the above mentioned mixture. It is to be noted that the viscosity of the emulsifying agent has been further reduced by reducing the quantity of pine oil and risol and increasing the amount of motor spirit. The composite emulsifying agent used therefore comprises a predominating quantity of low viscosity material and a minor proportion of high viscosity material. The use of a mixture of this character which has as an entity a low viscosity tends to prevent absorption of oils by the coke and iron constituents of the flue dust.

*Aspirators.*—The aspirators were set as described in connection with Sample 3 with the exception that port A was set at 0.015 inch instead of 0.1 inch.

*Pressure at inlet 18.*—40 lbs. per sq. in. pressure circulating 2.666 gallons per minute.

*Distributors.*—The distributors were set the same as in Example 3.

Results—
Float _____ 10.188% at 0.934 apparent specific gravity
Overflow ____ 2.568% at 1.301 apparent specific gravity
Sink _____ 86.468% at 1.709 apparent specific gravity
Loss _____ 0.782%

The results of the tests set forth in Example 4 clearly indicate the production of a coke of high specific gravity made up of good hard coke and a sink of high specific gravity made of high grade iron ore.

In order to indicate the character of the original raw material, that is the flue dust charged, and the character of the float, overflow and sink obtained, the following table is given:

*Origin of materials—Test Series 12 and 13*

| Results of analyses | Carbon | Ash | Iron as Fe₂O₃ | Iron as Fe |
|---|---|---|---|---|
| Original raw material | 34.27 | 32.20 | 33.53 = | 23.47 |
| Floats | 76.2 | 14.7 | 9.1 = | 6.4 |
| Overflows | 39.4 | 32.5 | 28.1 = | 19.7 |
| Sinks | 19.0 | 37.9 | 43.1 = | 28.7 |

It is to be noted that the original flue dust contained 34% carbon and 23% iron, and that there is obtained from the same a float high in carbon and low in iron and a sink low in carbon and high in iron. Just how good a separation may be effected by the present process is apparent when it is stated that in the Birmingham district the ore charged to the furnaces at the present time ranges between 29 to 34% iron, which of course means a substantially high percentage of iron figured as iron oxide, and that in accordance with the present invention the iron product produced is close to the low grade iron ore used, and only within a few per cent of the iron ore fed at present to the furnaces in the Alabama district.

Therefore, in accordance with the present invention, the useless flue dust product, of which thousands of tons are available in the Birmingham district alone, is concentrated to produce a high grade coke and a good iron ore. Not only is a high grade ore produced by the present invention, but a high grade fuel is also produced, having a B. t. u. value ranging between 12,000 and 14,500 per pound.

While the above table sets forth the average results obtained when utilizing the present invention, a sink having a much higher percentage of iron has been recovered. For example, in one test the sink averaged as follows:

| | Per cent |
|---|---|
| Carbon | 4.6 |
| Ash | 25.3 |
| Iron as Fe₂O₃ | 70.1 |
| Iron as Fe | 49.1 |

The original material concentrated to produce the above results was taken from the bottom of a box where apparently there had been a settling or stratification functioning to concentrate the iron oxide of the flue dust in the bottom. However, the above example shows that the process is applicable even to the treatment of materials running very high in iron oxide and with a correspondingly less amount of coke.

The present invention, while it has been specifically illustrated in connection with flue dust is not limited to the treatment of this material. Graphite may be separated by controlling the variable factors hereinbefore described. In the treatment of flue dust, it is desired to substantially eliminate turbulence in the bath. However, in treating graphite, it is desirable to create slight turbulences in a certain distinct zone of the bath, this being desirable in view of the characteristics of the graphite material charged. In other words, the raw graphite material is made up of a relatively small percentage of graphite and a very large percentage of sand of different sizes, fine and coarse. The experiments carried out for the concentration of graphite show that the sandy fine material had a tendency to remain in suspension right below the creamy surface of the bath, it of course being obvious that the coarse heavy sandy material would sink through the bath, remaining in suspension at and near the surface of the bath, the fine sandy material contaminating the float product and so there was produced a float of relatively impure graphite. In order to break up the suspension, a secondary row of distributors 108a was utilized, positioned longitudinally at predetermined allocated points and over the lower or primary row of distributors which, as a row, are identified by the numeral 108. At this point it is desired to state that the distributors in both the primary row and the secondary row are in general constructed the same, and the corresponding parts of each row of distributors are identified by the same specific numerals. The distributor rows are identified by the numerals 108 and 108a to clearly indicate the relative position of the rows. It is of course obvious that the remarks that have been made in connection with the distributors forming the primary row 108 apply with equal force to the distributors of the secondary row 108a, and that the same changes may be made in the latter as were made in the former, these being variable factors which are under control, as previously pointed out. The relative positions of the primary distributors 108 and the secondary distributors 108a are well shown in Figs. 5, 6 and 13.

In treating graphite, the function of the distributors of the secondary row 108 is to create a slight turbulence and so make the fine sandy material sink through the bath instead of being entrained by the motion of the wiper 103. In other words, the action can be understood by a homely illustration. If some of the raw graphite feed is poured into a glass full of water, it will be noted that a portion of the graphite remains on the surface of the water, and that a portion of the graphite material sinks to the bottom of the glass. However, intermediate the bottom of the glass and the water surface, the fine sandy material remains in suspension as a suspensoid. If the wiper were passed over the surface of the material suspended in the glass, it would entrain a portion of this fine suspensoid material and so contaminate the float product. However, if the glass is given a slight movement, it will be found that the fine suspensoid material begins to settle and goes to the bottom of the glass. The function of the secondary row of distributors 108a is to give the finely divided suspensoid in the bath a mild movement so that it will descend to the bottom of the bath and pass out as a gangue instead of remaining in the upper creamy layer and contaminating the float product.

When treating graphite, relatively pure graphite can be obtained in accordance with the present invention by one pass through a single cell and this has, as far as the inventor is aware, never before been accomplished.

In treating graphite ore, the best results have been obtained by still further reducing the viscosity of the flotation agent used, and in this connection very satisfactory results have been obtained by the use of a composite agent consisting of 20% of pine oil and 80% of motor spirit, the latter being a mixture of 50% gasoline and 50% benzol. Of course, this is merely illustrative of a suitable low viscosity composite flotation agent and, therefore, equivalents thereof can be used and still come within the spirit of the present invention.

In the Birmingham district there are millions of tons of coal culm piles which represent the discharge from coal washeries. These culm deposits range in coal content from 5% to 82%, and while carrying a large proportion of fine material also carry various sized particles. In treating these piles, the first step is to size the material so as to obtain a product ranging below one-half inch in size. This product is then crushed so that it passes through a sieve 14 mesh or lower. There is thereby produced a composite material which is adapted to be concentrated by the present invention. While of course the present invention is especially applicable to the treatment of bituminous and semi-bituminous coal, the invention may also be utilized for the treatment of anthracite and semi-anthracite coal. When treating bituminous or semi-bituminous coal, it is desirable to have present in the flotation bath a stabilizer to act as a carrier for the more granular matter and permit the same to rest upon the surface of the bath, as set forth in United States Patent No. 1,840,267, granted January 5, 1932. The stabilizer may be injected in accordance with the present invention through the secondary line of distributors 108a, and in this connection the distributor employed is preferably of the character shown in Figs. 24A, 24B and 24C.

Where bituminous coal is washed, there is often an immense amount of mine washery water produced daily, which carries a relatively large amount of fine dust known as bug dust, this in some instances being as high as 12 ounces per gallon of waste water flowing off.

For the recovery of the fine coal content in such waste waters, the water containing the fine coal is charged under pressure through aspirator 107, being mixed simultaneously with air and the circulating emulsion. The mixture issues from nozzle 106 as a stream of aerated emulsion on to the top of the creamy surface of the bath. The creamy emulsion is formed as usual by aspirators 43, forming the line 108, as shown in Fig. 10, it of course being understood that there is a series of aspirators 107 and a series of discharge nozzles 106 positioned longitudinally of the bath at predetermined allocated points, and that there is correlated therewith distributors 43 forming the distributor row 108.

When treating manufacturer's ashes, two rows of distributors 108 and 108a are used, as shown in Fig. 13, the raw material being discharged through a series of spouts positioned longitudinally of the bath and correlated with the position of the distributors present in rows 108 and 108a. The distributors in the lower row 108 effect a considerable turbulence immediately under the discharging zone, and the distributors in the secondary row 108 are operated to effect a milder turbulence immediately next to the discharge zone and adjacent the zone near wiper 103, thus resulting in the sinking of the heavier coal products through the bath and the floating off of the ash products on the surface of the bath. When the material has an excess of acid which would destroy the emulsion in the bath, there may be added to the flotation bath the necessary amount of neutralizing agent through aspirator 107 and nozzle 106, thereby producing an aerated alkaline solution or an acid solution, whichever is desirable as the neutralizing agent.

In connection with the cream herein set forth, it is desired to point out that as far as the inventor is aware, this cream is unlike any foam formation hitherto utilized in the flotation art. The flotation foams hithertofore used were not controlled as to the size or the amount of bubbles present therein. In other words, during a concentrating run the sizes and the amounts of bubbles present changed more or less constantly. Further, the flotation froths hitherto used are usually very brittle.

In contradistinction to the above, the cream herein disclosed is usually formed by bubbles of remarkably uniform size, preferably varying from one-half to 2 m. m. in diameter. The above size of the bubble is merely given as the preferred size, the broad process herein disclosed being operable with bubbles of considerably larger size but, in this connection, it is preferred to have the cream carry bubbles of uniform size and quantity predetermined at will. Further, the cream is preferably formed by using a flotation agent of low viscosity and, for the most satisfactory results, one that is soluble or partially soluble in the circulating medium which is usually but not necessarily water, it having been pointed out that a dilute solution of acid or alkali may comprise the liquid portion of the circulating medium instead of water.

A cream produced as set forth clearly distinguishes from the ordinary foam or froth in that it is not brittle. Further, the foam when taken off breaks very readily.

In general, the termination of the correct consistency of the cream is dependent somewhat on the nature of the material charged. The cream should be of sufficient strength to support the fine constituents of the composite feed, these fine constituents ranging from 200 to 14 mesh, and at the same time permit the more granular constituent of the feed to sink into the bath fairly quickly. It may be pointed out that the cream functions differentially, enabling a part of the feed or charge to ride thereon and the other portion of the feed, finding insufficient support in the cream, to sink therethrough into the flotation bath proper.

The thickness of the flotation cream at the upper surface of the flotation bath may be regulated as desired, depending somewhat on the character of the material being treated. The thickness of the cream rarely exceeds one-half inch and is usually much below. For example, in the recovery of flue dust as herein set forth, a cream ⅜ of an inch thick is used, this cream being produced by a circulating pressure of 40 lbs. per square inch under the conditions set forth in the examples given. When treating graphite and using a circulating pressure of about 35 lbs. per square inch, the thickness of the cream adjacent the upper surface of the flotation bath is about ¼ of an inch. It may be pointed out that the thickness of the cream adjacent the upper surface of the flotation bath is, as far as the inventor is aware, novel, as in the prior art flotation processes the flotation forth or foam varies in thickness from 3 to 6 inches.

While the size of the bubbles present in the cream may be regulated as desired, this regulation being hereinbefore disclosed, it may be stated when treating flue dust that the average size of the bubbles present in the cream is from ½ to 2 m. m. When treating graphite, the average size of the bubbles in the cream is preferably 1 m. m. in diameter, or even slightly less. When treating manufacturer's ashes, very satisfactory results are obtained with the bubbles in the cream averaging preferably about 2 m. m. and usually not larger than 3 m. m.

The point is here made that the character of the flotation cream is under complete control by controlling the size and amount of bubbles present therein and by utilizing when desirable an auxiliary control over the character of the flotation agent used, that is whether of high, intermediate or low viscosity. In other words, the cream can be made of varying viscosities, stiff or limpid. When treating composite material exemplified by flue dust, a limpid cream simulating lightly beaten white of eggs is used. When treating coal or coal refuse, or similar materials, a semi-stiff cream is used, simulating a well beaten white of egg. A substantially totally stiff cream may also obviously be produced. This control over the flotation cream at the surface of the bath is novel.

Proceeding in accordance with the present invention, bubbles below one-half m. m. are readily produced and it is apparent that bubbles of even smaller size can be readily produced at will.

When recovering coke and iron from flue dust in an apparatus passing one ton in 10 hours, the speed of the skimmer 96 is set so that the wipers 103 make ten dips per minute in traveling across a surface comprising 18 inches of the bath. In this specific case, two wipers 103 are used, and the accumulated float on the surface of the cream is removed every three seconds. When one wiper is employed, the float can be taken off every six seconds; with three wipers every two seconds, etc. The speed of the chain 102 may be changed at will to any desired velocity by changing the original revolutions per minute of the wiper drive shaft 98, so as to permit the chain to pass slowly or be accelerated. When treating graphite, it is preferred to use in the apparatus set forth one wiper, and the number of dips is reduced to five per minute by reducing the speed of travel of the chain. The above is merely illustrative of the wiper speed as it is obvious that this may be considerably changed and still come within the spirit of the invention.

It may be pointed out that through the regulation of the speed of the wiper the take-off of the float may be regulated in accordance with the character of the material treated and the desired refinement of the float product. In other words, when treating flue dust, there will be one speed of the wiper most satisfactory to quickly take the float off and not permit it to sink through the bath, and when treating graphite, the speed will be changed in order to accomplish the same final result. Graphite floats more freely than flue dust and a slower speed of the wiper affords a better chance for the separation of the very fine sand dust. In other words, the speed of the wiper is accelerated or retarded as desired, thereby forming a control of the speed of the take-off of the float.

In setting forth certain results in the present disclosure, the apparent specific gravity has been used. Apparent specific gravity is determined by measuring a certain amount of material in a graduated beaker, carefully weighing the same, and correlating to the specific gravity of water at one with the same amount of that material. More specifically, usually 100 c. c. of composite material are measured out and well shaken in order to fill as far as possible all the voids created by the granular material with the finer dust, that is, the beaker is packed to 100 c. c. If 100 c. c. of the material weighs for example 930 grams, and since an equal amount of water would weigh 1,000 grams, the apparent specific gravity of the material would be 0.930. The materials are dried to 212° F. before determining the apparent specific gravity, this being desirable since the coke present in the composite material is very porous and absorbs water readily. When the composite material such as flue dust is crushed to pass through a 14 mesh, there being present both granular material and fine material, the light coke present therein may range from 0.58 to 0.88 and the hard coke present therein may range from 0.78 to 1.15 apparent specific gravity at 212° F.

The use of apparent specific gravity instead of true specific gravity has been adopted since it affords an efficient determination, and this at a relatively low expense. The true specific gravity of composite material such as flue dust can only be ascertained when the material is crushed to below 100 mesh and this introduces mechanical difficulties resulting in great expense. For comparative purposes, apparent specific gravity determinations are very satisfactory.

The drawings forming a part of the application are drawn to scale, with the exception of Fig. 26 which is diagrammatic. Two scales are used. Figures 1 to 6, inclusive, are general drawings and drawn on a somewhat smaller scale than the detailed drawings. Referring to Fig. 2, the distance between the feed spouts 2 is 18 inches, and therefore, the latter serve as a definite indication of the scale to which Figs. 1 to 6 are drawn. Referring to Fig. 12, the distance between the distributors 43 is 6 inches, and therefore the latter serve as an indication of the scale to which the detailed drawings comprising Figs. 7 to 36 are drawn, Fig. 26 being of course a diagrammatic representation not drawn to scale.

The present application is a continuation-in-part of application Serial No. 323,729, filed December 4, 1928, said application being a continuation-in-part of the application maturing into United States Patent No. 1,840,267, granted January 5, 1932 on an application filed July 9, 1928.

What I claim is:

1. The process of treating materials by flotation wherein a circulating medium of a predetermined character is used comprising charging the material into the flotation bath, creating a circulating medium under pressure, producing a gaseous agent adapted to produce bubbles in said circulating medium, modifying the velocity and pressure of the circulating medium so as to entrain therein by a suction effect a predetermined volumetric quantity of a gaseous agent, and simultaneously regulating the size, number and pressure of the gaseous bubbles present in the circulating medium as to impart thereto its predetermined characteristics, introducing said extraneously prepared circulating medium into the flotation bath separately from the material to be treated, regulating the introduction of the circulating medium into the bath so as to control the turbulence induced by said circulating medium, said regulation permitting a variation in the induced turbulence from substantially zero to any desired maximum, allowing the circulating medium to react on the material undergoing treatment, and separately recovering float and sink products.

2. The process of treating materials by flotation wherein a circulating medium of a predetermined character is used comprising charging the material into a flotation bath separately from the circulating medium, providing a circulating medium extraneous of said bath, introducing a gaseous agent in said circulating medium under such conditions as to establish a primary control of the size and amount of gaseous bubbles present in the so-produced circulating medium, and subjecting the latter while in the state resulting from operation of the primary control to a secondary control acting to further control the condition of the flotation medium including the size and number of gaseous bubbles present therein, introducing the so extraneously prepared circulating medium into the flotation bath in its final condition induced by the operation of the primary and secondary controls, allowing it to react on the material undergoing treatment, and separately recovering sink and float products.

3. The process of treating materials by flotation wherein a circulating medium of a predetermined character is used comprising charging the material into a flotation bath separately from the circulating medium, providing a circulating medium extraneous of said bath, introducing a gaseous agent in said circulating medium under such conditions as to establish a primary control of the size and amount of gaseous bubbles present in the so-produced flotation medium, and subjecting the latter while in the state resulting from operation of the primary control to a secondary control acting to further control the condition of the flotation medium including the size and number of gaseous bubbles present therein, introducing the so extraneously prepared circulating medium into the flotation bath in its final condition induced by the operation of the primary and secondary controls, regulating the turbulence induced by said flotation medium, allowing the circulating medium to react on the material undergoing treatment, and separately recovering sink and float products.

4. The process of treating materials by flotation wherein a circulating medium of a predetermined character is used comprising charging the material to be floated separately from said circulating medium in precisely regulated quantities at specifically allocated points above the level of the bath in cooperative relationship to a column of bubbles rising counter-currently from allocated points in the bath, said bubbles being derived from a circulating medium prepared extraneously of the flotation bath by automatically mixing a gaseous medium with a liquid medium in a predetermined ratio and volumetric relationship and simultaneously controlling the size, number and pressure of the gaseous bubbles in the resulting circulating medium as to thereby impart to the latter the desired predetermined characteristics coordinating the points of discharge of the circulating medium in the flotation bath with the material charging points so that the bubbles rise substantially vertically to meet the material charged thereby promoting the effective contact of the particles being treated with the rising bubbles, and producing a thorough and efficient separation with a minimum of turbulence, and separately recovering sink and float products.

5. The process of treating materials by flotation comprising providing at the top of a flotation bath a flotation cream having bubbles of substantially uniform size and uniformly distributed therein, and contiguous and adjacent thereto a fog or miniature rain, feeding a composite material through said fog and on to said cream, allowing a surface separation of the feed constituents by exposure to said fog, a portion of the feed remaining on and adjacent to the surface of the cream, removing said portion from the surface cream prior to it becoming sufficiently wet to sink through the cream and into the bath, further concentrating the remainder of the feed, and recovering the valuable constituents thereof.

6. The process of treating materials by flotation comprising providing a flotation cream having bubbles of substantially uniform size and uniformly distributed therein, the bubbles in said cream having been formed under a differential pressure just slightly greater than the hydraulic head of the bath, thereby bursting on reaching the surface of the cream with a minimum of energy, producing over the flotation cream a fog or miniature rain, exposing a composite material to said rain and passing it to said cream whereby there is a differential wetting of the feed constituents in accordance with their absorption and adsorption, capacities inducing a preliminary separation of the feed constituents, a portion thereof remaining on and adjacent to the surface of the cream, removing said separated portion quickly as a float product, thereby preventing it from becoming wet and sinking through the flotation bath, further concentrating the remainder of the feed and recovering the valuable constituents thereof.

7. The process of treating flue dust from iron blast furnaces, the flue dust being a composite material containing metal and carbonaceous constituents, including iron oxide, iron and coke in a granular and fine state, the constituents having different specific gravities and different wetting and absorption and adsorption properties comprising providing a flotation bath carrying at the top surface thereof a flotation cream simulating beaten white of eggs or barber's lather, and containing bubbles of substantially uniform size predetermined at will and uniformly distributed therein, and contiguous with and adjacent to said flotation cream a fog or miniature rain; feeding said flue dust through and in contact with said fog and on to said flotation cream, allowing a separation of the iron and coke constituents to occur at and adjacent the flotation cream, a substantial portion of the coke wetting more slowly than the iron constituents, and remaining longer on the flotation cream; removing said coke prior to it becoming sufficiently wet to sink through the cream and into the bath; and further concentrating the remainder of the feed to recover the valuable constituents thereof.

8. The process of treating flue dust from iron blast furnaces, the flue dust being a composite material containing metal and carbonaceous constituents including iron oxide, iron and coke in a granular and fine state, the constituents having different specific gravities and different wetting and absorption and adsorption properties comprising providing a flotation bath having a distributor zone therein, the flotation bath carrying at the top zone thereof a flotation cream simulating the beaten white of eggs or a barber's lather, and containing bubbles of substantially uniform size predetermined at will and uniformly distributed therein, said flotation cream having a charging zone and a take-off zone, and contiguous with and adjacent thereto a fog or miniature rain; feeding said flue dust at the charging zone through and in contact with said fog and on to said flotation cream; allowing the separation of the iron and coke constituents to occur at and adjacent the flotation cream, a substantial proportion of the coke including the fines wetting more slowly than the iron constituents, and remaining longer on the flotation cream; removing the coke prior to it becoming sufficiently wet to sink through the cream and into the bath, allowing a small proportion of the heavier coke sinking through the bath at the charging zone of the bath to meet a column of rising bubbles from the distributor zone and to be carried upwardly into the take-off zone; and further concentrating the feed to recover the valuable constituents thereof.

9. The process of treating flue dust by flotation, flue dust being a fine material containing metal and carbonaceous constituents including iron oxide, iron and coke, in a granular or fine state, the constituents having different specific gravities and different wetting and absorption and adsorption properties comprising feeding the composite material in a substantially dry state in regulated quantities adjacent the front wall of the flotation cell and at specifically allocated points above the level of the bath, feeding a gaseous emulsion into the flotation bath containing bubbles of predetermined size and having a pressure just sufficient to produce a slight impingement on the wall of the charging side of the flotation cell, overcome the hydraulic head of the bath, and rise substantially perpendicularly in the charging zone of the bath, and assisting in the formation of a flotation cream adjacent the bath surface having a charging zone and a take-off zone and bubbles of substantially infinitesimal and uniform size adapted to break on the surface of the flotation cream to form a fog thereon, the latter functioning to wet the fine coke particles and induce a preliminary separation of said fine coke from the remainder of the feed on and adjacent the flotation cream, removing said fine coke prior to it becoming sufficiently wet to sink through the flotation cream and into the bath, and further concentrating the remainder of the feed to recover the valuable constituents thereof.

10. The process of treating flue dust by flotation, flue dust being a fine material containing metal and carbonaceous constituents including iron oxide, iron and coke in a granular or fine state, the constituents having different specific gravities and different wetting and absorption and adsorption properties comprising feeding the composite material in a substantially dry state in regulated quantities adjacent the front wall of the flotation cell and at specifically allocated points above the level of the bath, feeding a gaseous emulsion into the flotation bath containing bubbles of predetermined size and having a pressure just sufficient to produce a slight impingement on the wall of the charging side of the flotation cell, overcome the hydraulic head of the bath, and rise substantially perpendicularly in the charging zone of the bath, and assisting in the formation of a flotation cream adjacent the bath surface having a charging zone and a take-off zone and containing bubbles of substantially infinitesimal and uniform size adapted to break on the surface of the flotation cream to form a fog thereon, the latter functioning to wet the fine coke particles and induce a preliminary separation of said fine coke from the remainder of the feed on and adjacent the flotation cream, removing said fine coke prior to it becoming sufficiently wet to sink through the flotation cream and into the bath, allowing a rising column of fine bubbles to meet the heavy coke sinking through the bath and carry the same upwardly and into the take-off zone, and recovering a high grade iron sink and relatively pure coke.

11. The process of treating flue dust by flotation, flue dust being a fine material containing metal and carbonaceous constituents including iron oxide, iron and coke in a granular or fine state, the constituents having different specific gravities and different wetting and absorption and adsorption properties, comprising feeding the composite material in a substantially dry state in regulated quantities adjacent the front wall of the flotation cell and at specifically allocated points above the level of the bath, feeding a gaseous emulsion into the flotation bath containing bubbles of predetermined size and having a pressure just sufficient to produce a slight impingement on the wall of the charging side of the flotation cell, overcome the hydraulic head of the bath, and rise substantially perpendicularly in the charging zone of the bath, and assisting in the formation of a flotation cream adjacent the bath surface having a charging zone and a take-off zone and containing bubbles of substantially infinitesimal and uniform size adapted to break on the surface of the flotation cream to form a fog thereon, the latter functioning to wet the fine coke particles and induce a preliminary separation of said fine coke from the remainder of the feed on and adjacent the flotation cream, removing said fine coke prior to it becoming sufficiently wet to sink through the flotation cream and into the bath, allowing a rising column of fine bubbles to meet the heavy coke sinking through the bath and carry the same upwardly and into the take-off zone, further controlling the turbulence in the bath by maintaining a balanced bath level regulated by an overflow outside of the bath proper, thereby avoiding any syphon action or eddy currents in the bath proper, and synchronizing the quantity of sink removed with the quantity of material charged thereby preventing an accumulation of sink in the bottom of the cell, and recovering a high grade iron sink and a relatively pure coke.

12. The process of treating flue dust by flotation, flue dust being a fine material containing metal and carbonaceous constituents including iron oxide, iron and coke in a granular or fine state, the constituents having different specific gravities and different wetting and absorption properties, comprising charging the material into the flotation bath, creating a circulating medium under pressure, introducing a gaseous agent adapted to produce bubbles in said circulating medium, modifying the velocity and pressure of the circulating medium so as to entrain the gaseous agent therein by a suction effect, regulating under conditions variable at will the size of the gaseous bubbles and the amount thereof introduced into the circulating medium so as to produce a flotation medium controllable at will as to the size and amount of bubbles present therein, introducing said flotation medium into the flotation bath, allowing it to react on the flue dust undergoing treatment, and recovering a high grade iron sink and a relatively pure coke.

13. The process of treating flue dust by flotation, flue dust being a fine material containing metal and carbonaceous constituents including iron oxide, iron and coke in a granular or fine state, the constituents having different specific gravities and different wetting and absorption properties, comprising providing a circulating medium, introducing a gaseous agent therein under such conditions as to establish a primary control on the size and amount of gaseous agent present in the so-produced flotation medium, and the latter while in the state resulting from operation of the primary control to a secondary control acting to further control the condition of the flotation medium including the size and number of gaseous bubbles present therein, introducing the flotation medium into the flotation bath in its final condition induced by the operation of the primary and secondary controls, separately charging said flue dust directly to the flotation bath, allowing the so-conditioned circulating medium to react on the flue dust, and recovering a high grade iron sink and a relatively pure coke.

14. In a flotation apparatus, the combination of a flotation cell containing a flotation bath, means for feeding thereto material to be treated, an aspirator of the Venturi type containing means for producing an emulsion containing bubbles of predetermined size and quantity and means for feeding the same separately from the material to be treated to the flotation bath to react on said material to effect a separation into float and sink products, means for removing the float, and means for removing the sink.

15. In a flotation apparatus, the combination of a flotation cell containing a flotation bath, means for feeding thereto material to be treated, an aspirator having primary and secondary Venturi nozzles and a port of a predetermined size therebetween forming means for producing an emulsion containing bubbles of predetermined size and quantity, and means for feeding the same separately from the material to be treated to the flotation bath to react on said material to effect a separation into float and sink products, means for removing the float, and means for removing the sink.

16. In a flotation apparatus, the combination of a flotation cell containing a flotation bath, means for feeding thereto material to be treated, an aspirator having primary and secondary Venturi nozzles and a port therebetween of predetermined size forming means for producing an emulsion containing bubbles of predetermined size and quantity, an expansion chamber in operative connection with said aspirator and adapted to receive the so-produced emulsion and allow the same to be fed to the flotation bath separately from the material to be treated and to react on said material to effect a separation of the float and sink products, means for removing the float, and means for removing the sink.

17. In a flotation apparatus, the combination of a flotation cell containing a flotation bath, means for feeding thereto material to be treated, an aspirator having primary and secondary Venturi nozzles and a port therebetween of a predetermined size forming means for producing an emulsion containing bubbles of predetermined size and quantity, an expansion chamber adjacent the secondary Venturi nozzle, a turbulator leading from said expansion chamber and in operative connection with the distributor having distributing means for the emulsion passing therethrough, said distributor being adapted to be placed in any desired position and feed the emulsion passing thereto to the flotation bath to react on the material to be treated and effect a separation of the float and sink products, means for removing the float, and means for removing the sink.

18. In the process of separating material by flotation wherein a circulating medium of a predetermined character is employed to separate the material into substantially clean products, said circulating medium including a gaseous constituent present in the form of bubbles and a liquid, the step of preparing extraneously and independent of the fluctuations induced by the hydrostatic head of the flotation bath said circulating medium by automatically mixing the gaseous medium with the liquid medium in such predetermined ratio and volumetric relationship, and simultaneously regulating the size, number and pressure of the gaseous bubbles in the resulting circulating medium as to thereby impart to the latter the predetermined characteristics necessary to assist in effecting the clean separation of said material when the extraneously prepared circulating medium is introduced into the flotation bath.

19. The process of treating material by flotation comprising determining the character of the circulating medium necessary to be introduced in the flotation bath to effect a separation of the material into substantially clean products, and then preparing said circulating medium extraneously and independent of the fluctuations induced by hydrostatic head of the flotation bath by automatically mixing a gaseous medium with a liquid in such a predetermined ratio and volumetric relationship, and simultaneously regulating the size, number, and pressure of the gaseous bubbles in the resulting circulating medium as to impart to the latter the predetermined characteristics necessary to assist in the clean separation of said material, introducing said extraneously prepared circulating medium into the flotation bath and allowing it to react on the material undergoing treatment, and separately recovering float and sink products.

20. The process of treating material by flotation in a flotation cell comprising determining the character of the circulating medium necessary to be introduced into the flotation bath to effect a separation of the material into substantially clean products, and then preparing said circulating medium extraneously of the flotation bath by automatically mixing a gaseous medium and an emulsifying agent of low viscosity with a liquid in such a predetermined ratio and volumetric relationship, and simultaneously regulating the size, number, and pressure of the gaseous bubbles in the resulting circulating medium as to impart to the latter the predetermined characteristics necessary to assist in the clean separation of said material, introducing said extraneously prepared circulating medium into the lower portion of flotation bath and substantially parallel with the surface of the bath, impinging the circulating medium on and adjacent the rear wall of the cell and allowing it to react on the material undergoing treatment, and separately recovering float and sink products.

21. The process of treating material by flotation comprising determining the character of the circulating medium necessary to be introduced into the flotation bath to effect a separation of the material into substantially clean products and then preparing said circulating medium extraneously and independent of the fluctuations induced by the hydrostatic head of the flotation bath by automatically mixing a gaseous medium and a composite emulsifying agent of low viscosity with a liquid in a predetermined ratio and volumetric relationship, and simultaneously regulating the size, number and pressure of the gaseous bubbles and the resulting circulating medium as to impart to the latter the predetermined characteristics necessary to assist in the clean separation of said material, introducing said extraneously prepared circulating medium into the flotation bath and allowing it to react on the material undergoing treatment, and separately recovering float and sink products.

22. The process of treating material by flotation comprising determining the character of the circulating medium necessary to be introduced into the flotation bath to effect a separation of the material into substantially clean products and then preparing said circulating medium extraneously and independent of the fluctuations induced by the hydrostatic head of the flotation bath by automatically mixing a gaseous medium and an emulsifying agent of low viscosity with a liquid in such a predetermined ratio and volumetric relationship, and simultaneously regulating the size, number and pressure of the gaseous bubbles in the resulting circulating medium as to impart to the latter the predetermined characteristics necessary to assist in the clean separation of said material, regulating the introduction of the so produced circulating medium into the flotation bath to control the turbulence induced therein by said circulating medium, and separately recovering float and sink products.

23. The process of treating by flotation flue dust from iron blast furnaces, the flue dust being a composite material containing metal and carbonaceous constituents including iron oxide, iron and coke in a granular and fine state comprising determining the character of the circulating medium necessary to be introduced in the flotation bath to effect a separation of the flue dust into an iron product and a coke product, then preparing said circulating medium extraneously and independent of the fluctuations induced by the hydrostatic head of the flotation bath by mixing a gaseous medium and a flotation agent with a liquid in such a predetermined ratio and volumetric relationship, and simultaneously regulating the size, number and pressure of the gaseous bubbles in the resulting circulating medium as to impart to the latter the predetermined characteristics necessary to assist in the clean separation of the flue dust into its respective components and provide at the surface of the flotation bath a flotation cream, introducing said extraneously prepared circulating medium into the flotation bath, feeding said flue dust in a dry state to said flotation cream, allowing the cream and flotation bath to react on the iron and coke constituents of the feed, and separately recovering a high grade iron product and relatively pure coke.

24. The process of treating by flotation flue dust from iron blast furnaces, the flue dust being a composite material containing metal and carbonaceous constituents including iron oxide, iron and coke in a granular and fine state comprising determining the character of the circulating medium necessary to be introduced in the flotation bath to effect a separation of the flue dust into an iron product and a coke product, then preparing said circulating medium extraneously and independent of the fluctuations induced by the hydrostatic head of the flotation bath by mixing a gaseous medium and a flotation agent with a liquid in such a predetermined ratio and volumetric relationship, and simultaneously regulating the size, number and pressure of the gaseous bubbles in the resulting circulating medium as to impart to the latter the predetermined characteristics necessary to assist in the clean separation of the flue dust into its respective components and provide at the surface of the flotation bath a flotation cream, introducing said extraneously prepared circulating medium into the lower portion of and substantially parallel to the flotation surface of the flotation bath, and simultaneously reducing the turbulence in the bath to a minimum, feeding said flue dust in a dry state to said flotation cream, allowing the cream and flotation bath to react on the iron and coke constituents of the feed, and separately recovering a high grade iron product and a relatively pure coke.

25. The process of treating by flotation flue dust from iron blast furnaces, the flue dust being a composite material containing metal and carbonaceous material including iron oxide, iron and coke in a granular and fine state comprising determining the character of the circulating medium necessary to be introduced into the flotation bath to effect a separation of the flue dust into an iron product and a coke product, then preparing said circulating medium extraneously of the flotation bath and free of any turbulence produced by the bath by mixing a gaseous medium and a flotation agent of low viscosity with a liquid in such a predetermined ratio and volumetric relationship, and simultaneously regulating the size, number and pressure of the bubbles in the circulating medium as to impart to the latter the predetermined characteristics necessary to assist in the clean separation of the flue dust into its respective components and provide at the surface of the flotation bath a flotation cream, introducing said extraneously prepared circulating medium into the lower portion of and substantially parallel to the surface layer of the flotation bath, feeding said flue dust in a dry state to said flotation cream, allowing the cream and flotation bath to react on the iron and coke constituents of the feed, and separately recovering a high grade iron product and a relatively pure coke.

26. The process of treating flue dust by flotation, the flue dust being a fine material containing metal and carbonaceous constituents including iron oxide, iron and coke in a granular or fine state, the constituents having different specific gravities and different absorption and adsorption properties comprising feeding the composite material in a substantially dry state at specifically allocated points above the level of the flotation bath, and feeding into the flotation bath a gaseous emulsion prepared extraneously of said bath by mixing a gaseous medium, a flotation agent and a liquid in a predetermined ratio and volumetric relationship so that the emulsion carries bubbles of predetermined size having a pressure just about sufficient to overcome the hydraulic head of the bath and rise in the charging zone of the bath to assist in the formation of a flotation cream adjacent the bath surface, said flotation cream having a charging zone and a take-off zone, and having gaseous bubbles present adapted to break on the surface of the flotation cream to form a fog thereon, the latter functioning to wet the fine coke particles and induce a preliminary separation of said fine coke from the remainder of the feed on and adjacent the flotation cream, removing said fine coke prior to it becoming sufficiently wet to sink through the flotation cream and into the bath, and further concentrating the remainder of the feed to recover the valuable constituents thereof.

27. The process of treating composite materials by flotation comprising feeding the composite material in a substantially dry state at specifically allocated points above the level of a flotation bath and feeding into the flotation bath a gaseous emulsion prepared extraneously of said bath by mixing a gaseous medium, a flotation agent and a liquid in a predetermined ratio and volumetric relationship so that the emulsion carries bubbles of predetermined size having a pressure just about sufficient to overcome the hydraulic head of the bath and rise in the charging zone of the bath to assist in the formation of a flotation cream adjacent the bath surface, said flotation cream having a charging zone and a take-off zone and having gaseous bubbles present adapted to break on the surface of the flotation cream to form a fog thereon, the latter functioning to wet a portion of the composite feed and induce a preliminary separation on and adjacent the flotation cream of a portion of the fine material from the remainder of the feed, removing said fine material prior to it becoming sufficiently wet to sink through the flotation cream and into the bath, and further concentrating the remainder of the feed to recover the valuable constituents thereof.

28. The process of treating flue dust by flotation, said flue dust containing metal and carbonaceous constituents including iron oxide, iron, and coke in a granular or fine state, the constituents having different specific gravities and different wetting and absorption properties comprising determining the character of the circulating medium necessary to be introduced into the flotation bath to effect a separation of the flue dust into substantially clean products, then preparing said circulating medium extraneously of the flotation bath by mixing a gaseous medium and a flotation agent with a liquid medium in a predetermined ratio and volumetric relationship to provide said circulating medium, said procedure establishing a primary control as to the character of the circulating medium, including the size and amount of gaseous bubbles present, then subjecting the circulating medium resulting from the operation of the primary control to a secondary control to further condition the circulating medium including the size and number of the gaseous bubbles therein prior to its introduction into the flotation bath, said secondary control including subjecting the circulating medium to a turbulating step whereby the expansion of the bubbles is permitted and the latter are split up by the turbulating action, and a distributing step functioning to build up a back turbulating pressure, passing the so-conditioned circulating medium to the flotation bath, separately feeding said flue dust to the flotation bath, allowing the circulating medium to react on the flue dust, and recovering a relatively high grade sink and a relatively pure coke.

29. The process of treating material by flotation comprising determining the character of a circulating medium necessary to be introduced into the flotation bath to effect a separation of the material into substantially clean products, then preparing said circulating medium extraneously of the flotation bath by mixing a gaseous medium and a flotation agent with a liquid medium in a predetermined ratio and volumetric relationship to provide a circulating medium, said procedure establishing a primary control as to the character of the circulating medium including the size and kind of gaseous bubbles present therein, then subjecting the circulating medium resulting from the operation of a primary control to a secondary control to further condition the circulating medium including the size and number of the gaseous bubbles therein prior to its introduction into the flotation bath, said secondary control including the passage of the circulating medium through a turbulator where the expansion of the bubbles is permitted and the latter are split up by the turbulating action, and a distributor functioning to build up a back pressure in said turbulator, passing the so-conditioned circulating medium from the distributor to the flotation bath, separately feeding material to the flotation bath, allowing the circulating medium to react on the material, and recovering sink and float products.

30. The process of treating material by flotation comprising determining the character of the circulating medium necessary to be introduced into the flotation bath to effect a separation of the material into substantially clean products, then preparing said circulating medium extraneously of the flotation bath by mixing a gaseous medium and a flotation agent with a liquid medium in a predetermined ratio and volumetric proportion to provide said circulating medium in which the size and amount of gaseous agent is predeterminedly controlled, said procedure establishing a primary control as to the character of the circulating medium including the size and amount of gaseous bubbles present therein, then subjecting the circulating medium resulting from the operation of the primary control to a secondary control to further condition the circulating medium including the size and number of the gaseous bubbles therein prior to its introduction into the flotation bath, introducing the circulating medium in its final condition induced by the operation of the primary and secondary controls into the flotation bath in a predetermined zone thereof in a predetermined volume under a predetermined pressure and in a predetermined direction to minimize the turbulence, separately feeding to the flotation bath material to be treated, allowing the circulating medium to react on said material, and separately recovering sink and float products.

31. The process of treating materials by flotation comprising charging the material into the flotation bath separate from the circulating medium and controlling the turbulence in the bath by regulating the pressure under which the circulating medium is introduced into the bath and the size and amount of bubbles contained therein, and the zones of distribution of the circulating medium as it passes into the bath, removing the sink simultaneously with the surplus circulating medium from the quiescent zone at the bottom of the flotation bath, and simultaneously avoiding eddy and siphon effects, conducting the surplus circulating medium and the sink to the outside of the flotation cell and separating the sink from the surplus circulating medium by dropping it downwardly by its own gravity reaction, simultaneously permitting the liquid of the circulating medium to ascend at reduced velocity and overflow, regulating the amount of the overflow, and separating from said overflow ore and foam to produce a medium heavier than the circulating medium present in the flotation bath, said circulating medium being lighter due to aeration and thereby forming with the heavier column of off-flow water outside of the flotation bath a differential hydraulic balance.

32. In a flotation apparatus, the combination of a flotation cell containing a flotation bath, means for feeding thereto material to be treated, an aspirator having primary and secondary Venturi nozzles, and a port therebetween of a predetermined size for producing an emulsion containing bubbles of predetermined size and quantity, an expansion chamber adjacent the secondary Venturi nozzle, a turbulator leading from said expansion chamber and in operative connection with a distributor located in the lower portion of the flotation bath, said distributor having nozzles proportioned in due relationship to the volume of circulating medium passing therethrough and the back pressure present in the turbulator, the pressure under which the circulating medium issues from the distributor being somewhat higher than that induced by the available hydraulic head of the flotation bath, means for moving the distributor in any desired position to feed the emulsion to the flotation bath, and means for removing float and sink products.

33. In a flotation apparatus, the combination of a flotation cell having an inclined front wall and an inclined rear wall, said flotation cell containing a flotation bath, a series of conduits positioned near the front wall for feeding material to the flotation bath, a trough shaped portion in the lower part of the cell containing a sink conveyor, a float conveyor positioned adjacent the rear wall of said cell, an aspirator having primary and secondary Venturi nozzles, and a port therebetween of predetermined size for producing an emulsion containing bubbles of predetermined size and quantity, an expansion chamber adjacent the secondary Venturi nozzle, a turbulator leading from said expansion chamber in operative connection with the distributor located in the flotation bath, said distributor having nozzles proportioned in due relationship to the volume passing therethrough and the back pressure present in the turbulator, the pressure under which the circulating medium issues from the distributor being somewhat higher than that induced by the available hydraulic head of the flotation bath, and means for separately removing sink and float products.

34. The process of treating materials by bubble flotation wherein a flotation bath is employed comprising providing a circulating medium containing a gaseous medium, a flotation agent, and liquid in a predetermined volumetric relationship and having gaseous bubbles loaded with a predetermined excess of pressure adapted to produce on and adjacent the flotation bath a low resistance cream and contiguous and adjacent thereto a miniature rain, introducing said circulating medium into the flotation bath, allowing the formation of said flotation cream and rain contiguous and adjacent thereto, feeding material through said rain and to said flotation cream to allow the rain to preferentially wet a portion of the material, and separately recovering float and sink products.

35. In an apparatus forming a fixed control for automatically incorporating bubbles of gas of a predetermined volume and a predetermined size in a given volume of liquid under a given pressure, the combination of a primary Venturi nozzle adapted to pass a liquid therethrough, and a secondary Venturi nozzle positioned closely adjacent the primary Venturi nozzle and forming a port of predetermined size, the port allowing the gaseous medium to pass therethrough, said liquid as it issues from the primary Venturi nozzle entraining the gaseous medium by a suction effect, the capacity of the primary nozzle, the size of the port between the primary and secondary Venturi nozzles, and the capacity of the secondary Venturi nozzle being predeterminedly correlated to automatically produce a liquid carrying bubbles of a predetermined size and a predetermined volume.

36. An aspirator forming a fixed automatic control for incorporating bubbles of fluid of a predetermined volume and of a predetermined size in a given volume of liquid under a given pressure comprising the combination of a primary Venturi nozzle adapted to pass liquid therethrough, a secondary Venturi nozzle positioned closely adjacent the primary Venturi nozzle and forming a port of predetermined size, the port allowing the gaseous medium to pass therethrough, said liquid as it issues from the primary Venturi nozzle entraining bubbles by a suction effect, the capacity of the primary nozzle, the size of the port between the primary and secondary Venturi nozzles, and the capacity of the secondary Venturi nozzle being predeterminedly correlated to automatically produce a liquid carrying bubbles of a predetermined size and a predetermined volume.

37. In a flotation apparatus utilizing an aerated emulsion of the bubble type for the treatment of material, the combination of a flotation cell containing a flotation bath, means for feeding thereto material to be treated, an aspirator of the Venturi type receiving a circulating medium and a gaseous medium, the circulating medium being fed to the aspirator under a substantially constant pressure and in an amount in accordance with the requirements of the material being treated, and the gaseous medium in an amount in accordance with the requirements of the material being treated, said aspirator containing means for producing bubbles of a predetermined size and quality, and a turbulating system in operative connection with said aspirator for allowing the bubbles of the emulsion received under a pressure as modified by the aspirator action to expand and to be split up by a turbulating action, and means for feeding said circulating medium separately from the material to be treated to effect a separation of said material into float and sink products, means for removing the float, and means for removing the sink.

38. In a flotation apparatus utilizing an aerated emulsion of the bubble type for the treatment of material, the combination of a flotation cell containing a flotation bath, means for feeding thereto material to be treated, an aspirator of the Venturi type receiving a circulating medium and a gaseous medium, the circulating medium being fed to the aspirator under a substantially constant pressure and in an amount in accordance with the requirements of the material being treated and the gaseous medium in an amount in accordance with the requirements of the material being treated, said aspirator containing means for producing an emulsion containing bubbles of a predetermined size and quantity, a turbulator in operative connection with said aspirator for allowing the bubbles in said emulsion to expand and by a turbulating action to be split up, and a distributor in operative connection with said turbulator, said distributor being proportioned to build up a back pressure in said turbulator and to allow the circulating medium to issue from the distributor at a pressure greater than that induced by the hydraulic head of the flotation bath.

39. In a flotation apparatus utilizing an aerated emulsion of the bubble type for the treatment of material, the combination of a flotation cell containing a flotation bath, means for feeding thereto material to be treated, an aspirator of the Venturi type receiving a circulating medium and a gaseous medium, the circulating medium being fed to the aspirator under a substantially constant pressure and in an amount in accordance with the requirements of the material being treated and the gaseous medium in an amount in accordance with the requirements of the material being treated, said aspirator containing means for producing an emulsion containing bubbles of a predetermined size and quantity, a turbulator in operative connection with said aspirator for allowing the bubbles in said emulsion to expand and by a turbulating action to be split up, a distributor in operative connection with said turbulator, said distributor being proportioned to build up a back pressure in said turbulator and to allow the circulating medium to issue therefrom under a pressure greater than that induced by the hydraulic head of the flotation bath, and a splicer in said distributor for further subdividing the bubbles present in the circulating medium passing therethrough.

40. In a flotation apparatus utilizing an aerated emulsion of the bubble type for the treatment of material, the combination of a flotation cell containing a flotation bath, means for feeding thereto material to be treated, an aspirator of the Venturi type receiving a circulating medium and a gaseous medium, the circulating medium being fed to the aspirator under a pressure and in an amount in accordance with the requirements of the material being treated and the gaseous medium in an amount in accordance with the requirements of the material being treated, said aspirator containing means for producing an emulsion containing bubbles of a predetermined size and quantity, a turbulating system in operative connection with said aspirator, said turbulating system including an expansion chamber for allowing the bubbles of the circulating medium to expand, and a turbulator for splitting up the bubbles, and means for delivering said circulating medium separately from the material to be treated to the flotation bath and at a pressure greater than that induced by the hydraulic head of the flotation bath to react on said material to effect a separation into float and sink products, means for removing the float, and means for removing the sink.

41. The process of treating materials by flotation, wherein a circulating medium in which the amount of gaseous component present in the unit volume of circulating medium entering the flotation bath is at all times constant in quantity, such constancy of gaseous component being accomplished in the absence of valve control or equivalent instrumentalities comprising putting the liquid used to form the circulating medium under a substantially constant pressure, ascertaining the amount of circulating medium and the amount of gaseous component carried therein which should be present in the circulating medium per unit of volume and the optimum pressure or velocity with which the circulating medium should be fed to the flotation bath to effect a satisfactory separation of the material being treated, then passing the liquid at such predetermined pressure through a nozzle passage to develop a velocity head, entraining a regulatable amount of gas with the liquid at the end of said passage, introducing the resulting stream into a second nozzle passage, the entrained gas entering the liquid stream through a fine substantially annular passage disposed between the first and second passages, the size of said passage being such as to entrain in the stream a constant amount of free gaseous component per unit of volume, carrying bubbles of predetermined size, the amount of air per unit of volume being in accordance with the predetermined operating characteristics of the process, the velocity of the stream passing through the second nozzle being modified, and introducing the so-conditioned stream into the flotation bath.

42. In an apparatus for producing an emulsion carrying a constant quantity of gaseous component per unit of volume, said gaseous component being in a finely divided state, the combination of an aspirator having primary and secondary nozzles closely set to form a port therebetween, the size of said port being predetermined to incorporate in the liquid fed to the nozzle under predetermined pressure only a predetermined amount of gaseous component which it is desired that a unit volume of the emulsion should possess, a turbulator in operative connection with said aspirator for receiving the emulsion with the velocity characteristics modified by the action of the aspirator and provided with a restricted outlet at the end which delivers the emulsion ready for use, said turbulator functioning to split up the bubbles of the emulsion, the so-conditioned emulsion issuing from the restricted outlet of the turbulator with bubbles in a finely divided state.

43. In an apparatus for producing an emulsion carrying a constant quantity of gaseous component per unit of volume, said gaseous component being in a finely divided state, the combination of an aspirator having primary and secondary nozzles closely set to form a port therebetween, the size of said port being predetermined to incorporate in the liquid fed to the nozzle under predetermined pressure only a predetermined amount of gaseous component which it is desired that a unit volume of the emulsion should possess, a turbulator in operative connection with said aspirator for receiving the emulsion with the velocity characteristics modified by the action of the aspirator and provided with a restricted outlet at the end which delivers the emulsion ready for use, said turbulator functioning to split up the bubbles of the emulsion, and a slicer in said restricted outlet to further subdivide the bubbles of the emulsion so that the emulsion issues from the outlet with bubbles in a finely divided state.

44. The process of recovering coke dust and iron-containing material from furnace dust comprising feeding the furnace dust in its dry state and in the substantial absence of absorbed or adsorbed addition agents to a bubble flotation medium, and collecting a coke concentrate prior to the sinking of the charge into the bath; and separately collecting an iron-containing concentrate.

45. The process of recovering a carbonaceous product and a metalliferous concentrate from blast furnace dust comprising feeding blast furnace dust in its dry condition to a bubble flotation medium and collecting a carbonaceous concentrate prior to the sinking of the charge into the bath, and separately collecting a metalliferous concentrate.

46. The process of recovering valuable constituents from composite iron blast furnace dust comprising charging to a bubble flotation medium iron blast furnace dust having present coke in a relatively coarse state and iron-containing material, said furnace dust being fed to the flotation medium in its dry state and in the absence of absorbed or adsorbed addition agents, and collecting a coke concentrate prior to the sinking of the charge into the bath, and separately collecting an iron-containing concentrate.

47. The process of recovering valuable constituents from composite iron blast furnace dust comprising charging to a bubble flotation medium iron blast furnace dust having present coke in a relatively coarse state, iron-containing material, and a proportion of fines of both constituents, said furnace dust being fed to the flotation medium in its dry state in the absence of absorbed or adsorbed addition agents, and collecting a coke concentrate prior to the sinking of the charge into the bath, and separately collecting an iron-containing concentrate.

48. The process of producing a circulating medium carrying bubbles of gas of a predetermined volume and a predetermined size, comprising passing a liquid under a constant circulating pressure through a nozzle passage to develop a velocity head, the capacity of the passage being predetermined in accordance with the requirements of the process, entraining a regulatable amount of gas with the liquid at the end of said passage, and introducing the resulting medium or stream into a second nozzle passage for change in velocity characteristics, the entrained gas entering the liquid stream through a fine substantially annular passage disposed between the first and second passages, the volume of the gas entrained in the liquid stream under a given circulating pressure and the size of the entrained bubbles of gas being determined by the size of the annular passage, the closer the two passages are set together the smaller the annular passage therebetween, and the less the amount of gas entrained in the stream and the size of the bubbles produced.

49. The process of producing a circulating medium carrying bubbles of gas of a predetermined volume and a predetermined size, comprising passing a liquid under a constant circulating pressure through a nozzle passage to develop a velocity head, the capacity of the passage being predetermined in accordance with the requirements of the process, entraining a regulatable amount of gas with the liquid at the end of said passage, introducing the resulting medium or stream into a second nozzle passage for change in velocity characteristics, the entrained gas entering the liquid stream through a fine substantially annular passage disposed between the first and second passages, the volume of the gas entrained in the liquid stream under a given circulating pressure and the size of the entrained bubbles of gas being determined by the size of the annular passage, the closer the two passages are set together the smaller the annular passage therebetween, and the less the amount of gas entrained in the stream and the size of the bubbles produced, subjecting the so-produced circulating stream to a turbulating step and then to a slicing step to further sub-divide the gaseous component of the circulating medium or stream.

50. The process of producing a circulating medium carrying bubbles of gas of a predetermined volume and a predetermined size, comprising passing a liquid under a constant circulating pressure through a nozzle passage to develop a velocity head, the capacity of the passage being predetermined in accordance with the requirements of the process, entraining a regulatable amount of gas with the liquid at the end of said passage, and introducing the resulting medium or stream into a second nozzle passage for change in velocity characteristics, the entrained gas entering the liquid stream through a fine substantially annular passage disposed between the first and second passages, the volume of the gas entrained in the liquid stream under a given circulating pressure and the size of the entrained bubbles of gas being determined by the size of the annular passage, and varying the distance between the first and second nozzle passages in accordance with the size and volume of bubbles desired in the circulating medium, the distance after being once set forming a fixed automatic control to produce a circulating medium carrying bubbles of a predetermined size and present in a predetermined volume.

FREDERICK TSCHUDY.